United States Patent Office

3,278,425
Patented Oct. 11, 1966

3,278,425
DRILLING FLUID COMPOSITION PROCESS
AND PRODUCT
Ellis Gray King and Carl Adolphson, Bellingham, Wash., assignors to Georgia-Pacific Corporation, Bellingham, Wash., a corporation of Georgia
No Drawing. Original application Mar. 31, 1960, Ser. No. 18,818, now Patent No. 3,168,511, dated Feb. 2, 1965. Divided and this application Jan. 11, 1963, Ser. No. 250,746
40 Claims. (Cl. 252—8.5)

This application is a division of our copending application Serial No. 18,818, filed March 30, 1960, now U.S. Patent No. 3,168,511 which in turn is a continuation-in-part of our application Serial No. 433,794, filed June 1, 1954, now abandoned, entitled "Process of Improving the Effectiveness of the Components of Spent Sulfite Liquor and the Products Thereof"; our application Serial No. 539,542, filed October 10, 1955, entitled "Process of Improving the Effectiveness of the Components of Spent Sulfite Liquor and the Products Thereof," now U.S. Patent No. 2,935,504, our application Serial No. 769,185, filed October 23, 1958, entitled "A Process for Providing an Improved Drilling Fluid and the Product Thereof," now U.S. Patent No. 3,171,810; our application Serial No. 789,775, filed January 29, 1959 now abandoned, entitled "A Process for Providing an Improved Drilling Mud of Clay and a Metal Lignosulfonate and the Product Thereof"; our application Serial No. 806,974, filed April 16, 1959, now abandoned entitled "An Improved Gypsum Base Drilling Fluid and the Products Thereof"; our applications Serial Nos. 694,733 and 694,737, now U.S. Patent Nos. 3,007,910 and 3,007,864, respectively; application Serial No. 815,294, filed May 25, 1959, entitled "Drilling Fluid Composition and Process," now U.S. Patent No. 2,935,473. The methods of treating sulfonated lignin-containing material through oxidation and salt formation in improving the dispersive properties of said sulfonated lignin-containing material and the combination of said additive products with clay and water in forming drilling muds are completely disclosed in said copending applications. Furthermore the unexpected resistance of such muds to the contaminants encountered in oil well drilling was also set forth.

Our invention and discovery relates to improvements in drilling fluids resulting from a novel combination of clays and specially treated sulfonated lignin-containing material, and has reference to processes for preparing said material and to the material per se.

More particularly our invention relates to an improved drilling fluid or mud composition or combination, to a process for use thereof, to processes for the production of novel sulfonated lignin-containing material, and to the products of such processes. This mud combination may be formulated to function as water base drilling muds, for example and not limitation as fresh water mud, as lime base mud, as gypsum mud, as calcium chloride mud, as salt contaminated or sea water muds, and in emulsion mud systems. Furthermore, the mud combination is usable over the entire pH range of drilling mud fluids used in the field. A particularly novel form of our mud system is the combination with gypsum which is especially useful in drilling oil wells when anhydrite is encountered. Heretofore, a well recognized fact is that sulfonated lignin-containing additives such as those derived from spent sulfite liquor are effective as thinners in lime base muds but such are not useful as thinners in fresh water muds.

Moreover, our improved mud combination is characterized by stability to high temperature and by effectiveness in resisting the deteriorating effects of contaminants encountered in drilling. Such effectiveness is particularly advantageous in drilling deep wells where high temperature and pressure exists.

Our invention and discovery herein relates primarily and fundamentally to the providing of a novel combination of drilling mud clay and sulfonated lignin-containing material thereby there results drilling muds of newly found properties. It would be difficult to find a more sensitive test of the increased effectiveness of the components of our invention than those required to meet the properties of said drilling muds.

The improved effectiveness of the components of the sulfonated lignin-containing material provided by our invention and discovery renders them suitable as a drilling mud additive, or as the base from which an improved drilling mud can be formed, which mud is characterized by having greatly improved properties.

The outstanding properties of suitable magnitude which characterize a useable and practical drilling mud comprise the following: (1) initial gel strength; (2) viscosity; (3) 10-minute gel strength; and (4) water loss, which relates to the sealing off of the wall of the drilling hole by building up a filter cake of mud on the wall, thus preventing loss of water from the mud. Thus, it is manifest that the drilling mud, with its exacting requirements of various properties for the mud, is a most important, involved, and complex feature of oil and gas well drilling.

Universally, a drilling mud (having about the consistency of lubricating oil) is used in a circulating system with rotary well drilling mechanism, and is forced by pumping down the hollow drill stem through the bit which it lubricates and cools, then back to the surface to a settling pit. Thus, it washes out the cuttings which have been made from the hole, and the cuttings are carried outside the drill stem to the surface where the coarse particles are caused to be removed and the mud again used in a continuous circulating process. To prevent the loss of the mud in porous strata, the mud must be of a character to seal off such strata and the mud, by its hydrostatic pressure, must prevent the escape of gas, that is to prevent the well from blowing out. To provide the proper hydrostatic pressure, the specific gravity of the mud may be increased by adding heavier material than clay, such as barytes. On the other hand the drilling fluid must have the proper viscosity, that is, be thick enough to carry out the cuttings but thin enough to be pumped and to allow the coarse particles to settle out in the surface mud pits so that the mud may be re-used.

Our invention and discovery is characterized by making it possible to greatly improve the effectiveness of the components of said sulfonated lignin-containing material with very simple and inexpensive equipment. The simplicity of the treatment of our invention and discovery is one of its outstanding features.

One important property of drilling mud is that in case of temporary stoppage of work, the mud should "gel" sufficiently to prevent settling of the suspended cuttings, which settled cutting would "seize" the drill stem and preventing re-starting or its withdrawal from the well. From this it is manifest that the viscosity of the fluid is highly important. Likewise, the property to gel or to set like gelatin is important when the agitation incident to drilling ceases. Thus, the mud will hold in suspension the cuttings and at the same time become fluid when agitation is resumed. This is called the "thixotropic" property of the fluid, or its gel strength. Most clays have this property but not all. Such property may be increased by adding the clay called bentonite and similar substances. As the drilling proceeds through different strata, the viscosity and gel strength may be affected by the character of the strata, by the loss by absorption of water in the porous strata or in the inflow of water and other fluids, by temperature changes, or by chemically active substances which may enter the drilling fluid as the drilling proceeds. Accordingly, viscosity, gel and water loss are very carefully watched and corrected from time to time during the drilling. There are instruments provided for testing such properties at the mouth of the well.

In the early history of well drilling, water was added to thin the mud, but this had the objectionable result of reducing the specific gravity of the drilling fluid and thereby decreased its hydrostatic pressure property, and also decreased its ability to suspend the cuttings and the barytes which had been added to give weight. Also, to overcome the effect of addition of chemicals from the strata through which the well proceeded, i.e., the effect from so-called contaminants, other chemicals were added to offset the deleterious effects.

In fact, the literature relating to drilling muds is so extensive and comprehensive and has extended over such a long period of time that it is very apparent that important difficulties, mechanical, chemical and economical, are involved in the controlling, conditioning, and obtaining of the proper type of drilling mud. It is one of the fundamental objects and purposes of this invention and discovery to provide a drilling fluid containing an inexpensive and highly effective mud additive to overcome the problems that have existed for so long in this field. Let it always be kept in mind that the value of the drilling mud depends on how much it will contribute to speed, efficiency, and safety in oil and gas well drilling. Our invention and discovery provides a combination of clay and treated sulfonated lignin-containing material, which combination is characterized by its economy as well as its very special effectiveness, not only for one of the two primary recognized types of drilling muds, i.e., "lime base" and "fresh water" muds, but for the special effectiveness of both of said types of mud.

An important and fundamental object of our invention is to provide a gypsum base mud characterized by a low gel rate rather than the usual objectionable high gel rate which is usually accompanied by high flat gels. Such muds accomplish the maintaining of suitable gels so that cuttings fall out in the mud pit without the necessity of watering back to thin the mud. In this way, the need for costly water loss reducing agents such as carboxy-methylcellulose is substantially lessened, if not eliminated, and the amount of expensive weighting agents required for deep wells is decreased.

*Relative Contaminants.*—In the drilling of deep wells such as oil and gas by the employment of a mud laden drilling fluid as in the rotary system of drilling, strata of a contaminating character may be encountered in large masses which often supply calcium sulfate to the drilling mud—this is very disadvantageous and alters or destroys required properties of the mud. Such calcium sulfate may be, among other forms, in the form of gypsum (calcium sulfate with water of crystallization) and anhydrite (calcium sulfate without water of crystallization). The literature states (Rogers "Composition and Properties of Oil Well Drilling Fluids," page 377):

"The first small additions of calcium sulfate increase the viscosity and gel strength of the mud fluid greatly but do not increase the fluid loss appreciably. This peak portion of the viscosity curve is reached at an addition of 33.3 p.p.m. calcium per gram of bentonite. As the concentration of calcium sulfate increases, the viscosity decreases and the fluid loss increases sharply."

"As the concentration of the calcium sulfate increases, the viscosity decreases and the fluid loss increases sharply"—obviously this feature evidences unpredictable character of contaminants upon the components of the drilling muds as respects the important properties which must characterize the mud. The different properties of the mud are affected differently. Rogers further states (said text, page 378):

". . . unfortunately, the addition of the soluble sodium sulfate results in a large increase in viscosity and gel strength. This effect is of such a magnitude that the method cannot be used in the field to overcome the adverse effects of the anhydrite. It can, however, be demonstrated in the laboratory."

The discovery and invention herein disclosed shows how this objectionable feature of sodium sulfate has been overcome, and to this extent the invention and discovery of applicants is contrary to the recognized literature in this field.

Other contaminating strata are salt beds and the cement employed in the construction of the well. Also let it be noted that the contaminants may be a combination of the contaminants disclosed herein.

It is the primary and fundamental purpose of our invention and discovery to provide a drilling mud system or combination of clay and sulfonated lignin containing material which will operate in controlling the colloidal and physical properties and for maintaining the required properties of a water-clay drilling mud which may be subject to contaminants, so that the mud combination will function in a more effective and more economical manner than heretofore. Thus, an important part of our invention is the rendering more effective the properties of the sulfonated lignin containing materials and herein resides protection against contamination.

This part of our invention relating to the sulfonated lignin containing materials is commonly referred to as the drilling mud additive. Our purpose is to provide such an additive of a character which will function as a control product for the colloidal and physical properties and for maintaining the required properties of the water clay drilling mud which may become subject to contaminants in the drilling operation and to provide such an additive when combined with the mud that will function in a more efficient and more economical manner than has been accomplished heretofore.

The part of our invention and discovery which relates to a further improvement in lessening water loss of gypsum contaminated muds involves the addition of sodium sulfate or equivalents as hereinafter listed to the combination of clayey material and the additive lignosulfonate product of our invention and discovery, in the proportion of 1% to 100% of said sodium sulfate or equivalents by weight of the additive lignosulfonate product, said addition being made in proportions determined by a pilot test of a drilling mud which is contaminated with calcium sulfate. The additive product of our invention in and of itself may not produce the extremely low water losses desired in some muds. The addition of the sodium sulfate and equivalents as hereinafter listed will further reduce the water loss to the desired level and at the same time said additive product prevents the large rise in viscosity and gel factors which occur when sodium sulfate alone is added to an aqueous suspension of clayey material. Thus in the presence of the additive lignosulfonate product, the ordinary adverse action of the sodium sulfate is depressed.

Sometimes the formations are of thick dolomitic lime or other rock sections which do not contribute good mud making materials. In such cases it is necessary to control or maintain the mud by addition daily or bentonite to develop the desired low fluid loss, and the pH of the mud is maintained on the alkaline side to promote hydration and dispersion of the drilled shales. The alkaline pH promotes higher viscosities in the bentonite clays, and, therefore, thinners are added and those with alkaline properties such as the sodium tannate type are preferred. These thinners, because of the presence of alkaline sodium salt, aid in the formation of sodium clays from the dispersed shales and also increase the degrees of dispersion of the clays and shales and hence reduce the fluid loss to strata surrounding the hole. In general, the pH or alkalinity of such muds is maintained at about 9.0 or 10.0. At times the pH of the mud rises or is carried to the range of 10.5 to 11.5 in which the clays and bentonite present manifest appreciably higher viscosity. The treatment of these muds is with sodium hydroxide and quebracho (sodium tannate), and they are referred to as "red muds." In all of these cases, the principal contaminants are salt, cement, gypsum or anhydrite, sand, and other inert mineral matter.

When the mud viscosity becomes too high, it may be more economical to convert to the so-called lime base mud rather than to dilute with water involving the necessary addition of weighting material. At other times, the contamination becomes so bad that the chemicals are not effective and it is found necessary to convert to the lime base mud. This conversion involves the addition of an excess of lime and caustic together with a thinner such as quebracho or, preferably, lignosulfonates. This type of high pH mud with an excess of lime is hereinafter referred to as a "lime base mud" as contrasted to all of the other water clay muds previously discussed, which for convenience will be hereinafter tremed "fresh water muds."

*Objects.*—In general, quebracho, as a thinner, has been used in all types of muds, both fresh water and lime base, but quebracho is an expensive commodity. To date, the lignosulfonates have been useful only in lime base muds where are well known to be relatively inexpensive, but until now, i.e., until the present invention, it has not been possible to use the lignosulfonates in the lower pH (less than 12, i.e., fresh water) muds not containing an excess of lime, inasmuch as they have no appreciable thinning action on such muds. One of the primary objects of this invention is to provide a drilling fluid composition containing an additive comprising a soluble sulfonated lignin-containing material which is highly effective, not only as lime base muds, but also as fresh water type muds.

A primary and fundamental object is to provide a drilling fluid containing a dispersing agent derived from alkaline treated spent wood pulping liquor solids in the simplest and most economical manner with relatively inexpensive equipment, and in a continuous manner to produce from these said liquor solids a soluble additive for drilling mud systems or combinations which is effective in reducing the viscosity and gels of both fresh water muds and the so-called lime base muds, even in the presence of substantial quantities of natural contaminants such as anhydrite, sodium chloride and sodium sulphate.

Another objective is to provide by a sequence of steps a drilling fluid containing an additive derived from alkaline treated spent wood pulping liquors which are preferably initially purified and fractionated and then modified to obtain a soluble additive for making the mud combination of our invention which is characterized by the fact that molecules of each fraction are of a particular and different molecular average size and especially useful for dispersing agents in general and additives for drilling muds in particular.

It is particularly the object of this invention to provide drilling fluid compositions containing alkaline treated soluble spent sulfite liquor additives that are not only especially lower in cost, but are highly effective and useful in essentially all types of water clay and oil-in-water emulsion drilling muds.

Still another object of this invention is to provide a drilling mud which is prepared with saline or sea water when fresh water is not reailly available. Mud prepared with sea water has special utility in off-shore drilling where fresh water must be transported to the drilling site and fresh water muds be protected from sea water contamination. We have found that the additive of our invention is surprisingly effective as a thinner not only for gypsum base muds, but also for saline muds made up originally with sea water as the aqueous component together with commercial drilling mud clays.

*Defining Starting Materials.*—Spent lignin liquors from the pulping of wood provide an inexpensive source of the raw material for our process and product, the said liquors being available in large quantity as waste products of the pulping processes. One of our aims is to conserve this waste material.

The preferred raw material is derived from the pulping of wood by the calcium bisulfite process for the manufacture of pulp. In this operation a substantial portion (20% to 70%, usually about 55%) of the wood is converted to water soluble products which at the end of the cooking process are separated from the pulp in water solution. This solution, because of the washings, is very dilute, ranging approximately from 5% to 20% solids. This solution can be used as such in our process or it can be concentrated in any one of several well known ways to a more concentrated solution which is more readily and economically handled, particularly because of the smaller volume of liquid involved. The concentrated solution can range from 30% to 70%, but handles better in the range of 40% to 50% total solids in solution. This concentration solution contains ligno-sulfonates as salts (for example calcium, magnesium, sodium, or ammonium salts, depending on which of these are employed in the digesting process), carbohydrates, and other complex organic compounds derived from wood, as well as inorganic compounds either present in the wood or derived from the reaction. Furthermore, digesting of wood by iron or aluminum bisulfite will give a spent sulfite liquor component which may be our raw material and which will obviate the necessity of a base exchange reaction to form the iron or aluminum salts. The concentrated solution may be used in our invention and it is very desirable to do so. However, the spent sulfite liquor can be further refined before or after processing according to our invention. For example, the spent sulfite liquor can be essentially freed of carbohydrate material by any one of a number of procedures, preferably by fermentation. Also, said carbohydrates may be removed by dialysis, by separation with organic solvents or organic bases, or by precipitation as basic lignosulfonates, for example, with lime or by salting out with salts such as calcium chloride or sodium chloride. In addition, the lignosulfonates, as well as being freed as far as possible of extraneous materials, may be fractionated as to molecular weight components.

Any of these above described products are basically derived from spent sulfite liquor solids, and are sulfonated lignin-containing materials and the degree of refining to which they are subjected either before or after the steps of our invention will depend on the quality of product desired and the economics involved. That is, refining to some extent will improve the properties of the final processed product, but the degree of improvement will not always be economically justifiable. In fact, it is an essential and outstanding feature of our invention and discovery that we can use concentrated spent sulfite liquor as such, and through a series of simple steps involving equipment which is relatively inexpensive, can produce products which are equivalent in properties, for instance, for use as drilling mud additives and dispersants, to the purified lignosulfonates.

In general, any type of wood or lignocellulosic material the same including straw, cornstalks, bagasse and the like, which can be resolved to pulp with the separation of the lignin-containing material, may be used as a source for providing lignosulfonate in following our invention. Furthermore, changes in the final properties of the product are influenced by the conditions of the pulping process, but in general good results are obtained using the commercial spent sulfite liquor from either paper grade quality pulp or dissolving grade quality pulp.

In addition to the spent sulfite liquor derived from the acid bisulfite pulping of wood, liquors containing soluble lignin are also available from the neutral and alkaline pulping of wood or other lignocellulosic material. Such lignin-containing materials may be converted to sulfonated lignin-containing materials usable as raw materials for the process of our invention, for instance by treatment with sulfites at elevated temperatures, chlorination and heating with sodium sulfite or by other methods known to those skilled in the art, subject only to getting a soluble sulfonated lignin or one which tends to dissolve in water and which on forming the metallic salt and being oxidized is soluble. For example and not by way of limitation, sulfonated Kraft lignin has been found to perform well in making the oxidized metallic salts of sulfonated lignin according to our disclosure. This is also true of sulfonated soda lignin.

In deriving sulfonated lignin containing material from wood pulping liquors varying degrees of sulfonated lignin-containing material result, depending on the well known range of conditions involved in the different methods of sulfonation. For practicing our invention the resulting sulfonated raw material should be soluble in water or in highly alkaline aqueous media and should have dispersing properties. These charactreistics are in part associated with the degree of sulfonation, or the proportion of sulfonic acid groups which have entered the lignin molecule during the sulfonation process. The chemical formula for sulfonic acid groups is —$SO_3H$, in which the sulfur atom is combined directly with a carbon atom in the lignin or other organic material in the lignin-containing material sulfonated.

This type of sulfur is to be distinguished from inorganic sulfates or sulfites, sulfur dioxide free or loosely combined with the lignin and sulfur which might be bound with the lignin as a sulfate. The sulfonate sulfur or sulfur combined directly with carbon is a stably bound sulfur which is not removed from the lignin without drastic treatment such as with sodium hydroxide at high temperature and pressure. In speaking of the sulfur content of the sulfonated lignin-containing material, we refer to the total sulfur as the sulfur of all types which are determined by standard analytical procedures and to the sulfonate sulfur which is the sulfur stably bound with the lignin. The degree of sulfonation required to promote solubility and dispersive properties will vary somewhat with the source of the lignin being sulfonated, i.e., the conditions of pulping. However, sulfonated lignin, having sulfonate sulfur contents as low as those in the range 0.9–3.8% have been used successfully in making the dispersive additives of our invention. Products containing sulfonate sulfur in excess of these amounts do, of course, have the requisite solubility for use in accordance with the present invention.

By way of summary, the raw material for our process is a sulfonated lignin-containing material as it may be received from the blow pit of the bisulfite process or modification of said bisulfite process employing somewhat less acidity, for example and not limitation, about pH 4.5 instead of 1.5 or less, or other sulfonated lignin-containing materials such as those derived from neutral or alkaline pulping processes. Any of these may be in any one of a number of states or degrees of refinement, purification and concentration. We prefer, however, to use concentrated and fermented spent sulfite liquor from the pulping of wood with calcium bisulfite cooking acid because such material is already sulfonated, and is easily converted to other metal salts as disclosed hereinafter and is available in large quantities. By "fermented" is meant spent liquor from which carbohydrates have been removed by fermentation. In any event our starting material comprises a sulfonated lignin-containing material.

Our starting material may be refined and fractionated, but whether it is fractionated before or after treatment according to our invention depends on economical considerations and the special product desired.

Briefly stated, our novel compositions include additives produced by a process which in part involves alkaline heat treated sulfonated lignin-containing material to a salt of iron, chromium, copper, and aluminum, or combinations of said salts; or converting the refined alkaline heat treated sulfonated lignin-containing material to said salts; or converting the fractionated alkaline heat treated sulfonated lignin-containing material to said salts; or converting to said metal salts sulfonated lignin material subjected to other pretreatments, effecting improvement in properties for use in drilling mud, for example, but not by limitation, acid heat pretreatment, and pretreatment by steam stripping, gas or air blowing during heating of solutions of said sulfonated lignin-containing materials derived from spent wood pulping liquors. Said acid treatment may be carried out at less than about pH 4 at temperatures from 50° C. to 180° C. for times causing polymerization or thickening of the solution short of gelation, as set forth in U.S. patent application 723,036, filed December 18, 1957, as a continuation-in-part of our U.S. patent application Serial No. 433,794, filed June 1, 1954, and Serial No. 539,542, filed October 10, 1955. At higher pH, heating may be conducted at temperatures of 170° C. to 210° C. to bring about similar polymerization of thickening of the solution short of gelation.

Another feature of the invention comprises the use of drilling fluid additives prepared by a process which involves subjecting the alkaline heat treated sulfonated lignin-containing material containing said metallic salts to oxidation, or subjecting the oxidized sulfonated lignin-containing material to alkaline heat treatment, which brings about changes in the constitution of the solids of the sulfonated lignin-containing material resulting in additives of greatly enhanced properties comparable and superior to those of natural quebracho in the making of drilling muds.

Also, alkaline treated liquor containing the said metallic salts of dissolved fractionated components may be subjected to oxidation which brings about changes in the constitution of the fractionated solids of the sulfonated lignin-containing materials resulting also in additives of greatly enhanced properties comparable and superior to those of natural quebracho in making drilling muds. Our products are also superior in dispersing the ingredients of clay slips, cement, plaster, etc.

Another feature of the present invention comprises the use of drilling fluid additives prepared by a process which involves the oxidation of alkaline treated sulfonated lignin-containing material, regardless of whether the salt of iron, chromium, copper and/or aluminum is formed. We have found that such oxidized materials make substantial improvements in the effectiveness of thinning of lime base drilling muds. However, said products also provide substantial improvement, although to a lesser degree than is provided by combining oxidation with salt formation, in the case of fresh water drilling muds.

By way of summary and illustration, our invention and discovery comprises the process and product formed by reacting a sulfonated lignin-containing material in aqueous solution with a basic reagent having a hydroxyl ion concentration in the solution of (corresponding to) at least pH 10, a sufficient amount of such basic reagent being used to establish and maintain the pH of the reaction within the range of about 7 to 10 without the precipitation of the sulfonated lignin, maintaining the temperature of the reaction within the range of about 40° C. to about 120° C., or higher and in fact as high as about 220° C., preferably continuing the heating until the reaction is substantially complete, i.e., until substantially no further drop in hydroxyl ion concentration occurs; and oxidizing said sulfonated lignin-containing material and/or forming a metal salt thereof having a cation selected from the group consisting of iron, aluminum, chromium, copper and mixtures thereof as is fully disclosed herein. The heating period may vary from as little as 30 minutes or even less at the higher temperatures, to as long as several days and even two weeks at the lower temperatures in the range.

It will be understood to those skilled in the art that the alkali heat treatment of the present invention is a rate process, i.e., in the early stages the reaction proceeds relatively rapidly (the specific rate, of course, being dependent upon temperature and concentration of the reactants) with an accompanying relatively rapid initial drop in pH (unless additional base is added); in the latter stages the rate of drop in pH progressively lessens, the time vs. pH curve at any given temperature approaching the final pH (between pH 7–10) asymptotically. Theoretically, therefore, the reaction could continue at a slow rate for an indefinite period of time, after the reaction is substantially complete. As a practical matter, experience will show when substantially no further drop in pH will occur, so it is not necessary to periodically check the pH to ascertain when the reaction has proceeeded substantially to completion. For example, at 80° C. the time required for the reaction to become effectively complete has been found to be about three hours, however, as is indicated in the examples herein, when operating at that temperature it is preferred to permit the heating to continue for about 20 hours with sufficient basic reagent to provide a final pH of about 8.

Essentially such basic reagent can also be categorized as selected from the group consisting of alkaline and alkaline earth metal hydroxides and salts having sufficient solubility and a predominant hydroxyl ion concentration in aqueous solution yielding a hydroxyl ion concentration (corresponding to) at least about pH 10, and mixtures of such hydroxides and such salts. In considering basic reagents within the scope of the present invention, it is well known that certain salts and mixtures of salts and bases give so-called "buffer solutions" which provide a predominant hydroxyl ion concentration of the order here involved, and will do so without precipitation of any of the sulfonated lignin. To illustrate, a salt such as sodium carbonate or sodium phosphate or a mixture of either of these salts with sodium hydroxide in aqueous solution yields the pH necessary to bring about the disclosed reaction condition and effect. There may be used any such soluble or slightly soluble compound or mixture of basic compounds where the cation is selected from the group consisting of alkaline and alkaline earth metals and where the cation concentration (and related hydroxyl ion concentration in aqueous solution) is dominant compared with the anion concentration, that is, where the cation has a strongly basic reaction in comparison with the weekly acidic reaction of the anion. In the case of such compounds which precipitate calcium from solutions of calcium salts, the first effect on adding such compounds to calcium base spent sulfite liquor, for example, is to cause a precipitate of calcium carbonate (selecting sodium carbonate as the basic reagent salt for illustration) with the formation of sodium lignosulfonate. As soon as the calcium is precipitated, additional sodium carbonate in appropriate quantity produces a hydroxyl ion predominance (i.e., an alkaline reaction condition) which then gives a pH between about pH 7 and about pH 10 as here required to bring about the reaction.

Thus, specific illustrations of basic reagents as are contemplated by and suitable for practice of our process are sodium hydroxide, potassium hydroxide, ammonium hydroxide, calcium hydroxide, magnesium hydroxide, strontium hydroxide, barium hydroxide, sodium carbonate, sodium acetate, sodium phosphate, sodium tetraborate, sodium silicate and mixtures thereof, for example.

It will be observed from the foregoing examples of the basic reagents contemplated by the present invention that ammonium hydroxide is operable and included according to recognized chemical terminology, the ammonium cation being considered in this context chemically the same as and identifiable as an alkaline metal cation.

In considering the nature of our process and product and the treatment conditions involved, it is important to emphasize that the process proceeds to completion at elevated temperature under weakly alkaline reaction condition (about pH 7 to about pH 10) and that the sulfonated lignin is essentially maintained in solution throughout the reaction. Certain basic reagents as here contemplated provide greater or lesser leeway as to the pH of the solution during reaction, consistent with the requirement that the sulfonated lignin be maintained in solution. Thus, should the basic reagent be sodium hydroxide, the pH of the reaction can be even as high as about pH 13 without any precipitation of sulfonated lignin occurring and the highest pH value during reaction would not necessarily be limited operability-wise to a maximum of about pH 10 but the final pH value nevertheless should be in the range of about pH 7 to about pH 10 because a somewhat better and less expensive product results. Such comparative lack of criticality as to operable maximum pH without sulfonated lignin precipitation during reaction in the instance of use of sodium hydroxide as a basic reagent is to be contrasted with less soluble basic reagents such as calcium hydroxide, for example, which has the property of precipitating the sulfonated lignins at a pH value of about 10.5 to 11. From this comparatively increased tendency to cause precipitation of sulfonated lignin, it will be evident that in using calcium hydroxide as the basic reagent it is essential to use only the amount necessary to give a pH in the requisite reaction range and maintain the sulfonated lignin in solution. Even around pH 10 in the reacting solution, use of calcium hydroxide as the basic reagent occasionally results in a small amount of organic material precipitating at first, but this minor precipitate is transitory in character and redissolves as the treatment is maintained and carried out to completion at a pH in the range of about 7 to about 10. The same is true when using magnesium hydroxide as the basic reagent since magnesium hydroxide is only slightly soluble in the solution and has a maximum pH capability of about 10.5.

In making the salts of iron, aluminum, copper, or chromium of sulfite liquor which, for the production of an oxidized salt, can be done either before or after oxidation, we prefer to use the sulfates of these elements for this purpose because with calcium base sulfite liquor, calcium sulfate precipitates so that it may be removed and thereby bring about purification of the product. Higher temperature promotes the growth of larger crystals of calcium sulfate which are easier to separate from the liquor, hence it is desirable to hold the liquor after addition of the sulfate at 90°–95° C. for a period of time. The formation of large crystals is also fostered by bringing about the interaction of the salt with the spent sulfite liquor solids in such a manner that the precipitation of the calcium sulfate occurs more slowly. This objective can be accomplished by using more dilute solutions and/or using lower temperatures during the base exchange reaction. Hence, a preferred method of forming the iron, chromium, copper, and aluminum salts is to carry the reaction at 30°–50° C. and then to heat the solution with agitation to 90°–95° and hold this temperature for one hour or longer. The reaction mixture is usually acidic during this stage so that this latter treatment is also an acid treatment and has beneficial action on the properties of the spent sulfite liquor product.

Aluminum sulfate may be added preferably in proportion equivalent to the base (i.e., calcium, sodium, magnesium and ammonium) already present in the spent sulfite liquor or it can be used in smaller or greater proportions. Furthermore, aluminum sulfate may be added in anhydrous form or as any of the hydrates of commerce, such as paper makers alum (17% $Al_2O_3$) or as $Al_2(SO_4)_3 \cdot 18H_2O$. In making the lignosulfonate salts, we have used aluminum sulfate salts in the proportion of 1% to 50% by weight of the spent sulfite liquor solids. With the other salts, i.e., iron, chromium and copper, the range of permissible addition is about the same, i.e., 1% to 50%. For example, copper requires the addition of about 30% of $CuSO_4 \cdot 5H_2O$ for complete base exchange as compared with about 26% of $Al_2(SO_4)_3 \cdot 18H_2O$ which takes into consideration the usual chemical equivalence. However, good results have been obtained in using from 15% to 30% of aluminum sulfate $(Al_2SO_4)_3 \cdot 18H_2O)$. The same observation applies to the use of iron, chromium, and copper salts.

In addition to adding sufficient of the cations to be equivalent to approximately the base present in the sulfonated lignin-containing material, it is our unusual (and unexpected) discovery that an excess of the cation over the chemical equivalent for base exchange improves the effectiveness of the product of our invention and discovery, particularly in respect to the conditioning of fresh water mud in connection with obtaining the lowest possible values for yield value and 10 min. gel and water loss. Thus in the preparation of fresh water muds, we prefer to add an excess of a sulfate salt having a cation selected from the group: iron, aluminum, copper and chromium, or mixtures thereof. Since these salts occur as hydrates with varying amounts of water, the permissible addition of these salts to the mud is more definitely expressed as an amount of the sulfate salt equivalent to the anhydrous form of that salt. Thus in terms of the anhydrous forms, the permissible addition is about 1% to 80% by weight of the sulfonated lignin, in excess of the amount of sulfate salt necessary for the base exchange. Thus, for example, with the ferric sulfate the optimum results are obtained with a total addition of the sulfate salt of about 40% to 50% by weight of the sulfonated lignin, which, on the anhydrous basis, would be about 35% to 42% by weight. Accordingly, the excess over the amount for chemical equivalence on the anhydrous basis is about 20% to 27%. Ferrous sulfate and the sulfates of aluminum, chromium and copper perform in the same manner and the excess addition over the chemical equivalent on an anhydrous basis is also about 1% to 80%. Mixtures of these sulfate salts can be used for this purpose. Copper has the advantage of imparting anti-septic properties to the additive, to preserve the mud which may be subject to microbiological attack, particularly so when starch is present.

In regard to the permissible addition of excess sulfate salt the disclosure above of 1 to 80% by weight of the anhydrous sulfate salt pertains to the salt and not to the oxidized salt. For the latter the permissible addition is somewhat less than 70% (see Table 3 of Example IV). Accordingly, from the standpoint of commercial practicability, as applied to both the salt and the oxidized salt, an excess of 1 to 50% of the anhydrous sulfate salt on the basis of the sulfonated lignin is preferred.

In forming the said salts of the sulfonated lignin-containing material, it is preferable to have the latter in the calcium condition, that is, as a calcium salt so that when the sulfate salts of iron, aluminum, copper and chromium are added, the base exchange reaction occurs and calcium sulfate forms which can be removed, thus yielding an essentially pure form of the desired salt.

The disclosure above relating to the permissible addition of 1 to 80% pertains particularly to sulfate salts, or any salt of said metals the anions of which form insoluble salts with calcium, for example, oxalates. However, any soluble salt of these metals could be added to a solution of the sulfonated lignin-containing material without the formation and/or removal of a precipitate. The anion in said soluble salt may be any of the common anions such as, chloride, nitrate, formate, etc., although higher concentrations of chloride ions and to a lesser extent nitrate ions become deleterious above the concentration equivalent to the base exchange capacity of the sulfonated lignin. Continuing them, when such a solution is brought to dryness, because of the ionic equilibrium in the solution, a mixture of salts is obtained. Thus, an amount of the desired lignosulfonate salt, for example, iron, would be present in the product, together with the base (sodium, magnesium, ammonium, etc.) which was originally in the sulfonated lignin-containing material. This product would not be as efficient as the product in which the original base in the sulfonated lignin-containing material was removed prior to or on addition of the iron salts. However, in cases where the sulfonated lignin-containing material has the base sodium, magnesium or ammonium present instead of calcium, it may be satisfactory to make the partial salt in the aforesaid manner. This could be the case, for example, with sulfonated lignin from the Kraft and soda processes which unually contains sodium as the base by reason of the steps of its manufacture.

When an excess of a soluble inorganic salt (including salts such as formates and oxalates under the designation inorganic) of iron, chromium, aluminum, or copper over and above the stoichiometric equivalent of the sulfonated lignin is added in preparing the product of our invention, and the added anions are not subsequently removed, a product is obtained which is less efficient as a thinner but nevertheless is effective. The lower efficiency results from (1) dilution of the thinner by the soluble inorganic salts, and (2) a thickening of the mud resulting from the small amount of soluble inorganic salt added to the mud as a component of the thinner product. Thus, the thinner product with the excess appears to be inefficient when used in small amounts but when large amounts of said thinner product is added to the mud, the surprising resistance of the sulfonated lignin metal complex to the salt contamination overcomes the effect of the small amount of inorganic salt.

The salt contamination effect may be illustrated by considering the combination of one part of ferric chloride with 2 parts by weight of thinner additive of our invention. This combination would amount to 50% of excess of ferric chloride. Adding 9 pounds per barrel of this combination to the drilling mud gives a chloride concentration in the mud approximately equivalent to 3 pounds per barrel of sodium chloride or about 1% of said chloride and a thinner additive concentration of about 6 pounds per barrel. A mud contaminated with 1% salt (sodium chloride) is readily thined by 6 pounds per barrel of the thinner additive.

The amount of metal for complete base exchange will depend on the concentration of acidic components in the sulfonated lignin-containing material and in particular the concentration of the sulfonated lignin. By way of example and not limitation fermented spent sulfite liquor solids having a sulfone sulfur content of about 6% will require about 5% of iron for base exchange. The addition of 50% excess anhydrous ferric sulfate over that required for base exchange is equivalent to about 14% of iron.

When magnesium, ammonium, or sodium bisulfite cooking liquor instead of calcium has been used in manufacturing the pulp, it is then desirable, but not absolutely necessary, to eliminate or partially eliminate the magnesium, ammonium, or sodium ions prior to making the iron, chromium, copper, or aluminum salt. This situation can be brought about by converting to the calcium salt before proceeding with the process of our invention, or it can be accomplished by any number of procedures well known to those skilled in the art—for example, by ion exchange, dialysis with addition of acids, and base exchange procedures in general. For example, cations (i.e., magnesium, ammonium, or sodium) may be removed by passing the liquor through a cation exchange column in the hydrogen state, and then treated with an oxide or hydroxide of iron, chromium, copper or aluminum. We prefer to have the lignosulfonate in the form of the calcium salts before making the iron, chromium, copper, and aluminum salts because the salts are obtained with less contamination in this manner by reason of the calcium sulfate being precipitated so it can be removed—but note well, such purified products can be obtained by any procedure known to the art for making the conversion to the desired salt as well as those named immediately above.

An example of partial salt formation comes as a result of the oxidation treatment with sodium or potassium dichromate as a result of the fact that chromium salts are a product of the reactions involved. Any soluble chromium salts thus formed will provide chromium ions which will be in equilibrium with the calcium ions associated with the sulfonate group of the lignosulfonate. Thus, a partial chromium salt of the lignosulfonate in essence will be formed which would tend to impart the properties attained if the calcium were removed and the lignosulfonate salt were wholly chromium salts. If, furthermore, an excess over the amount of sodium dichromate necessary for the base exchange, i.e., about 12% of sodium dichromate, is added, additional chromium ions resulting from the reduction of the dichromate are present which tend to drive the reaction in the direction of the formation of the chromium salt of the lignosulfonate so that this excess would have somewhat the effect of removing the calcium or in other words, forming a chromium salt instead of the calcium salt of the lignosulfonate. The addition of excess sodium dichromate, would also result in an excess of chromium salts formed by the reduction of the dichromate and would have somewhat the effect of the addition of an excess of chromium sulfate over that necessary to make the base exchange. This method of forming the salts, however, does not yield a product which is as effective for mud formulation as the methods previously described where calcium is removed, for example as the sulfate or otherwise, because calcium ions cause thickening of drilling mud and because of the miscellaneous reaction products. However, the effectiveness of agents made in this manner can be improved by removing the calcium during the treatment, for example, by adding sulfuric acid or any other acid whose anion forms insoluble salts with calcium or by addition of suitable salts which form insoluble compounds with calcium such as sodium sulfate. This illustration is mentioned by way of example that an improvement can be obtained by the presence of an excess of chromium, aluminum, copper, iron salts or combinations thereof, even though there is an equilibrium mixture present with other ions, such as potassium and sodium, but is not given to indicate a preferred method of operation.

It should be noted that an excess of sodium ions resulting from excess sodium dichromate addition is not seriously harmful since the drilling mud clays are also sodium salts and the additional sodium ions introduced into the mud by the additive are relatively few.

The iron, chromium, copper, and aluminum salts of the lignosulfonates thus formed are useful as drilling mud thinners in muds which do not contain an excess of lime, i.e., fresh water muds, and these products are thereby distinguished from the spent sulfite liquor products previously used as thinners in the so-called lime base muds. These previous lignosulfonate thinners which may be ammonium, sodium, magnesium, or calcium salts of lignosulfonates are operable only in the lime base muds and are not effective in muds which are sometimes termed fresh water muds, i.e., muds of low pH and which do not contain salts of aluminum, iron, copper and chromium—the inclusion of said salts being a part of our invention and discovery. The aluminum, iron, copper, and chromium salts of the spent sulfite liquor on the other hand are effective in varying degrees over the whole pH range of the fresh water muds and are also operable as thinners in lime base muds.

Furthermore, let it be noted that another alternate pre-treatment may be used whereby the hot spent sulfite liquor is acidified and air blown or treated to remove the sulfur dioxide and then oxidized with the agents described below. By this course the spent sulfite liquor is purified of sulfur dioxide, and apparently the structure of the components of the spent sulfite liquor is modified and the oxidizing agents if later used are conserved for performing their special functions.

As heretofore indicated an important feature of our invention and discovery is that the oxidation of spent sulfite liquor components leads to increased activity or enhanced properties of said components respecting dispersing properties, and that these changed properties are manifested in the thinning of the viscosity of clay suspensions and also in the reduction of the gel-like properties of such suspensions. We have found that most oxidizing agents are operable in varying degrees as to the improvement produced. Particularly effective for this purpose are the following: hydrogen peroxide, ozone, lead dioxide, chromic acid, chlorine, alkali and alkaline earth hypochlorites, alkali metal chromate, alkali metal permanganate, alkali metal persulfate, alkali metal perborate, and electrolytic oxidation. These several agents are the preferred oxidizing agents.

The preferred forms of the oxidizing salts such as chromates, permanganates and persulfates are the sodium and potassium salts, but the ammonium salts may also be used and where available are included in the descriptive term "alkali metal salts."

When chromate is used for oxidation of spent sulfite liquor, the chromate is added preferably as sodium dichromate, since this form is the most readily available in commerce, and in subsequent discussions the chromate addition is referred to as dichromate. However, it is well known that in aqueous solution chromate ions ($CrO_4^{--}$) and dichromate ions ($Cr_2O_7^{--}$) are readily interconvertible, depending on the pH of the solution. In strongly acid solution, the dichromate ion predominates, but on neutralization with alkali the dichromate shifts to the chromate. Equilibrium is readily reached between the two forms, depending on the pH of the solution. Therefore the chromate may be added as either chromate or dichromate.

Further in regard to oxidation with chromium compounds: By experiment, we have discovered that oxidation of fermented spent sulfite liquor solids with sodium chromate at pH 8 provides a product which has substantially the same thinning effect on the drilling mud as a product obtained by oxidation with sodium dichromate at pH 4. In making this experiment both products were converted to the iron salt to make the mud test. Furthermore chromic acid may be used instead of the chromates in which case it is usually necessary to add sodium hydroxide to neutralize the product to about pH 4 to 5 prior to drying. All of these chemicals, i.e., sodium chromate, sodium dichromate and chromic acid give oxidized products, the iron, aluminum, copper and chromium salts of which are effective thinners for both lime and fresh water muds and give substantially similar results.

One method of obtaining oxidation is by electrolysis whereby oxidation takes place at the anode of an electrolytic cell. We have found that effective electrolysis can be obtained in a simple cell with or without a membrane to separate the anode and cathode, and improved products have been obtained with current usages from a desired effective amount up to about 5 ampere hours or more per gram of sulfonated lignin-containing material. It will be understood that the amount of impurities or contaminants, including carbohydrates and sulfur dioxide, in the sulfonated lignin-containing material electrolized, will change the electrical current consumption (i.e., ampere hours per gram of said sulfonated material) to obtain a given desired result. Thus we have found that from about 0.2 to 5.0 ampere hours per gram is suitable for fermented spent sulfite liquor but less current consumption will be necessary for more purified sulfonated material while greater current consumption may be necessary for less purified sulfonated lignin-containing material.

The electrolysis should be conducted under conditions which will bring about oxidation and not reduction. For this purpose a non-reactive anode, that is, an anode which does not dissolve substantially during the electrolysis, should be used. Thus platinum is suitable. Also, it is preferable to carry on the electrolytic oxidation prior to forming a lignosulfonate salt of the metal iron, aluminum, copper and chromium. However, if the salt is formed before electrolysis, any metal lost for example by plating on the cathode should be replaced, that is, the equivalent of such lost metal should be readded to the electrolyzed solution. This loss of metal ions may be substantially eliminated by electrolyzing under acid conditions of below about pH 3, or as stated above, by electrolyzing before forming the said salt.

Oxidation by addition of sodium perborate results in contamination of the product with sodium borate which must be removed to obtain the greatest efficiency of the product. One method of purifying the product is to remove the resulting borate ions as calcium borate which readily occurs if the starting material is a calcium salt of sulfonated lignin-containing material. The sodium perborate has an alkaline reaction and raises the alkalinity of the solution sufficiently to make calcium borate insoluble. The calcium borate may be removed by filtering or settling. Other methods known to those skilled in the art can be used for such purification. As set forth herein, chlorination also results in by-products of the reaction which should be removed by purification to obtain more effective products for drilling mud thinning.

In regard to the choice and use of oxidizing agents for practicing our invention, two factors are of prime importance: The strength or power of the oxidizing agent and the quantity of oxidant being used in proportion to the organic solids being oxidized. The strength or intensity of the oxidizing agent is expressed as an oxidation-reduction potential, and tables of these potentials are available in the chemical literature. We have found that the oxidizing agents which are suitable for carrying out our invention have a range of oxidation potentials greater than −1.3. The quantity of oxidant which is used to bring about the desired result may be expressed as the weight in grams of each oxidant which can be used per 100 grams of sulfonated lignin-containing material.

The amount of oxidant required depends on the specific oxidant being used, the nature and purity of the sulfonated lignin-containing material being treated and the conditions under which the treatments are conducted. In general and for practical operation, particularly repecting cost, 1% to 50% by weight of the several oxidants on the basis of the dry sulfonated lignin-containing material is all that is required to produce the desired result. However, when the oxidant is of a less concentrated character, as in the cases of alkali persulfate and perborates, both being costly, a large percentage of such oxidant is required to obtain the desired result. In any case, the reaction should be conducted in such a manner and with concentrations and proportions of the reactants so that gelation of the solution does not occur and a permanently soluble product is obtained. Solubility of our additive product is a fundamental requirement because the product is to be added to a drilling mud system, one component of which is water in which the additive product must dissolve to function as a thinner. Also, the dissolving brings about the distribution of the agent uniformly throughout the medium which increases the effectiveness of the product.

By way of explanation gels contain some occluded water soluble product and to the extent that the water soluble component is available or the gel dissolved in the medium said gels function somewhat as thinners. If any thinning action occurs with gelled (i.e. insoluble) products, such thinning is deemed not to be due to the gel functioning as a surface active agent but is due to the soluble component accompanying the gel. At higher pH., i.e., above about 9, the unwashed gelled products dissolve to some degree and show some tendency to thin the mud. Particularly is this true if the dissolved component is not washed out. In any case gels are not desirable because the material is less efficient.

Permanently stable solutions without gelation as shown in the examples may be obtained by conditions which slow the rate of reaction and keep the reactants in low concentration in relation to each other. Furthermore, other conditions affecting the formation of gels in more or less degree are the degree of sulfonation, the concentration of the sulfonated lignin containing material, temperature, concentration of the oxidant, pH and effectiveness of mixing. In addition, the character of the sulfonated lignin containing material being treated affects the amount of oxidant being used, in particular, the degree to which the materials have been previously purified, especially of reducing substance such as sulfur dioxide and carbohydrates, and/or fractionated. The degree of sulfonation is important in regard to water solubility. Also, we have discovered that the molecular weight, and apparently the molecular weight distribution within the fraction will affect the quantity of oxidant required to bring about the desired result. By way of example and not limitation, when a 45% to 50% solution concentration of fermented spent sulfite liquor solids is being used as much as 15% or more of hydrogen peroxide may be added, whereas, with potassium permanganate or potassium dichromate, such concentration of spent sulfite liquor thickens rapidly to a gel when about 10% of these agents is added. Furthermore, by way of example to show the effect that the prior history or character of the spent sulfite liquor has on the quantity of oxidant which may be used without causing gelation, when a caustic treated fermented spent sulfite liquor as described in Example VIII is used at pH 4, about 8% of sodium dichromate will cause gelation at 42% total fermented spent sulfite liquor solids, 15% of sodium dichromate will cause gelling at 25% solids and 21% of sodium dichromate at 12% total solids, the dichromate in each case being added as a 25% solution in water at 60° C. Let it be noted that the above percentages are based on the weight of the dried fermented spent sulfite liquor solids being treated. Moreover under other conditions, even more of this oxidant can be added without causing permanent gelation or loss of water solubility. Purification and molecular weight are other factors which bring about gelation with different proportions of the oxidant. For example, using a solution of 45% to 50% total solids, about 4% by weight of the solids of the oxidant will gel the purified high molecular weight lignosulfonates at a pH of less than 4.5, whereas, as much as 8% or more of potassium permanganate or sodium dichromate may be added to the low molecular weight lignosulfonate fractions of the same concentration without gelation. But substantially larger concentrations of sodium or potassium dichromate may be added if the reactants are dilute. For example, a low molecular weight lignosulfonate fraction (40% of the total original fermented spent sulfite liquor solids) containing 17% of reducing substances expressed as glucose as a 2.5% solution in water treated at room temperature with 50% by weight of sodium dichromate as a 2.5% solution at a pH of 3 yielded after drying at room temperature a product which was slowly soluble in water. With 40% by weight of sodium dichromate the product was rapidly soluble in water. During such reactions the pH rises and acid such as sulfuric may be added to maintain the desired pH. The reaction under the above conditions was substantially complete in one hour. Thus the objective, namely a water soluble oxidized product, can be obtained with up to 50% by weight of the dichromate oxidant depending on the conditions used in the reaction. Similar results are obtained with potassium and sodium permanganate. The other oxidants which are less subject to providing insoluble products may also be used up to 50% and more by weight of the sulfonated lignin-containing material depending upon said conditions.

*Pilot Tests.*—We have discovered that the oxidants which are suitable for oxidizing the sulfonated lignin-containing material may be roughly divided into two groups: Those contaning the metal ions chromium and maganese, i.e., the alkali metal chromates and the alkali metal permanganates and those involving gaseous oxidation components, such as hydrogen peroxide, sodium persulfate, sodium perborate and chlorine and, accordingly, different tests were originally necessary in establishing the maximum amount of the oxidant which could be used for any particular sulfonated lignin-containing material.

The maximum amount of oxidant particularly the chromates and permanganates which can be used with any one sulfonated lignin-containing material can be determined by the following pilot test. A dissolved sample of the sulfonated lignin-containing material is diluted to 2.5% solids, acidified to pH 3.0 with sulfuric acid for this particular test and various amounts of sodium dichromate added, together with sulfuric acid to maintain pH 3.0. The solutions are then allowed to stand about 1 hour at room temperature, adding sulfuric acid at intervals to maintain pH 3.0. At the end of 1 hour, the sample is heated to 80 to 90° C. and digested at this temperature for about an hour. The product samples are then dried at 60° C. and tested for solubility in water. The highest amount of dichromate giving a soluble product is the maximum limit of the amount of oxidant that can be used.

Another guiding test as to the maximum quantity of oxidant which may be used with any one sulfonated lignin containing material in forming the products of our invention and discovery is an evaluation of the performance of the product as a thinning agent for drilling mud. To apply this test, a solution of about 10 grams of sulfonated lignin containing material dissolved in 10 cc. of water is treated with 2 grams of ferric sulfate to convert the lignosulfonate to the iron salt, the solution heated to 80° C. and centrifuged to remove calcium sulfate. This solution is then treated with various amounts of the oxidant being tested at a pH of about 3 to 5 for this particular experiment and heated at 80°–90° C. for about 1 hour and then dried at 60° C. The product is tested for solubility in water, as above, and then for mud thinning properties as described herein. If the properties of the base mud are not improved by the addition of the product, then too high a concentration of that particular oxidant was used in the oxidation stage.

In using the oxidizing agents which evolve a gas in the oxidation process, such as hydrogen peroxide, chlorine or sodium persulfate, a greater amount than that equivalent to sodium dichromate or sodium permanganate is required, since the use of such agents involves a more rapid deterioration and possible escapement of gas without complete reaction. It is probably also that the polyvalent metals manganese and chromium contribute to the effectiveness of the final product and these are not present in said other oxidants. Therefore, while the equivalent proportions are a guide to the relative amount of oxygen that can be used, they are not exactly equivalent in regard to the improvement which equivalent amounts of each of the oxidants will produce in the product.

Optimum thinning properties appear to be attained with sodium dichromate usages which give solutions well removed from the point of gelation. For a fermented spent sulfite liquor, of 40% to 45% total solids, the preferred amount of oxidant is about 7% to 9% of sodium dichromate based on the spent sulfite liquor solids for overall performance respecting the several properties required in drilling mud, but especially low water loss characteristics have been observed with about 18% of sodium dichromate. On the other hand, with chlorine which is considered an oxidizing agent herein, substantially more than the other agents can be added because some of the chlorine reacts by substitution with the spent sulfite liquor components, so that additional chlorine is required to bring about the desired oxidation results.

The time and temperature of the reaction is important in that the reaction should be allowed to go essentially to completion and the product should be substantially free of gels. It is preferable that the oxidation be controlled to yield a solution which can be dried to a powder which can be redissolved in water. If the oxidation is too severe the solution may gel or the dried solids may not be water soluble. Potassium permanganate and potassium dichromate are very rapid in their action and usually the oxidation is complete in 5 to 20 minutes and thereafter the solution is stable and shows no visible evidence of change on standing. If 10% of these agents are added as a 25% solution to concentrated liquor of greater than 40%, the spent sulfite liquor will gel in 15 minutes at room temperature, or if the solution is hot, the gelation will occur almost immediately. Solutions more dilute in organic solids permit the addition of higher percentages of these oxidants. With milder oxidants, such as hydrogen peroxide, 15 minutes to 24 hours are necessary to bring about the completion of the oxidation. The temperature is usually a matter of choice and convenience but should be such that the reaction is complete in the time provided, although lower temperatures will give less difficulty with local formation of gels.

The concentration of the spent sulfite liquor can be any concentration up to 70% by weight of solids, but it is desirable to have the concentration of the liquor low enough to promote homogeneous reaction and prevent subsequent gelation. However, for practical reasons, it is preferred to use solutions of as high concentration as possible and, preferably, of the order of 40 to 50% solids concentration. For this reason, the dilute solution of the oxidant is added to the cool spent sulfite liquor solution of 40 to 50% solids with intensive mixing and after the reaction has been more or less completed, the solution is heated to the temperature at which drying will be conducted.

Thus, it is clear that, because of the choice of oxidants involved in providing required properties, the varied nature of the sulfonated lignin containing material, and the many factors involved in the physical conditions under which the reactions can be conducted, and also the many well known types of equipment used in mixing the reactants, that it is not feasible to set forth the exact operating conditions for each product of production. Furthermore, the factor of what mud property is most desired must be considered since the properties do not respond in a parallel manner to all treatments. That is, sometimes all the properties may be improved whereas in some cases only one of the properties may be improved. Accordingly, a selection must be made to obtain the desired result. But many examples are given in the herein disclosure which will enable persons skilled in the art to select conditions of treatment best suited to the particular requirement of the case in hand. But for most cases for use in the field the oxidants can be used in the concentration of 1 to 50% by weight of the organic solids as herein disclosed and thereby obtain a fully reacted and soluble product without gelation. The determination of the maximum amount of any given oxidant which can be used for any particular sulfonated lignin-containing material is determined by pilot tests as hereinbefore described. But the usage is one depending upon which mud property is most desired.

Special processing is necessary when chlorine is used as the oxidizing agent since in addition to oxidation and any other reactions which occur, there is a reaction of chlorine with the sulfite liquor components, and there are by-products from the reaction such as hydrochloric acid, which if left in the product may have a deleterious effect. For example, it has been found that on the addition of 1% to 4% of chlorine on the basis of the dry weight of the spent sulfite liquor solids, the properties of the sulfite liquor residue improve even without further purification to remove the end products formed, such as calcium chloride. The chlorination can be increased up to the addition of 45% of chlorine above which the chlorinated lignin tends to become insoluble in the strong hydrochloric acid and calcium chloride solution formed in which case it is necessary to further refine the products by removing the hydrochloric acid and reaction products. One of the best methods of accomplishing this purpose is to precipitate the chlorinated lignin with lime. This treatment has additional benefit of purifying the lignosulfonates not only of the hydrochloric acid and its end products, but also of the carbohydrates themselves. In this connection we have discovered that, whereas with regular spent sulfite liquor it is difficult to divide the lignosulfonates into several fractions by treatment with lime, surprisingly with the chlorinated lignins of our invention and discovery, the products can be divided very readily into fractions of different average molecular weight. This finding has been of extreme usefulness in the preparation of specific fractions of the chlorinated lignin as to molecular weight.

It has been known that lignosulfonates may be precipitated in mass from spent sulfite liquor by adding at one time relatively large quantities of lime slurry until a pH of 11–12 is reached. It is our discovery that the lignosulfonate can be precipitated and recovered as fractions of different molecular weights by adding the lime in small increments. Especially surprising and useful is our discovery that if the lignosulfonates are treated with chlorine then they may be more readily divided by lime precipitation into many small fractions, while at the same time purifying the lignosulfonates from the carbohydrates, chlorides, and other miscellaneous components of the sulfite liquor. The oxidized and chlorinated lignosulfonates, fractionated as to molecular weight by lime, may then be used as such as lime base mud thinners, or they may be converted to aluminum, iron, copper, and chromium salts and as such they also make highly effective fresh water drilling mud thinners. Such oxidized and chlorinated lignosulfonates may be converted to other salts such as sodium, magnesium, ammonium, etc., if calcium is objectionable in the product. Fractionation of the chlorinated spent sulfite liquor can also be accomplished by the alcohol fractionation process according to the disclosures of the application of Adolphson et al., Serial No. 703,664, filed December 18, 1957.

In summary, our invention comprehends the discovery that oxidation with or without forming a salt of a metal selected from the group of iron, aluminum, copper and chromium of the alkaline treated lignin sufonate-containing material provides an improved drilling fluid, and that the amount of oxidation can be greatly varied.

The oxidized products are useful as thinners, and this is particularly important because products can be prepared from the alkaline treated spent sulfite liquor merely by a simple oxidation process to give products equivalent as thinners to those prepared by more complex and expensive procedures. Furthermore, let it be particularly noted, essentially in precipitation and fractionation procedures only a part of the spent sulfite liquor solids are available for use as mud thinners while, in contrast, our invention and discovery makes use of substantially all of such solids. This point is important where yield and costs are of prime consideration.

In general, the products of our invention and discovery may be prepared from spent pulping liquor and the solids therein in the condition as received directly from the digester, or said products may be prepared from modifications of the said solid components of the spent pulping liquor. Such modifications may be provided by various treatments but, nevertheless, the resulting solids still do constitute soluble sulfonated lignin-containing materials. By way of example and not limitation the treated solids may be as follows: They may be as they exist after fermentation of spent sulfite liquor whereby the carbohydrate content is reduced or they may be as solids after hot spent sulfite liquor is acidified and air blown, or the spent sulfite liquor may be essentially freed of carbohydrates and extraneous material by any one of a number of procedures, preferably by fermentation or by adding increments of lime, or by precipitation, dialysis, separation by organic solvents, and/or organic bases, or precipitated as basic lignosulfonate for example with lime, or by salting out with salts such as calcium or sodium chloride.

Furthermore, the spent sulfite liquor components may have been derived by the pulping with agents other than the usual magnesium, sodium, ammonium, and calcium bisulfites. These other agents disclosed herein are iron and aluminum bisulfites.

Oxidation treatment improves the spent sulfite liquor components in providing a more effective lime mud thinner or more effective thinning and dispersing action in general, i.e., in both lime base and fresh water muds.

Base exchange to form iron, aluminum, chromium, or copper salts enhances fresh water mud thinning properties and improves some of the lime mud properties, as for example a base exchange with aluminum sulfate will yield a product with lower viscosity and gel characteristics in lime mud.

Up to this point the disclosure has dealt primarily and especially with the treatment of the spent sulfite liquor components and with their fractionation, their treatment with metallic salts, and the oxidation of said components, as well as with the use of such spent sulfite liquor components in preparing well drilling muds in general, in establishing or proving first, that a change is made in said components by the treatment of our invention and discovery, and, second, that the magnitude of the change is surprisingly great, as evidenced by the increased and augmented effectiveness of the treated components as revealed in the preparation of such drilling muds.

Now the disclosure will relate more specifically to the particular use of the said components in providing a product for controlling the colloidal and physical properties of gypsum base drilling muds so as to maintain them in the most desirable condition for use.

As one application of our invention we provide for muds where contamination is encountered from calcium sulfate (either as so-called "gyp," or in the anhydrite form, Portland cement), and similar calcium bearing material which would ". . . supply calcium ions which flocculate sodium bentonite as calcium bentonite through base exchange reaction. This flocculation of the bentonite results in an increase in the mud water loss. The water loss value of the drilling fluid may be 8 cc. at the time of entering a massive anhydrite section and 24 hours later be anywhere from 25 to 75 cc. if the mud is not treated properly. Anhydrite and cement differ in that the former supplies the sulfate radical along with the calcium while the latter supplies the hydroxyl radical which increases the fluid pH. The sulfate radical does not affect the pH of the solution although the pH of the mud may drop slightly through replacement of the hydrogen ions from the bentonite particle by the calcium. The net effect of the drilling of sufficient anhydrite to saturate the mud aqueous phase with calcium is first to result in a marked increase of gel strength followed by a gradual increase in the water loss as the bentonite is converted to the calcium bentonite. As the calcium bentonite flocculates through loss of hydration properties, the gel strength decreases. The final result is a mud of high water loss, low viscosity and low gel strength." (P. 25, "Composition and Properties of Oil Well Drilling Muds," Rogers, rev. ed.)

In case of contamination with calcium bearing strata, Rogers further states (beginning on p. 379 of said text):

"The precipitation and removal of calcium from solution can be accomplished by at least four chemicals. These are:

"(1) Bentonite.
"(2) Soda ash ($Na_2CO_3$).
"(3) Disodium phosphate ($Na_2HPO_4$).
"(4) Barium carbonate ($BaCO_3$).

"The first, the use of bentonite, is not very efficient but has been used in drilling anhydrite together with large quantities of thinners. It is not recommended for large quantities of calcium sulfate and will not be discussed further.

"Soda ash is a common chemical precipitant for calcium sulfate. The reaction is:

$$CaSO_4 + Na_2CO_3 \rightarrow Na_2SO_4 + CaCO_3 \downarrow$$

In this reaction the calcium is precipitated as calcium carbonate while soluble sodium sulfate is formed and remains in solution. In this reaction 1.0 pound of soda ash will precipitate 1.283 pounds of calcium sulfate. The reaction goes to completion and excess quantities of soda ash are not required. The method has two disadvantages. The first results from high pH of soda ash. The compound in strong solution has a pH of approximately 11.2. The action of high pH in gelling bentonite mixtures has been shown previously. Since the pH of the mud will increase greatly from excess soda ash it is usually customary to use SAPP as a thinner because of its low pH value. The second disadvantage results from the continuing accumulation of sodium sulfate as calcium carbonate is precipitated. Any increase in concentration of such soluble salts acts to increase the gel strength. One of the main difficulties with the soda ash treatment where thick beds of anhydrite are encountered is that the development of high gel strength from increased mud pH and sodium sulfate formation is so extensive that soda ash additions have to lag additions of thinner to reduce the mud pH and gel strength. As a result the calcium contamination continues to gain and the fluid loss continues to rise. It has been found impossible to maintain fluid-loss values below 15 cc. when using this treating method to drill massive anhydrite. Where the contamination consists of stringers of short duration, soda ash can be used to handle anhydrite satisfactorily as its extent is not sufficient to allow accumulation of sodium sulfate or the high pH condition.

"Disodium phosphate as a chemical precipitant for calcium sulfate is similar in many respects to soda ash. The reaction with anhydrite is:

$$3CaSO_4 + 2Na_2HPO_4 \rightarrow Ca_3(PO_4)_2 + 2Na_2SO_4 + H_2SO_4$$

The products of the reaction are calcium phosphate, which precipitates from solution, and sodium sulfate and sulfuric acid which remain behind as soluble constituents. In this reaction 1.0 pound of disodium phosphate will precipitate 1.430 pounds of calcium sulfate. While disodium phosphate is slightly more efficient, pound for pound, as a precipitant for calcium sulfate than is soda ash, its greater cost is a deterrent to its use for this purpose. The similarity with soda ash results from the single precipitation of the calcium with sodium sulfate as a residue. The divergence is largely in the pH difference of the two compounds. Disodium phosphate has a pH in strong aqueous solution of 8.6. The addition of this mildly alkaline compound to the mud does not result in as high gel strengths as obtained from soda ash. The residual quantities of sodium sulfate and acid act to increase the viscosity and gel strength of the mud. There are no data in the literature covering case histories of massive anhydrite drilled with this compound.

"Barium carbonate makes a satisfactory chemical precipitant when drilling massive anhydrite. The reaction is:

$$CaSO_4 + BaCO_3 \rightarrow CaCO_3 + BaSO_4$$

In some respects this treatment is superior to that of soda ash or disodium phosphate. This results from the complete precipitation of both the calcium and the sulfate radicals of the anhydrite as well as the barium and the carbonate of the treatment, leaving no soluble salts in solution. The barium carbonate is approximately neutral in pH and allows the mud to be restored to its original condition and allows lot fluid losses and viscosities to be maintained while drilling anhydrite. The principal disadvantage of the method lies in the large quantities of material required and the resulting high cost. 1.0 pound of barium carbonate will precipitate only 0.691 pound of calcium sulfate. In addition, the reaction is not very efficient as more barium carbonate must be used than called for by the reaction. Fortunately the addition of excess quantities of barium carbonate does not affect the mud adversely and overtreatment is primarily undesirable because of the cost of the barium carbonate so wasted."

Thus, all these methods of overcoming the contaminant calcium sulfate fail, or are objectionable for one reason or another.

By way of summary, it may be stated that presently three methods of treatment are commonly used in the field to overcome the deleterious effect of calcium sulfate:

(1) One method is to convert the mud to a limed mud by adding 3 to 5 pounds of hydrated lime, 1¼ pounds per barrel of tannin, or 2½ to 3½ pounds per barrel of calcium lignosulfonate and then adding carboxymethyl cellulose and starch to control water loss. This method is expensive.

(2) Another method used is the employment of high pH red mud. The mud is raised to about pH 12 with equal parts of caustic and tannin, and water loss is controlled by addition of carboxymethyl cellulose. This method is also objectionable because it is expensive.

(3) A third method, and probably the most commonly used, is to convert to a gypsum base mud by adding 3 to 4 pounds gypsum per barrel of mud. The mud is thinned to the desired viscosity with water, and 4 to 6 pounds per barrel of starch added to reduce water loss, and ¼ to ½ pound per barrel of a preservative added to prevent fermentation of the starch. This mud is objectionable because of the high flat gels which make the mud hard to pump in deep wells and make it difficult for cuttings to separate in the surface mud pits. Furthermore, by adding water, the volume of the mud is increased, and therefore part of the mud must be discarded to accommodate the capacity of the equipment. Also, because of the addition of water, the density of the mud is decreased and additional expensive weighting material must be added to increase the weight of the mud for deep drilling.

One of the outstanding features of using the product of our invention and discovery in preparing drilling muds is to provide a method of controlling mud properties against contaminants in drilling calcium sulfate bearing strata which is less expensive and requires a minimum of effort and attention at the time such a stratum is encountered in the drilling, or when contamination by such contaminants is anticipated. In fact, as shown by Example IX, it may be only necessary to add 3 to 4 pounds per barrel of additional conditioner to the mud being used in the well at the time the anhydrite is approached. N.B. Our product is particularly relatively inexpensive.

A further outstanding feature of the use of the product of our invention is the providing of a gypsum base mud with a low gel rate—that is, a mud with a low initial gel strength so that cuttings will settle out and be removed while the mud is flowing to and circulating in the mud pit, but with a sufficiently high gel strength in the quiescent state so that sand and cuttings will not settle out in the well if drilling operations are temporarily interrupted for a period of time. Heretofore, gypsum base muds in common use have had high flat gels, that is, high initial and final gels. The viscosity of these muds increased as sand and fine cuttings accumulated, and it was necessary to maintain low viscosity by discarding some of the mud and bringing the remainder up to volume with water and bentonite. This treatment raised the water loss and it was necessary to add starch and carboxymethyl cellulose, which are expensive, to maintain a low water loss. By using a mud as in this invention, with a low initial gel strength without watering-back, that is, the addition of more water, the cuttings nevertheless do settle out in the mud pit, and also the maintenance cost of replacing discarded mud is eliminated.

In other words or by way of summary, the gypsum base muds utilizing the sulfonated lignin containing additives of our invention and discovery constitute a new drilling mud system of our invention and discovery. Heretofore, calcium sulfate contamination was eliminated by chemical means or the contaminated mud was discarded and new mud substituted. In combination with the additives of our invention calcium sulfate saturated muds, i.e., gypsum base muds, have very desirable drilling mud properties and also the high calcium ion content of these muds is effective in reducing the hydration of certain shales encountered in oil well drilling. This prevents the shales from swelling and closing the bore hole and the shale cuttings from making an excessive amount of thick mud.

Another desirable feature of our gypsum base muds is their thermal stability, a property essential for drilling deep wells in which high temperatures are encountered. These muds of our invention are characterized by their thermal stability at deep well temperatures.

A further important feature of the use of our products or additives is found in providing a mud resistant to gypsum contamination, which may be converted to an oil emulsion mud.

Still another outstanding characteristic of the use of the products or additives of our invention and discovery is found in the providing generally of muds with good thermal stability for drilling deep wells where high temperatures are encountered. Temperatures can very seriously affect the necessary properties of the drilling mud, and therefore it is a very important property of the product and process of this application to provide thermal stability.

The treatment of the drilling mud according to our invention and discovery to control calcium sulfate contamination comprises adding a lignosulfonate thinner or additive which may be derived for example from spent sulfite liquor as hereinabove described, combined with sodium sulfate, said combination being formed in proportions of 1% to 100% by weight of the sodium sulfate based on the said spent sulfite liquor solids, the most advantageous proportion being determined by a pilot test to determine about the proportion necessary to meet the particular situation developed by the drilling. In place of sodium sulfate, other salts such as iron sulfate, aluminum sulfate, sodium sulfite, potassium sodium tartrate, sodium oxalate, sodium phosphate, sodium carbonate, sodium bicarbonate, and their corresponding potassium compounds, i.e., potassium sulfate, potassium sulfite, potassium oxalate, potassium phosphate, potassium carbonate, potassium bicarbonate and mixtures thereof, may be used. All of these compounds react with dissolved calcium sulfate to precipitate calcium salts less soluble than calcium sulfate and produce soluble sulfates. The latter through common ion effect further reduces the solubility of calcium sulfate and hence decreases the calcium ion concentration. In many muds it is desirable to maintain low calcium ion concentration to avoid clay flocculation. Regarding the use of bentonite clays, Rogers states, on page 378 of his text quoted above:

"Sodium bentonite is a highly hydrated, dispersed and ionized member of the bentonite salts and possesses good fluid-loss reducing properties. Calcium bentonite, on the other hand, is poorly hydrated and dispersed and tends to flocculate. This flocculation results in fewer but larger particles which tend to precipitate. As the calcium bentonite forms in increasingly greater percentage the agglomeration of the particles and precipitation result in a decreased viscosity and gel strengths and increased fluid loss properties. The formation of calcium bentonite results in depletion of calcium in the aqueous phase unless replaced by further solution of the contaminants."

Parenthetically, be it particularly noted, that the conditions of the various strata encountered in the drilling of oil and gas wells are so complex and vary so much and vary from area to area that a pilot test should be made to determine what amount of the product or additive of our invention and discovery is effective and what amount is most efficient as is commonly done in the drilling operations for conditioning the particular mud for the particular well being drilled. Such testing commonly continues as the drilling proceeds.

In regard to making the salt of the sulfonated lignin by base exchange, any or all of the sulfonated lignin may be converted and the efficiency of the resultant product will depend on the degree of conversion. As hereinbefore stated, the calcium, magnesium, ammonium or sodium base lignosulfonates are effective in lime base muds but not effective in thinning fresh water muds. On the other hand, the lignosulfonate salts of iron, aluminum, copper and chromium do thin the fresh water muds. Hence, it is necessary to convert the former salts to the latter and the proportion of conversion determines the efficiency.

*Spent sulfite liquor from blow pit with or without fermentation and/or purification and/or fractionation and/or concentration.*

ALKALINE HEAT TREATMENT

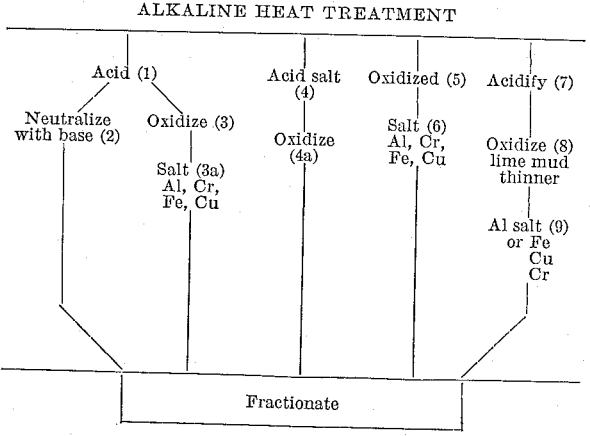

Manifestly, if the starting material was either raw spent sulfite liquor as it comes from the blow pit or if it was fermented spent sulfite liquor without further purification or fractionation, then any of the products of our invention as set forth in the above outline of the possible manifold treatments within our invention, may be further purified or fractionated by adding small increments of lime as herein disclosed or by solvent fractionation, application Serial No. 437,833, filed June 18, 1954, and now abandoned in favor of U.S. Serial No. 803,664. Let it be noted that fractionation of the spent sulfite liquor provides for selection of fractions to yield desired properties in the additive formulated as disclosed herein.

Thus, to follow through in detail, the starting material may be, as previously discussed, either the spent sulfite liquor solids as contained in the spent liquor as received from the blow pit, or these solids refined in various manners, such as by fermentation, lime precipitation, fractionation, etc., is heated at pH 7–10 as disclosed herein. In any case, the solids to be treated are preferably concentrated to 30% to 50% solution. One method of operation, following from point (1) on the chart, is to treat the concentrated liquor with an acid and heat for example for 1 to 2 hours at 95° to 100° C. At this point if calcium sulfate is precipitated, it may be separated, depending on the purity desired in the final product. Said acid treatment may be carried out at less than about pH 4 at temperatures from 50° C. to 180° C. as more full set forth in our co-pending application Serial No. 732,036 (U.S.).

This product can be neutralized with a base such as sodium hydroxide (we mean a compound which yields hydroxyl ions in solution) to a pH above 3.5 so that it can be dried without degradation and then used as such as a limed mud thinner (2) without further treatment; or it can be further improved by oxidation, preferably with an alkaline reagent such as potassium permanganate or sodium dichromate as indicated at point (3) in the outline. Either product may be used as a liquid, or it can be reduced to solids by evaporation and drying. In either case, these products may be used as thinners for drilling muds. Alternatively, the product can be converted to the salt (3a) of iron, chromium, copper, and aluminum, and this is outstanding in the fact that the thinning action is improved for both fresh water and lime base muds.

Again, the acid treatment may be carried out with an acid salt such as ferric sulfate, aluminum sulfate, chromium sulfate, or copper sulfate in such proportions as to also effect a base exchange (4) and yield a product which is effective for thinning all types of water base drilling mud. This product may also be oxidized (4a) to obtain further improvement in mud thinning properties.

Rather than treating with an acid as in (1), the concentrated liquor may be treated directly with an oxidizing agent as in (5). In this case some of the oxidizing agent is required to oxidize the sulfur dioxide which escapes in the case of acid treatment. This oxidized product may be used as a mud thinner, particularly as a lime base mud thinner, or it may be converted to the iron, aluminum, copper, or chromium salt as in (6) whereby the properties are unexpectedly enhanced for thinning both lime base and fresh water muds.

Another and highly effective procedure is to follow the process outlined in our application Serial No. 694,737, involving treatment with alkali. Alternately, the alkali heat treated product may then be acidified with an acid (7) and oxidized (8), whereby a drilling mud thinner particularly effective for lime base muds is obtained, or further processed to form the aluminum, iron, copper and chromium salt (9).

Accordingly, we have discovered that alkali heat treated spent sulfite liquor components and materials identified in general as lignosulfonates are greatly improved in their effectiveness as dispersing agents and for use in drilling muds by treating them with one or both of the following steps:

(1) Oxidizing said spent sulfite liquor components.
(2) Treating to form a salt having an element selected from the group consisting of iron, aluminum, chromium, and copper.

The order of the above steps or treatment (oxidizing or forming a salt) is immaterial.

Continuing our treatment against contamination by calcium sulfates, the product resulting from both steps 1 and 2, or the product of step 2, is treated with a salt in the proportion of 1% to 100% of the lignosulfonate solids of said spent sulfite liquor solids, selected from the group consisting of sodium sulfate, sodium sulfite, potassium sodium tartrate, sodium oxalate, sodium phosphate, sodium carbonate, sodium bicarbonate, aluminum sulfate, iron sulfate, and their corresponding potassium compounds and mixtures thereof.

*Method of Testing.*—Specific examples of treatment, together with tables showing results of tests of the materials, will now be set forth. The method of making the tests is that commonly followed in the drilling industry.

The sulfonated lignin additives of our invention may be used in many ways, but chief among these is that revealed in drilling muds. For this purpose a material is required which will bring about a lowering in viscosity of the complex clay suspension which is termed the drilling mud, and will also serve to decrease its gel strength and water loss characterstics. The accepted methods for evaluating materials to ascertain their utility for drilling muds are described in the publication entitled "American Petroleum Institute Code 29," third edition, May 1950—"Recommended practice on standard field procedure for testing drilling fluids." This manual is prepared and published by the American Petroleum Institute, Division of Production, Dallas, Texas, and is used throughout the industry for testing drilling muds.

In making the laboratory tests on drilling muds according to the procedures mentioned above, it is necessary to use a clay or combination of clays. In general, clays are of extremely wide distribution in the earth's surface and are complex and difficult to define chemically. For example, H. A. Ambrose, Ph. D., and A. G. Loomis, Ph. D., state regarding drilling mud clays: ". . . analysis tells us little with respect to the properties required in drilling. There has been no correlation between chemical analysis and clays and their suitability for drilling purposes, . . ." (The Science of Petroleum, volume I, page 458, 1938, Oxford University Press (London).) Although clays have been divided into several classes according to their chemical and physical form, the materials encountered or used in drilling muds are mixtures of said clays and so it has become practically accepted to define these materials in terms of what is termed "yield value." According to practice then ("Principles of drilling mud control," 8th edition, pages 2 and 3, published by the American Association of Oil Well Drilling Contractors, Dallas, 1951) clays are defined in terms of yield value, which is the number of barrels of 15 cp. mud that can be prepared from a ton of material along with water. Thus, in the examples, we refer to the use of natural clay and define the "yield value" to characterize the type of clay which would give similar results.

By following the standard methods identified above and using clays of defined yield value, the efficacy of the sulfonated lignin additives of our invention is measured in terms of initial gel strength, viscosity, ten-minute gel strength, and water loss.

The Stormer viscometer has been used almost universally in making viscosity measurements according to the standard methods of the American Petroleum Institute. Also let it be noted that another means of measuring viscosity is a motor driven rotational viscometer known as the Fann V–G meter (viscosity-gel). This instrument measures two factors of viscosity called "yield value" of fluids and "plastic viscosity" which are so related that two times the plastic viscosity plus the yield value is proportional to the viscosity at 600 r.p.m. Since the plastic viscosity is essentially constant for any one mud, the variation of the yield values indicated directly the variation of viscosity and therefore the yield value is reported in the tables where the measurements were made with the Fann instrument.

Generally only the yield value of the drilling mud is affected by the addition of thinners. Yield values are reduced by drilling mud thinners but plastic viscosity is affected very little. The plastic viscosity can only be changed by adding to or removing water from the mud. The Fann V–G meter type of instrument is preferred for drilling muds since it indicates whether thinners are needed to lower yield or whether water is needed to decrease plastic viscosity.

The viscosity factor "yield value" of fluids defined above should not be confused with "yield value" of a clay which has been defined hereinabove as the number of barrels of 15 cp. mud that can be prepared from a ton of clay along with water.

*Mud test procedures.*—The following mud test procedures describe in detail the mud preparation and testing procedures used. The clays defined in the test procedures given below were used in Examples I–VI. Clays in other examples are defined therein but have about the same yield value.

*Lime mud test procedure.*—Sixty grams of a commercial rotary drilling clay with a yield value of 45 barrels of 15 centipoise mud per ton of clay were mixed with 325 milliliters of distilled water in a Hamilton Beach No. 30 "Drinkmaster" mixer for 15 minutes at 15,000 r.p.m., and then aged by rolling, i.e., agitating in pint bottles overnight at room temperature. The aged mud was "broken over" to a limed mud by adding 6 grams of calcium hydroxide, 6 milliliters of sodium hydroxide solution containing 0.25 grams sodium hydroxide per milliliter, and the sulfonated lignin containing material additive to be tested (each gram added equivalent to 1 pound per barrel) and mixing for 5 minutes at high speed. "Broken over" is a term used in the industry to denote the procedure and the accompanying change in properties which occur when an excess of calcium hydroxide and sodium hydroxide is added to a clay with intimate mixing as next above set forth. The mud was then returned to the bottle and again rolled overnight at room temperature, and finally mixed another 5 minutes immediately before determining viscosity, gels and water loss by the standard procedure of the American Petroleum Institute.

*Fresh Water Mud Test Procedure.*—Thirty grams of a commercial sodium bentonite rotary drilling clay with a yield value of 92 barrels of 15 centipoise mud per ton of clay were mixed with 335 milliliters of distilled water in a Hamilton Beach No. 30 "Drinkmaster" mixer at 15,000 r.p.m. for 15 minutes and then aged by rolling overnight in pint bottles at room temperature. The thinner additive (each gram added equivalent to 1 pound per barrel) and sodium hydroxide to give the desired pH were then added, the mud mixed 5 minutes, and again rolled overnight at room temperature. A final 5 minute mix was made immediately before measuring viscosity, gels, and water loss by the standard methods of the American Petroleum Institute. The mud may be returned to the bottle and rolled a further 24 hours at 150° F. and then retested to obtain information on the effect of temperature. Higher temperature aging is described in Example XI.

*Gyp Mud Test Procedure.*—The gyp (or gypsum base) mud test procedure is the same as the fresh water mud test procedure except that 6 grams (each gram added equivalent to 1 pound per barrel) of the plaster of Paris $$(CaSO_4 \cdot \tfrac{1}{2} H_2O)$$

were added together with the thinner additive, and the mud was subsequently mixed for 20 minutes instead of 5 minutes.

*Oil Emulsion Test Procedure.*—The base mud is prepared as described above and may be any of the types such as lime base, gysum, fresh water and salt water muds. After adding the thinner additive being tested and making the standard tests for gels, viscosity and water loss, 10 to 20% by weight of diesel oil is mixed into the mud with a high speed mixer at 15,000 r.p.m. and the resulting oil in water emulsion mud tested for gels, viscosity and water loss by the standard API procedures. Note that the term "thinner" is used in the art in reference to agents or additives for reducing the viscosity of drilling mud.

EXAMPLE I

This example ilustrates the procedure for fractionating spent sulfite liquor by lime precipitation to obtain calcium lignosulfonate fractions with better drilling mud thinner properties than the original spent sulfite liquor.

One thousand grams of spent sulfite liquor solids in 10% water solution were heated to about 85° C. and lime slurry was added (130 grams of calcium oxide), whereupon an appreciable amount of organic precipitate was obtained. (Temperature not critical, 85° C. equals temperature of liquor as received from blow pit.) This small precipitate settled rapidly and was separated by decanting and recovered as a cake by centrifuging the thick slurry. Further fractions were recovered successfully in the same manner by adding 25 gram increments of lime and removing the precipitates formed. The precipitates were washed by decantation with saturated lime water to prevent resolution by water during washing, then redissolved by adding sulfuric acid to pH 5 to 6 and dried after removing by filtration calcium sulfate. Results of the fractionation are shown in Table 1.

*Table 1 of Example I*

FRACTIONATING OF SPENT SULFITE LIQUOR BY LIME PRECIPITATION

| Fraction No. | Cumulative Lime Added, Percent of Spent Sulfite Liquor Solids Originally Present in Solution | pH | Yield of Calcium Lignosulfonate, Percent of Spent Sulfite Liquor Solids | Diffusion Coefficient mm.²/day |
|---|---|---|---|---|
| 1 | 13.0 | 10.2 | 14.4 | 5.8 |
| 2 | 15.5 | 10.8 | 4.5 | 6.5 |
| 3 | 18.0 | 11.3 | 10.0 | 7.3 |
| 4 | 20.5 | 11.8 | 4.6 | 8.7 |
| 5 | 23.0 | 12.1 | 4.6 | 9.7 |
| 6 | 25.5 | 12.2 | 4.7 | 10.4 |
|   |      |      | 42.8 |      |

In redissolving, other acids than sulfuric may be used in lowering the pH of the separated precipitate and bringing about solution. It may be preferred to use an acid such as carbonic, sulfurous, or oxalic, which are characterized by giving insoluble compounds with calcium whereby excess calcium is removed from the product. In some types of drilling mud, it is desirable to have the additive as free as possible of soluble salts, so that acids such as hydrochloric and acetic which form soluble calcium salts would not be desirable, although for some purposes they could be used. Also the precipitate can be dissolved by adding a salt which gives by base exchange an insoluble calcium salt, i.e., sodium, iron, chromium, copper, aluminum, magnesium ammonium, etc. sulfates, phosphates, oxalates, sulfites, etc. Thus the desired iron, copper, aluminum, and chromium salts can be made directly.

It will be understood that any fraction will dissolve if the pH is lowered below the pH at which it was precipitated, but the additon of sulfuric acid to provide pH 5 or 6 is helpful in giving quick solutions and approximately neutral products. Thus, we have discovered that it is possible to divide the lignosulfonates of spent sulfite liquor into several fractions by adding as the first step a relatively small or minute amount or an increment of lime, that is, 130 grams in 10,000 grams of spent sulfite liquor of 10% concentration which caused to precipitate an appreciable, i.e., recoverable, amount of organic precipitate, namely 14.4%, and also we discovered, contrary to expectations, that said amount settled out surprisingly rapidly. This precipitate was separated out as fraction No. 1. Then, as a second step a small amount or increment of lime, i.e., 25 grams (CaO) was added to the remaining solution, whereupon a second small amount, 4.5% of the original spent sulfite liquor solids, was precipitated and this likewise rapidly. This was separated. Successively the above steps were repeated until six fractions were removed.

Differences in drilling mud thinner properties of the fractions, the molecular weights of which are illustrated and identified in Table 2 of Example I.

*Table 2 of Example I*

LIMED MUD TESTS ON FRACTIONS OF SPENT SULFITE LIQUOR PREPARED BY LIME PRECIPITATION

| Fraction No. | Lb./bbl. | Initial Gel, gms. | Visc. | 10 Gel., gms. | Water Loss, cc. |
|---|---|---|---|---|---|
| Original Spent Sulfite Liquor | 4 | 100 | 29.0 | 250 | 21.9 |
| 1 | 4 | 20 | 43.2 | 30 | 16.7 |
| 2 | 4 | 0 | 15.0 | 60 | 14.0 |
| 3 | 4 | 0 | 9.8 | 40 | 14.2 |
| 4 | 4 | 0 | 11.0 | 60 | 15.0 |
| 5 | 4 | 0 | 12.3 | 100 | 15.3 |
| 6 | 4 | 10 | 14.0 | 160 | 16.2 |

Table 1 of Example I shows that the calcium lignosulfonates were fractionated into fractions of different molecular weight as shown by the diffusion coefficient data. Table 2 of Example I shows that fraction 3 was the most effective drilling mud thinner because of the greatest reduction in the properties noted which particularly means that less water is required to give a pumpable mud drilling fluid with a minimum of water loss all of which properties are of most fundamental importance in oil and gas well drilling. Of course, the fractionation may be varied by adding smaller amounts of lime to give smaller fractions characterized by having more uniform molecular weight distribution, or a fraction may be made including parts of fractions 2 and 4 in fraction 3. Thus is made most manifest the wide scope, advantages, and flexibility of our invention and discovery.

Also, this example illustrates that our invention and discovery teaches that by proper manipulation the organic precipitate can be obtained between pH 10.0 and 12.0 from spent sulfite liquor upon adding lime, and can be recovered as a number of calcium lignosulfonate fractions of different molecular weights. We also have discovered that these different fractions exhibit different improved properties, thereby making it possible to select the improved fraction in supplying a product exhibiting the exact or more nearly exact properties required for a particular application.

EXAMPLE II

One method of preparation of iron, chromium, copper and aluminum salts of sulfonated lignin-containing materials derived from wood pulping liquors is described in this example. By way of example the starting material was chosen to give products with particularly effective thinning properties for aqueous suspension of clay material used for drilling mud. This starting material was a concentrated and fermented calcium base spent sulfite liquor given an alkaline pretreatment according to the method of our invention, U.S. patent application Ser. No. 694,737. The preparations were made and the products tested as follows: One thousand grams of concentrated calcium base spent sulfite liquor derived from paper pulp production and having the fermentable carbohydrates substantially removed by fermentation and having an alkalinity value about pH 4, containing 47.5 pounds of dissolved solids per 100 pounds of solution, were treated with 74 grams of sodium hydroxide solution (containing 50% by weight of sodium hydroxide) at 80° C. with mild agitation for 20 hours. The pH was then 7.9. For the preparation of each salt, 211 grams of this solution was diluted with 89 cc. of water to make a 25% solution and reacted with solutions (25% in water) containing 20 grams of aluminum sulfate (17% $Al_2O_3$), 20 grams of ferric sulfate ($Fe_2(SO_4)_3 \cdot 9H_2O$), 35 grams of copper sulfate ($CuSO_4 \cdot 5H_2O$), or 20 grams of chromium potassium sulfate ($CrK(SO_4)_2 \cdot 12H_2O$), respectively, and the resulting precipitates of calcium sulfate were filtered off. The products were dried at 60° C. and tested as fresh water mud thinners using 1.5 pounds of thinner per barrel of mud.

It is clear from the results set forth in the following table that thinning action is obtained with all of these salts of the spent sulfite liquor components comparable with that of quebracho in fresh water muds at a pH of both 9.5 and 12. The preferred salt, based on its efficiency as a thinner, is the iron salt, although in muds having a pH of 12 the chromium salt shows even more enhanced properties, i.e., it provides a product with more effective properties, particularly in that it gives a greater viscosity lowering for a given concentration.

It is to be noted that when these products are prepared from spent sulfite liquor some acidity is developed during base exchange and must subsequently be neutralized as hereinbefore described in Example I. It is therefore advantageous to add the sodium hydroxide to the spent sulfite liquor first by way of preparing our additive according to U.S. application Serial No. 391,116, which thereby provides a more desirable starting material and at the same time provides the sodium hydroxide necessary for the final neutralization.

*Table 1 of Example II*

THINNING OF FRESH WATER MUD BY ALUMINUM, IRON, COPPER AND CHROMIUM SALTS OF SPENT SULFITE LIQUOR ADDITIVE U.S. APPLICATION SERIAL NO. 694,737 [1]

| pH | Agent Added | I.G. | Visc. | 10 G. | W.L. |
|---|---|---|---|---|---|
| 9.5 | Original Mud (No agent) | 80 | 52.5 | 170 | 9.2 |
|  | Aluminum Salt | 3 | 31.5 | 400 | 9.9 |
|  | Iron Salt | 7 | 30.3 | 140 | 7.0 |
|  | Chromium Salt | 10 | 35.1 | 100 | 7.7 |
|  | Copper Salt | 5 | 37.0 | 130 | 8.7 |
|  | Quebracho | 20 | 40.5 | 170 | 7.9 |
| 12.0 | Original Mud (No agent) | (²) | (²) | (²) | (²) |
|  | Aluminum Salt | 50 | 63.0 | 450 | 8.7 |
|  | Iron Salt | 5 | 27.7 | 150 | 7.2 |
|  | Chromium Salt | 0 | 22.5 | 100 | 7.5 |
|  | Copper Salt | 0 | 25.5 | 130 | 8.0 |
|  | Quebracho | 5 | 21.5 | 160 | 7.5 |

[1] U.S. application Serial No. 391,116 filed November 9, 1953 abandoned in favor of Serial No. 694,733 and Serial No. 694,737, both filed November 6, 1957.
[2] Very thick, too thick to measure.

EXAMPLE III

To illustrate the effect of the degree of oxidation on the fresh water mud thinning properties of iron salts of fermented spent sulfite liquor solids, a number of samples of iron salts were prepared as described in Example II and then oxidized by heating for one hour at 95° C. with 2, 4, 6, 8 and 10% of potassium dichromate before drying at 60° C. The results of fresh water mud tests made at pH 12.0 with 0.5 pounds of thinner per barrel are as follows: (the pH was chosen for these tests because muds of this pH are generally more difficult to thin).

*Table 1 of Example III*

EFFECT OF DEGREE OF OXIDATION OF THINNER ON FRESH WATER MUD THINNING

| Oxidation (Percent Potassium Dichromate) | I.G. | Visc. | 10 G. | W.L. |
|---|---|---|---|---|
| 0 | 80 | 53.5 | 270 | 7.5 |
| 2 | 30 | 38.0 | 180 | 7.1 |
| 4 | 10 | 34.0 | 160 | 7.1 |
| 6 | 10 | 32.6 | 190 | 7.4 |
| 8 | 15 | 31.4 | 190 | 7.5 |
| 10 | 10 | 28.0 | 200 | 7.9 |

The data of Table 1 Example III show improvement through continued decrease in viscosity of the fresh water muds at pH 12.0 as the degree of oxidation increases up to 10% of sodium dichromate. The concentration of spent sulfite liquor solids affects the amount of oxidant which can be advantageously added without formation of an insoluble gel. In this experiment, sodium dichromate was added as a 25% solution in water to spent sulfite liquor having a total solids concentration of about 40% by weight. Thus, a continued improvement in drilling mud thinner properties was discovered and this effect of increase of oxidant is shown in Table 1 of Example III. Furthermore Table 2 of Example III illustrates that water soluble products were obtained with much larger amounts of oxidant by adding dilute solutions of the oxidant to dilute spent sulfite liquor. Table 2 establishes that the improvement in drilling mud thinning properties continued as the amount of oxidant increased to about 14% of sodium dichromate. At this point the viscosity of the mud being tested began to increase whereas the water loss continued to decrease to an addition of about 18% of the sodium dichromate. Thus, the water loss factor continued to improve at least to 18% sodium dichromate addition. Moreover at 50% sodium dichromate addition the treated mud is appreciably benefitiated in comparison with the untreated gypsum mud.

*Table 2 of Example III*

*Range of Dichromate.*—The following experiments were made to illustrate the effect of varying degrees of oxidation on gyp-mud thinning properties of iron salts of fermented spent sulfite liquor solids. Samples were made using various amounts of sodium dichromate and tested as drilling mud thinners.

The preparation was started by making a quantity of evaporated, fermented spent sulfite liquor alkaline to pH 8 with sodium hydroxide, and then heating in an open container at 80° to 90° C. for 24 hours, while adding sodium hydroxide at intervals as needed to maintain the pH at 8.0. Next 15% of ferric sulfate (24.5% Fe) was added as a 30% solution in water, and finally 7% of sodium dichromate dihydrate was added as a 25% solution with vigorous agitation at a temperature of 60° C. All additions are based on the weight of the fermented spent sulfite liquor solids. The mixture was heated to 90° C. in a hot water bath and centrifuged to remove the precipitate of calcium sulfate. The clarified liquor was then divided into several parts, each diluted to 10% solids and 10% solutions of sodium dichromate added to increase the dichromate to 14.0, 18.0, 20.0, 21.0 and 24.0% respectively by weight of the said spent sulfite liquor solids. Sulfuric acid was added to control the acidity at pH 3.5 while adding the sodium dichromate.

Two additional samples were prepared with the addition of 40% and 50% of sodium dichromate to a sample of fractionated fermented spent sulfite liquor solids containing 17% of reducing substances determined as glucose and the remainder of the spent sulfite liquor solids predominantly low molecular weight lignosulfonates. Said sample of fractionated spent sulfite liquor was obtained by alcohol fractionation. The sodium dichromate was added as a cold 2.5% solution to a cold 2.5% solution of the said spent sulfite liquor solids while adding sulfuric acid to maintain the pH at 3.0. Since the high dichromate usage results in chromium ion concentrations equivalent to the addition of excess chromium sulfate over that necessary for base exchange of the calcium in the starting material, no salt such as chromic sulfate or ferric sulfate was added to give fresh water thinning properties. The sulfuric acid added to maintain pH 3.0 was sufficient to precipitate the calcium as calcium sulfate. The latter was removed but does not necessarily have to be removed for effective use in gyp-mud. Calcium sulfate should be removed for use in fresh water mud.

The product liquors as set forth above were heated to 80° C. to insure completion of the oxidation and then dried at 60° C. for testing.

The oxidized products were tested as thinners for a gypsum base mud using about 6.0 pounds per barrel of thinner to compare their relative value as mud thinners and as water loss reducing agents. The mud test results, Table 2 of Example III, show the water loss results improve on increasing the sodium dichromate to about 18%. Mud thinning results become poorer above 7% of sodium dichromate, but said oxidized products are operable as drilling mud thinners over the range of 1% to 50% sodium dichromate.

An especially useful effect of using larger amounts of sodium dichromate oxidation is improved stability to high temperatures. This effect is shown in Table 3 where the properties of muds thinned with 4.0 pounds per barrel of the samples were prepared as above with 4% and 14% of sodium dichromate respectively are compared in gypsum base mud after aging the mud for 20 hours at 350° F.

The mud test results, Table 3, show that the sample prepared with 4% of sodium dichromate increased on aging in yield, gels and water loss where as the sample prepared with 14% of sodium dichromate actually decreased in yield and gels on aging at 350° F. and did not increase as much in water loss. A special and demanding need for mud thinners stable to high temperatures has been recognized as higher temperatures were encountered on deeper drilling.

*Table 2 of Example III*

EFFECT OF AMOUNT OF SODIUM DICHROMATE OXIDATION ON MUD THINNING PROPERTIES

[Untreated Gyp-Mud, Yield 19.0, API Water Loss 32.4]

| Percent Sodium Dichromate Based on SSl Solids | Percent Cr in Product | Mud Yield Value at 6 Lbs./bbl. Thinner | API Water Loss At 6 Lbs./bbl. Thinner |
|---|---|---|---|
| 7.0 | 2.5 | 3.5 | 9.4 |
| 14.0 | 4.9 | 5.0 | 8.1 |
| 18.0 | 5.6 | 7.5 | 6.8 |
| 20.0 | 6.2 | 11.5 | 7.4 |
| 21.0 | 6.5 | 11.5 | 13.2 |
| 24.0 | 7.0 | 13.5 | 12.5 |
| 40.0 | 8.9 | 14.5 | 12.8 |
| 50.0 | 10.4 | 18.5 | 13.6 |

*Table 3 of Example III*

THERMAL STABILITY AT 350° F.

| Sample | Lbs./bbl. | Rolled Overnight Room Temp. | | | | | | Aged 20 Hrs. 350° F. | | | | | |
|---|---|---|---|---|---|---|---|---|---|---|---|---|---|
| | | pH | I.G. | PV | Y | 10 G. | W.L. | pH | I.G. | PV | Y | 10 G. | W.L. |
| 4% Dichromate | 4.0 | 8.2 | 2.0 | 6.0 | 8.0 | 14.0 | 10.0 | 8.2 | 22.0 | 6.0 | 30.0 | 43.0 | 28.0 |
| 14% Dichromate | 4.0 | 8.2 | 3.0 | 5.5 | 6.0 | 9.0 | 8.4 | 7.5 | 1.0 | 6.0 | 1.0 | 7.0 | 18.3 |

PV = plastic viscosity.
Y = yield value.

EXAMPLE IV

This example illustrates on the one hand, the improvement in fresh water mud thinner properties and, on the other, the poorer results obtained in limed muds by adding an excess, i.e., more than the amount of iron, aluminum, copper or chromium sulfate necessary to base exchange the calcium in spent sulfite liquor solids. Spent sulfite liquor solids (about 40% concentration) were oxidized with 8% of potassium dichromate by heating in aqueous solution at 95° C. for one hour. Two samples or portions of said oxidized spent sulfite liquor were prepared, one was mixed with 20% (base exchange) and the other with 35% by weight of aluminum sulfate (17% $Al_2O_3$). It will be noted that about 23% is equivalent for base exchange. Thus, the second sample had an excess over base exchange of about 12%. After filtering off the precipitate of calcium sulfate, the products were dried at 80° C. and tested as fresh water and limed mud thinners. The results are shown in the following table:

*Table 1 of Example IV*

EFFECT OF THE AMOUNT (I.E., CONCENTRATION) OF ALUMINUM SULFATE ON THINNING PROPERTIES

Fresh Water Mud Test Using 0.5 lb. per bbl. at pH 9.5

|  | I.G. | Visc. | 10 G. | W.L. |
|---|---|---|---|---|
| 20% Aluminum sulfate | 15 | 40.5 | 170 | 8.7 |
| 35% Aluminum sulfate | 10 | 35.3 | 170 | 9.0 |
| Base fresh water mud | 80 | 52.5 | 170 | 9.2 |

Limed Mud Tests at 4 lbs. per bbl.

|  | I.G. | Visc. | 10 G. | W.L. |
|---|---|---|---|---|
| 20% Aluminum sulfate | 0 | 15.0 | 110 | 20.0 |
| 35% Aluminum sulfate | 20 | 33.0 | 240 | 20.0 |

It is apparent from these figures that the effect of the concentration of aluminum sulfate added in making the aluminum salt on the thinning properties of the product is different for fresh water muds than for lime base muds. In the case of fresh water muds the initial gel and viscosity are both improved, that, lowered whereas in the limed mud, the excess makes the properties poorer. Manifestly, if the product is to be used only in fresh water muds, the product having the excess of aluminum sulfate is preferred, but if the product is to be prepared for use optionally in either fresh water or lime base muds, then the equivalent, or the amount of aluminum sulfate necessary for base exchange of the calcium, would be preferred.

*Tables 2 and 3 of Example IV*

The following example illustrates the improved drilling mud thinning properties in both fresh water and gypsum mud resulting from the addition of an excess of iron sulfate over that required for a base exchange in spent sulfite liquor. Similar results are obtained with an excess of chromium sulfate, aluminum sulfate or copper sulfate. The sulfate ion is essentially removed by neutralizing with lime.

Fermented spent sulfite liquor was reacted with various amounts of ferric sulfate (24.5% Fe) from 15% to 80% by weight of the spent liquor solids. The ferric sulfate was dissolved in water to make about a 30% solution and then poured into the hot concentrated (about 48% total solids) spent liquor with stirring. After digesting overnight at 85°–90° C. the acid mixture was neutralized to pH 4 by adding lime slurry, centrifuged to remove calcium sulfate, and dried in an air stream at 60° C.

The dried products were tested as mud thinners in both fresh water and gypsum base muds. These muds were prepared as herein before described using 45.5 lbs. per barrel of a mixture of clays containing 6 parts of a commercial drilling clay having a "yield value" of 45 barrels of 15 cp. mud per ton of clay and one part of a commercial drilling clay having a "yield value" of 95 barrels of 15 cp. mud per ton of clay.

In the case of the fresh water mud test two pounds per barrel of the sample was added to the mud and sufficient sodium hydroxide added to adjust the pH of the mud to 9.5 and mixed for 5 minutes on a high speed mixer. The muds were then placed in sealed glass bottles, rolled overnight at room temperature and finally heat aged by rolling for 20 hours at 150° F. The muds were then tested for yield values and gels by the standard API test method. The test results are shown in Table 2 of Example IV. To test the samples in gypsum mud, 4 lbs. per barrel of the sample together with 6 lbs. per barrel of plaster of Paris were added to the mud together with sufficient sodium hydroxide (1 ml.=0.25 g. NaOH) to obtain a final pH value of 8.2. The muds were mixed for 20 minutes at high speed in a Hamilton Beach "Drinkmaster" No. 30 mixer. The muds were then placed in sealed bottles, rolled overnight at room temperature and heat aged by rolling for 20 hours at 150° F. The muds were then tested for yield values, gels and API water loss. The test results are shown in Table 2 of Example IV.

With reference to Table 2 of Example IV, it is shown that substantial improvement is attained in both fresh water and gysum base muds by the addition of excess ferric sulfate, and that the greatest improvement in all properties is attained in the range of 20% to 60% addition of ferric sulfate (24.5% Fe) on the fermented spent sulfite liquor solids. This additon is equivalent to about 17% to 52% of the anhydrous ferric sulfate, the lower figure being a little more than required for base exchange. The choice of the percentage employed is determined by the particular property most desired.

About 17.7% of ferric sulfate (24.5% Fe) is required to completely base exchange iron for calcium in the spent sulfite liquor and the amount added above 17.7% is therefore excess ferric sulfate above base exchange. That the excess iron is bound chemically by the spent sulfite liquor solids can be shown by the failure of iron to precipitate when solutions of the test samples are made alkaline by the addition of sodium hydroxide. The product therefore appears to have the characteristics of a complex salt. Thus, although we speak of the metals being present as cations, because of the possibility of the formation of a complex salt, the metals may not be entirely present as cations. But in any case, the metal is present in soluble form and we herein refer to these metals as being present as cations, and as being associated with the sulfonated lignin-containing material.

Similar results were obtained with ferrous sulfate in place of ferric sulfate.

*Table 2 of Example IV*

EFFECT ON THINNING PROPERTIES OF INCREASING THE CONCENTRATION OF FERRIC SULFATE

| Ferric Sulfate Addition (Percent of SSL Solids) [1] | Yield Value of Mud (lb./100 sq. ft.) | 10 Minute Gel (lb./100 sq. ft.) | Water Loss, cc. |
|---|---|---|---|
| Tests With Sodium Base Mud: | | | |
| Base Mud | 54.0 | 107.0 | 12.0 |
| 15 | 35.5 | 48.0 | 10.7 |
| 20 | 34.0 | 52.0 | 9.4 |
| 30 | 20.5 | 41.5 | 9.2 |
| 40 | 15.0 | 43.0 | 9.0 |
| 60 | 18.0 | 42.0 | 10.5 |
| 80 | 29.0 | 66.0 | 11.4 |
| Tests With Gypsum Mud: | | | |
| Base Mud | 19.0 | 30.0 | 32.4 |
| 15.0 | 13.5 | 23.0 | 17.4 |
| 20.0 | 13.0 | 18.0 | 16.8 |
| 30.0 | 12.5 | 16.5 | 14.8 |
| 40.0 | 3.0 | 9.0 | 14.9 |
| 60.0 | 4.0 | 7.0 | 16.8 |
| 80.0 | 8.0 | 15.0 | 18.4 |

[1] SSL=spent sulfite liquor in this case fermented.

*Table 3 of Example IV*

The limit of the addition of the sulfate salts of iron, aluminum, copper and chromium to the oxidized salts is different for each salt, because it varies for each metal and also with the degree of hydration of the sulfate salts. To obtain an indication of the maximum amount of these salts which can be added an experiment was made in which oxidized spent sulfite liquor samples were prepared containing the chemical equivalent of these salts to 80% excess of ferric sulfate (24.5% iron). The excess means the amount of salt over that required to bring about the base exchange. Thus the salts were added in the following proportion, 80 of ferric sulfate (24.5% Fe), 104 of aluminum sulfate (17% $Al_2O_3$), 130 of copper sulfate ($CuSO_4 \cdot 5H_2O$) and 69 of chromic sulfate ($Cr_2(SO_4)_3$). These amounts of the salts in separate solutions were added to separate portions of the product of Example VIII which is an oxidized iron salt neutralized to pH 3.5 with sodium hydroxide and the solution dried and the solids ground to a fine powder. These products all showed some tendency to thin the fresh water mud. The aluminum and copper preparations were more effective than the chromium, and the iron formulation was the poorest in thinning properties with this concentration of excess salts. The results show that above an addition of about 70% of the anhydrous salt little or no improvement was brought about in a fresh water mud. Based on an equivalent basis, the maximum amount of the sulfate salts which can be added is about that equivalent to an excess of 70% of anhydrous ferric sulfate based on the spent sulfite liquor solids.

*Table 3 of Example IV*

EFFECT OF EXCESS[1] ADDITION OF SULFATE SALTS TO OXIDIZED IRON SALT AS TESTED IN FRESH WATER MUD

[Addition Equivalent to 80% Excess Ferric Sulfate, 24.5% Fe]

|  | Grams added per 100 g. of SSL solids | Grams of anhydrous salt added | Lb. per bbl. | Initial Gel | Yield Values | 10 Min. Gel | Water Loss, cc. |
|---|---|---|---|---|---|---|---|
| Base Fresh Water Mud | | | 0 | 27 | 54 | 107 | 12.0 |
| Ferric Sulfate (24.5% Fe) | 80 | 70 | 2 | 24 | 60 | 89 | 11.5 |
| Aluminum Sulfate (17% $Al_2O_3$) | 104 | 60 | 2 | 15 | 16 | 82 | 13.0 |
| Copper Sulfate ($5H_2O$) | 130 | 83 | 2 | 18 | 17 | 67 | 13.6 |
| Chromic Sulfate | 69 | 69 | 2 | 16 | 24 | 53 | 11.9 |

[1] "Excess" means amount over that required for base exchange.

*Tables 4 and 5 of Example IV*

This example illustrates the improvement in fresh water mud thinning properties brought about by adding an excess of sulfate salt, i.e., more than the amount of iron, chromium, aluminum, or copper sulfate necessary to base exchange the calcium in spent sulfite liquor solids, neutralizing with lime and removing the precipitated calcium sulfate. Removal of calcium sulfate is not necessary but is desirable for general use.

The samples were prepared as follows: A quantity of fermented spent sulfite liquor concentrated to 47.5% of non-volatile solids was heated to 85° C. and sodium hydroxide added as a 50% solution to adjust the alkalinity value to pH 8.0. The liquor was heated at 85° C. for 24 hours adding sodium hydroxide to maintain the pH at 8.0. Approximately 5% of sodium hydroxide was added based on the spent sulfite liquor solids. The product liquor was diluted to 25% non-volatile solids and divided into 200 gram portions. Alum was added as a 25% solution to provide 10, 20, 30, 40 and 50 grams of aluminum sulfate (17% $Al_2O_3$) or 20, 40, 60, 80 and 100% based on the spent sulfite liquor solids. It will be noted that about 11 grams is equivalent for base exchange. The mixtures were heated 1 hour at 80–90° C., neutralized to pH 3.5 to 4.0 with lime slurry, centrifuged to remove calcium sulfate and dried at 60° C. for testing as fresh water and limed mud thinners.

The dried products were tested as mud thinners in both fresh water and limed muds. These muds were prepared as hereinbefore described using a base mud mixture having 45.5 pounds per barrel of a mixture of clays containing 6 parts of a commercial drilling clay having a "yield value" of 45 barrels of 15 cp. mud per ton of clay and 1 part of a commercial drilling clay having a "yield value" of 95 barrels of 15 cp. mud per ton of clay, and one part of a commercial drilling clay having a "yield value" of 95 barrels of 15 cp. mud per ton of clay.

*Table 4 of Example IV*

EFFECT OF THE AMOUNT (I.E., CONCENTRATION) OF ALUMINUM SULFATE ON THINNING PROPERTIES

Fresh Water Mud Test Using 2.0 lb. per barrel at pH 9.5 Muds Aged by Rolling 20 Hrs. 150° F.

| Percent Aluminum Sulfate Added (17% $Al_2O_3$) | I.G. | Yield | 10 G. | W.L. |
|---|---|---|---|---|
| Base F.W. Mud | 27.0 | 54.0 | 107.0 | 12.0 |
| Calcium Salt | 25.0 | 46.5 | 46.5 | 10.9 |
| 20 | 9.0 | 23.0 | 64.0 | 13.9 |
| 40 | 8.0 | 15.5 | 86.0 | 15.8 |
| 60 | 8.5 | 13.0 | 92.0 | 14.6 |
| 80 | 8.0 | 13.0 | 118.0 | 16.0 |
| 100 | 28.0 | 38.0 | 63.0 | 15.7 |

Limed Mud Tests Using 4.0 Lbs./bbl. Muds Aged By Rolling 20 Hrs. at 150° F.

| | I.G. | Yield | 10 G. | W.L. |
|---|---|---|---|---|
| Calcium Salt | 3.0 | 6.0 | 43.0 | 18.2 |
| 20 | 1.0 | 3.0 | 1.0 | 18.5 |
| 40 | 1.0 | 2.5 | 1.0 | 18.3 |
| 60 | 1.0 | 4.0 | 20.0 | 21.6 |
| 80 | 3.5 | 6.0 | 37.0 | 20.5 |

With reference of Table 4 of Example IV, optimum thinning is obtained in fresh water mud with about 40 to 60% of aluminum sulfate (2 to 3 times the base exchange) and mud thinning is obtained up to about 100% of aluminum sulfate (5 times the base exchange). In limed muds the base exchange (about 20% aluminum sulfate) gives a marked improvement in thinning over the calcium salt but further additions make no appreciable improvement. Above 40% aluminum sulfate the limed mud thinning becomes poorer and at 80% (4 times the base exchange) the mud thinning is approximately the same as with the original calcium salt.

*Table 5 of Example IV*

RESULTS FOR ADDITION OF 60% OF IRON, ALUMINUM, COPPER AND CHROMIUM SULFATE

Fresh Water Mud Tests Using 2.0 lb. per barrel at pH 9.5

| Salt | Calcium hydroxide to neutralize product to pH 3-4 (percent) | I.G. | Yield | 10 G. | W.L. |
|---|---|---|---|---|---|
| Base F.W. Mud | | 27.0 | 54.0 | 107.0 | 12.0 |
| Calcium | | 25.0 | 46.5 | 46.5 | 10.9 |
| Aluminum | 10.0 | 8.5 | 13.0 | 92.0 | 14.6 |
| Copper | 0 | 2.5 | 7.5 | 42.0 | 13.7 |
| Iron | 14.0 | 8.0 | 18.0 | 50.0 | 12.6 |
| Chromium | 17.0 | 5.0 | 13.5 | 60.0 | 14.2 |

For the iron, copper and chromium salts prepared by the above procedure similar results are obtained. Table 5 of Example IV shows the mud thinning effects obtained with products prepared by adding 60% of the sulfate salt based on the spent sulfite liquor solids. The amount of calcium hydroxide used to neutralize the product to pH 3.0 to 4.0 in each case is also shown. The amount of lime used gives some indication of the amount of excess sulfate ion removed by the neutralization.

In some of the examples herein, ferric sulfate is specified. However, in preparing the iron salts ferrous sulfate can be used as well as ferric sulfate. The ferric sulfate may function to oxidize any easily oxidizable substances present such as sulfur dioxide. This action could be beneficial where other oxidizing agents are to be used. Furthermore, the mixed sulfate salts containing iron, aluminum, copper, chromium, and alkali metals including ammonium ions, may be used for the base exchange. It is to be noted that such mixed salts introduce other ions than the iron, aluminum, copper and chromium, which introducing may not always be desirable. Accordingly, it may be desirable to remove some part of the sulfate ions.

When an excess of a soluble salt of iron, aluminum, copper or chromium over that required for base exchange is added to the sulfonated lignin-containing material, the product is generally rather acidic because of the acidic nature of such salts. For this reason it is desirable to neutralize the product to at least about pH 4 prior to removing the water and bringing the solids to dryness. This neutralization can be carried out by adding any basic material such as sodium hydroxide. However, if a basic material is added that forms an insoluble product with the anions present as a result of the reaction in forming the salt, these anions would be precipitated, for example, as calcium sulfate or oxalate. Substances, for example, suitable for such removal of said anions are calcium hydroxide and barium hydroxide.

In removing these anions, the cations—iron, aluminum, copper or chromium or mixtures thereof would be left, it is believed, as a hydroxide which would normally be insoluble in water. However, surprisingly in the presence of the lignosulfonate, the cations remain soluble and therefore active in modifying the properties of the drilling mud.

Table 6 of Example IV

The addition of an excess of a sulfate salt having a cation chosen from the group iron, copper, aluminum and chromium over the amount necessary for base exchange, improves the mud thinning properties of the thinner additive in fresh water and gypsum muds. Only a slight excess over base exchange can be tolerated in lime base mud. Larger excesses than 15 to 20% over the base exchange, i.e., 35 to 40% total addition of aluminum sulfate (17% $Al_2O_3$) causes a deterioration in the properties of lime mud. These discoveries are illustrated in this example. If the sulfate ions are predominantly removed as in Table 4 and 5 of Example IV where calcium hydroxide was added to adjust the pH to about 4, the improvement in thinning of fresh water mud brought about by the excess cation is even more pronounced. The sulfate ions may be precipitated by hydroxides, oxides or carbonates of any cation forming an insoluble sulfate such as barium or lead, but for economic reasons calcium is preferred.

The preparations and testing of the samples for this example were identical to those of Tables 4 and 5 of Example IV with the exception that a weight of sodium hydroxide exactly equal to the weight of calcium hydroxide used in the preparation of samples for Tables 4 and 5 of Example IV was used for neutralization to about pH 4.

With reference to Table 6 of Example IV, it is seen that the optimum addition of the aluminum sulfate for fresh water mud thinning is in the range of 40 to 80% or 2 to 4 times the base exchange. By comparison with Table 4 of Example IV, it is seen that the yield values and gels in Table 6 of Example IV are higher (than shown in Table 4 of Example IV). Thus the product is not quite as effective for fresh water mud thinning if sodium hydroxide is used for neutralization.

Table 6 of Example IV

EFFECT OF THE AMOUNT (I.E., CONCENTRATION) OF ALUMINUM SULFATE ON THINNING PROPERTIES

Fresh Water Mud Tests Using 2.0 lbs. per Barrel at pH 9.5 Muds Aged By Rolling 20 Hrs. at 150° F.

| Percent Aluminum Sulfate Added (17% $Al_2O_3$) | I.G. | Y. | 10 G. | W.L. |
|---|---|---|---|---|
| Base F.W. Mud | 27.0 | 54.0 | 107.0 | 12.0 |
| Calcium Salt | 25.0 | 46.5 | 46.5 | 10.9 |
| 20 | 30.0 | 35.0 | 67.0 | 14.6 |
| 40 | 15.0 | 28.0 | 60.0 | 15.6 |
| 60 | 20.0 | 20.5 | 83.0 | 14.9 |
| 80 | 12.0 | 30.0 | 47.0 | 15.2 |
| 100 | 16.0 | 28.0 | 68.0 | 15.3 |

Limed Mud Tests Using 4.0 lbs. per Barrel Muds Aged By Rolling 20 Hr. at 150° F.

| | I.G. | Y. | 10 G. | W.L. |
|---|---|---|---|---|
| Calcium Salt | 3.0 | 6.0 | 43.0 | 18.2 |
| 20 | 1.0 | 3.0 | 9.0 | 17.4 |
| 40 | 1.0 | 3.5 | 19.5 | 17.5 |
| 60 | 7.0 | 6.0 | 43.0 | 17.4 |
| 80 | 9.0 | 15.5 | 82.0 | 18.2 |
| 100 | 25.0 | 60.4 | 47.0 | 18.3 |

EXAMPLE V

The following examples are presented to show how different treatments of the spent sulfite liquor provide progressive, steady and positive improvement in spent sulfite liquor solids as demonstrated by their ability to decrease the viscosity and gels of lime base drilling muds. In these experiments a lime base mud was prepared as described hereinabove using a clay having a "yield value" of 45. In all cases the results involve the addition of 4 pounds of the powdered product per barrel of mud.

Table 1 of Example V

PROGRESSIVE IMPROVEMENT IN EFFECTIVENESS [1] OF SPENT SULFITE LIQUOR PRODUCED BY DIFFERENT TREATMENTS

| Product | Description of Treatment | Lb./bbl. | I.G. | Visc. | 10 Min. Gel | W.L. |
|---|---|---|---|---|---|---|
| 1 | Fermented Spent Sulfite Liquor. | 4<br>6 | 100<br>10 | 29.0<br>13.5 | 250<br>100 | 21.9<br>21.8 |
| 2 | Spent Sulfite Liquor Treated With Alkali According to Application Ser. No. 694,737. | 4<br>6 | 65<br>0 | 24.0<br>12.3 | 230<br>70 | 18.5<br>18.2 |
| 3 | Selected Fraction of Fermented Spent Sulfite Liquor Obtained by Alcohol-Water Fractionation, Application Ser. No. 437,833. | 4<br>6 | 0<br>0 | 11.3<br>7.2 | 70<br>0 | 16.8<br>15.0 |
| 4 | Fermented Spent Sulfite Liquor Oxidized with 8% $KMnO_4$ and Dried. | 4<br>6 | 0<br>0 | 15.0<br>7.2 | 150<br>5 | 19.0<br>(17.5) |
| 5 | Fermented Spent Sulfite Liquor Oxidized with 8% $KMnO_4$ and Recovered by Lime Precipitation. | 4<br>6 | 0<br>0 | 8.8<br>7.2 | 20<br>0 | 17.2<br>14.3 |

[1] In lime base muds.

*Relative Product 1*: The results are given for fermented spent sulfite liquor; *Relative Product 2*: An improvement in the behavior of the fermented spent sulfite liquor is indicated as attained by treating this material according to the process described in Canadian application Serial No. 677,593 (see Example VII); *Relative Product 3*: On the other hand, fractionation of the fermented spent sulfite liquor as by organic solvents as set forth in U.S. application Serial No. 437,833 filed June 18, 1954 and abandoned in favor of Serial No. 703,664 filed December 18, 1957, shows an even greater improvement in the mud treating properties of the product. However, this fraction represents only about 20% of the original total spent sulfite liquor solids; *Relative Product 4*: In definite and striking contrast, when the fermented spent sulfite liquor is treated (for one example) with 8% potassium permanganate according to the process herein set forth of our invention, substantially the whole of the spent sulfite liquor solids are converted into a product essentially equivalent to that of a fractionated product which is only 20% of the total fermented sulfite liquor solids. Thus a substantial improvement is made not only in chemical character, or properties, but also from the economical point of view, giving several times the yield of effective product; *Relative Product 5*: The results are given for a product which is made by purifying fermented sulfite liquor which has been oxidized with potassium permanganate, the process for the same being as follows: Fermented spent sulfite liquor containing 100 grams of solids in 1500 milliliters of solution was oxidized by adding a 5% solution, formed of 8 grams of potassium permanganate in water. The resulting oxidized product was precipitated by adding 20 grams of calcium hydroxide as a thin slurry in water to raise the pH to 11.2, and the precipitate was removed by centrifuging, then washed with clear lime water, mixed in water, and redissolved by adding sulfuric acid to develop pH 5.5 for the solution. This solution was filtered to remove calcium sulfate, and dried at 60° C. The yield of this product was 54%.

EXAMPLE VI

This example illustrates the preparation of the mud thinner of our invention starting with the spent liquor from the bisulfite pulping of hardwood as received from the blowpit. The spent sulfite liquor used in other examples was obtained by pulping coniferous softwood, i.e., hemlock.

The thinner was prepared as follows: Spent liquor from the calcium bisulfite pulping of red alder as received from the blowpit was evaporated on a hot water bath to 40% non-volatile solids and then 16 grams of sodium hydroxide, as a 50% solution, were added to 445 grams of the 40% concentrated liquor. The mixture was digested at 85 to 90° C. in a hot water bath for 24 hours at which time the pH was 7.0. To one-half of the digestion product (100 g. original ssl solids) were added 15 grams of commercial ferric sulfate (24.5% Fe) and 25 grams of 16% sulfuric acid to lower the pH to 4.0. The mixture was next heated to 90° C., centrifuged to remove calcium sulfate and the clarified liquor dried for mud testing.

With reference to Table 1 of Example VI, good thinning and reduction of water loss and gels are shown with the herein above described sample. Thus products with good mud thinning properties can be made from sulfonated lignin-containing materials derived from hardwood as well as from soft woods and without prior purification. As shown herein before, the best products will be obtained by purification to concentrate the more effective components of a particular sulfonated lignin-containing material.

*Table 1 of Example VI*

THINNING PROPERTIES OF IRON SALT OF SPENT SULFITE LIQUOR FROM PULPING HARDWOOD

6 Lbs./Bbl. Gypsum Base Mud Tests at pH 8.2

|  | I.G. | P.V. | Y. | 10 G. | W.L. |
| --- | --- | --- | --- | --- | --- |
| Base Gyp Mud | 10.0 | 4.5 | 19.0 | 30.0 | 32.4 |
| Fe Salt of Hardwood S.S.L. | 3.0 | 6.5 | 9.0 | 22.0 | 16.2 |

EXAMPLE VII

An effect equivalent to oxidation of the spent sulfite liquor solids by chemicals may be brought about by electrolytic treatment and, whereas, the reactions may be deep seated and involve more than oxidation, the general effect is to bring about the properties found in the oxidized products as already herein described.

A preferred method for carrying out the electrolytic treatment is to start with a fermented calcium base spent sulfite liquor in order to take advantage of the improvements resulting from the removal of sugars by fermentation. This fermented liquor is treated with sodium hydroxide to raise the pH to approximately 8.0, heated for 24 hours at 80–90° C. while adding NaOH to maintain pH 8.0. This brings about precipitation of calcium sulfite which is then removed. The sodium hydroxide treatment increases the conductivity of the liquor and also produces a further improvement in the dispersing and drilling mud thinning properties as already disclosed in U.S. application Serial No. 694,737. The liquor was then subjected to electrolysis in the anode compartment of an electrolytic cell at a voltage of 4 to 6 volts.

During the course of the electrolysis, the solution became acid, sodium hydroxide collected in the cathode compartment and the current decreased as the liquor conductivity decreased. The product was removed from the anode compartment when the current flow had become extremely low, and the liquor was neutralized to about pH 4 with sodium hydroxide. The solids were brought to dryness and ground to a fine powder. Laboratory tests in conditioning a lime base drilling mud with this product were conducted as follows:

Exactly 60 g. of a commercial drilling mud clay with a yield value of 45 barrels of 15 cp. mud per ton of clay was mixed with 325 cc. of distilled water for 15 minutes at a high speed on a Hamilton Beach No. 30 Drinkmaster Mixer and then aged overnight by rolling in a sealed bottle at room temperature. The mud was then "broken over" by the addition of 4 g. of the electrolysis product, 6 g. of calcium hydroxide and 6 ml. of sodium hydroxide (1 ml.=0.25 g. of sodium hydroxide) and mixing for 5 minutes. The mud was then aged overnight by rolling in a sealed bottle at room temperature, again mixed 5 minutes and tested for viscosity, gels and water loss according to the standard practice of the A.P.I (American Petroleum Institute) Code No. 29. In a further test, 10% of diesel oil was added to the mud and mixed for 20 minutes at high speed and the mud again tested according to the specified methods of the A.P.I. Code No. 29. The results of these tests on the spent sulfite liquor product before and after the electrolytic treatment are shown in Table 1 of Example VII. The substantial and critically important improvement observed in all the properties of the mud thinner with the electrolyzed material in comparison with the properties of the mud thinned with the material prior to electrolysis are readily seen in the table. For example, in a lime mud, the final viscosity was decreased 40% as a result of the electrolytic treatment.

With reference to Table 1 of Example VII, it will be seen that the water loss has been decreased substantially from 22.8 to 18.9 and 13.8 to 11.2, a result representing a considerable improvement over changes in water loss resulting from chemical oxidation. Such improvement would indicate that reactions other than oxidation take place in electrolytic treatment.

Table 1 of Example VII
EFFECT OF ELECTROLYTIC TREATMENT ON MUD THINNING PROPERTIES OF SPENT SULFITE LIQUOR

|  | Lb. added per barrel of mud | I.G. | Limed Visc. | Mud 10 G. | W.L. | I.G. | Visc. | 10 G. | W.L. |
|---|---|---|---|---|---|---|---|---|---|
| Spent Sulfite Liquor Additive U.S. Serial No. 694,737 | 4 | 40 | 19.5 | 140 | 22.8 | 150 | 48.5 | 320 | 13.8 |
| Above Additive after Electrolytic Treatment | 4 | 0 | 12.0 | 20 | 18.9 | 2 | 27.0 | 70 | 11.2 |

Conversion of the electrolyzed product to iron salt gave a superior fresh water mud thinner.

Table 2 of Example VII
[Electrolysis Without Diaphragm]

Another sample of fermented spent sulfite liquor containing 34.7 grams of nonvolatile solids was mixed with 3.22 grams of sodium hydroxide in aqueous solution to give a final concentration of 16% total solids by weight and the solution electrolyzed between platinum electrodes without a diaphragm with 0.276 ampere hours of electricity per gram of spent liquor solids. The electrolysis was conducted at 80° C. A solution containing 12 grams of the electrolysis product solids was mixed with a solution containing 2.5 grams of ferric sulfate (24.5% Fe) to base exchange to the iron salt. The resulting iron salt was dried, after removing calcium sulfate, and compared with the product of Example VIII for thinning a gypsum mud containing 6 lb./bbl. of plaster of paris ($CaSO_4 \cdot \frac{1}{2} H_2O$).

The mud test results, Table 2 of Example VII, show that the electrolyzed product of this sample is equivalent to the product of Example VIII (dichromate oxidation) as a drilling mud thinner. Thus, electrolysis as carried out in this example is the substantial equivalent of oxidation by chemicals.

obtain a product with a pH of 8.0. This product was treated by adding a solution containing 20 grams of ferric sulfate in 75 cc. of water, heated to 80° C. and centrifuged to remove calcium sulfate, then a solution containing 4 grams of sodium dichromate in 15 cc. of water was added, and the solution heated to 90° C. The water was removed by evaporation and the solids reduced to dryness by heating on a steam bath.

Table 1 of Example VIII

The first three tests in Table 1 show the mud: (1) not thinned, (2) thinned by quebracho, and (3) thinned by the above described thinner of our invention. When plaster of paris is added to the base mud (test 4) a high initial gel and water loss is developed. When sodium sulfate is added to the mud of test 4 the water loss is decreased, but viscosity and gels become higher. These are the characteristic behaviors of drilling muds in the presence of these additives described in the literature on drilling muds. Tests 6 and 7 show the high initial gels and high gel rate obtained on thinning a gypsum contaminated mud with quebracho and the failure of the addition of sodium sulfate in moderate quantity in the presence of quebracho to substantially reduce initial gels and water loss. In contrast the process and product of the present invention, as shown by test 8, produces a low

Table 2 of Example VII
COMPARISON OF IRON SALT OF ELECTROLYZED SSL WITH IRON SALT OF DICHROMATE OXIDIZED SSL IN GYPSUM BASE MUD

| Samples | Lbs./bbl. | Rolled Overnight Room Temp. | | | | | Rolled 20 Hrs. 150° F. | | | | |
|---|---|---|---|---|---|---|---|---|---|---|---|
|  |  | pH | I.G. | Visc. | 10 G. | W.L. | pH | I.G. | Visc. | 10 G. | W.L. |
| Base gypsum mud | 0 | 8.2 | 25. | 12.3 | 50 | 24 | 8.6 | 30 | 11.0 | 70 | 27 |
| Iron Salt of Dichromate Oxidized Spent Sulfite Liquor prepared Example VIII | 2.0 | 8.1 | 2.0 | 6.0 | 7.0 | 20.2 | 8.1 | 2.0 | 5.0 | 7.0 | 23.0 |
|  | 6.0 | 8.2 | 0 | 5.5 | 5.0 | 8.3 | 8.1 | 0 | 5.0 | 5.0 | 11.6 |
| Iron Salt of Spent Sulfite Liquor electrolyzed without diaphragm | 2.0 | 8.5 | 0 | 4.6 | 10.0 | 19.8 | 8.5 | 0 | 5.0 | 10.0 | 19.4 |
|  | 6.0 | 8.2 | 0 | 4.5 | 5.0 | 9.0 | 8.2 | 0 | 5.0 | 5.0 | 8.8 |

EXAMPLE VIII

This example is to illustrate the exceptionally improved mud characteristics obtained by the treatment of muds according to our invention and discovery as compared with treatments according to the known art. A mud prepared from a mixture of commercial drilling clays having a yield value of 45 bbls. of 15 cp. mud per ton of clay by adding 10 parts of clay solids to 100 parts of distilled water was treated for comparison purposes with various combinations of thinners, plaster of paris ($CaSO_4 \cdot \frac{1}{2} H_2O$) and sodium sulfate as shown in Table 1. The product of our invention (referred to as "thinner" or "additive" when used in drilling mud) was prepared as follows: A 48% solution of calcium base fermented spent sulfite liquor solids (100 g. of solids) were digested for 8 hours at 90° C. in solution with sufficient sodium hydroxide to viscosity and initial gel as well as low gel rate in gypsum contaminated mud and also, as shown by tests 9 and 10, permits the reduction in water loss by addition of sodium sulfate even in the presence of large amounts of gypsum. In fact, as shown by test 11, on addition of more thinner the water loss of the original mud may be restored with sodium sulfate while maintaining a low gel rate and lower viscosity and gels than in the original uncontaminated mud.

Example VIII has demonstrated that the product and process of our invention, including the sodium sulfate part of this invention, permits treatment of gypsum contaminated muds with results not found possible with the known processes of the prior art. The treatment not only corrects the mud properties for the bad effects of gypsum ($CaSO_4 \cdot 2H_2O$) contamination, but also renders the mud resistant to further gypsum contamination.

*Table I of Example VIII*

| Test No. | Thinner Added | | Plaster of Paris, Lb./bbl. | Na₂SO₄ Lb./bbl. | Mud Test After Aging 24 Hrs. | | | |
|---|---|---|---|---|---|---|---|---|
| | Name | Lb./bbl. | | | I.G. | Visc. | 10 G. | W.L. |
| 1 | None | 0 | 0 | 0 | 10 | 39.7 | 90 | 9.0 |
| 2 | Quebracho | 0.5 | 0 | 0 | 0 | 34.0 | 30 | 9.2 |
| 3 | Thinner [1] | 0.5 | 0 | 0 | 0 | 30.5 | 30 | 9.8 |
| 4 | None | 0 | 3.0 | 0 | 95 | 34.0 | 110 | 41.9 |
| 5 | do | 0 | 3.0 | 3.0 | 150 | 71.7 | 330 | 12.0 |
| 6 | Quebracho | 2.0 | 3.0 | 0 | 50 | 30.1 | 50 | 51.0 |
| 7 | do | 2.0 | 3.0 | 2.0 | 30 | 27.5 | 30 | 36.0 |
| 8 | Thinner [1] | 2.0 | 3.0 | 0 | 0 | 9.8 | 15 | 23.0 |
| 9 | do.[1] | 1.5 | 3.0 | 1.5 | 0 | 14.0 | 25 | 12.8 |
| 10 | do.[1] | 1.5 | 9.0 | 1.5 | 0 | 14.0 | 25 | 12.5 |
| 11 | do.[1] | 3.0 | 3.0 | 2.0 | 0 | 19.0 | 20 | 9.4 |

[1] Thinner = Additive preparation described in example.

EXAMPLE IX

This example is to illustrate the use of the combination of the clay and additive lignosulfonate product of our invention and discovery for drilling a well in which anhydrite is encountered as a contaminant. A mud was prepared by mixing 30 parts by weight of Wyoming bentonite having a yield value of 95 barrels of 15 cp. mud per ton of clay with 335 parts by weight of water and thinning with an additive prepared as follows:

A solution of 100 grams of fermented spent sulfite liquor solids in 125 milliliters of water was heated to 90° C. and then a solution containing 7.5 grams of sodium hydroxide in 7.5 milliliters of water was added and the solution heated for 2 hours. Next 45 grams of ferric sulfate (25 grams in excess of that required to precipitate the calcium of the spent sulfite liquor as calcium sulfate) were dissolved in 150 cc. of water and added, and the heating continued for 1 hour. The mixture was centrifuged to remove calcium sulfate and then 4 grams of sodium dichromate were dissolved in 20 milliliters of water and the solution added to bring about oxidation. This product was neutralized to pH 4 by adding 50 grams of 10% sodium hydroxide solution and then dried at 60° C. and ground to a powder.

Referring to Table 1 of Example IX, test 1, the base mud is shown to be very thick, having a viscosity of 79.5 cp. and high gel strength. In drilling a well, thinners are added to maintain low viscosity and gels as drilling proceeds and the pH is usually maintained at pH 9.0 to 9.5 by addition of caustic. This "top hole" mud is represented by tests 2 and 3 in which the additive described above has been added in place of the conventional thinners, i.e., quebracho or phosphate, together with a small amount of caustic to maintain the pH at 9.0 to 9.5. When anhydrite is encountered and this mud becomes saturated with calcium sulfate a drop in viscosity and gels and a rise in water loss occurs as illustrated by test 4. This combination of changes indicates to the driller that anhydrite has been encountered and he then adds more additive to lower the water loss to the desired value as illustrated by tests 5 and 6.

It is readily apparent that this procedure is far more simple and convenient than the conventional breakover to a "gypsum base" mud in which the mud is watered back, a portion discarded, and 3 lb./barrel of plaster of Paris and 4 to 6 lb./barrel of starch together with preservative added to the remainder. A further very important fact is that the product and process of our invention for control of anhydrite contamination is far more economical.

*Table 1 of Example IX*

| Test No. | Additive, lb./bbl. | Plaster of Paris, lb./bbl. | pH | Mud Aged 24 Hours Room T. | | | |
|---|---|---|---|---|---|---|---|
| | | | | I.G. | Visc. | 10 G. | W.L. |
| 1 | Base Mud | | 8.9 | 170 | 79.5 | 250 | 8.8 |
| 2 | 1 | 0 | 9.4 | 15 | 39.8 | 100 | 8.2 |
| 3 | 2 | 0 | 9.3 | 0 | 39.2 | 90 | 7.8 |
| 4 | 2 | 3.0 | 8.7 | 0 | 17.5 | 20 | 15.6 |
| 5 | 4 | 3.0 | 7.8 | 0 | 22.5 | 20 | 9.7 |
| 6 | 6 | 3.0 | 7.0 | 0 | 33.0 | 40 | 7.4 |

EXAMPLE X

This example is to illustrate the excellent oil emulsifying properties of the additive combination of our invention in gypsum contaminated mud. The additive was prepared by mixing together 50 parts of the thinner described in Example VIII and 50 parts of sodium sulfate. For comparison, a conventional lime base mud was prepared from the same stock mud using the same amount of calcium lignosulfonate. The stock mud was made up of 60 parts of a commercial drilling clay in 325 parts of distilled water, said clay being characterized by having a yield value of 45 barrels of 15 cp. mud per ton of clay.

These two muds, a gypsum contaminated mud treated with the above described additive and a conventional limed mud, were tested and then they were mixed with 10% of oil for 20 minutes at high speed and tested by the standard API methods for viscosity, gels and water loss.

Tests were made on the stock mud and subsequently on the treated muds before and after converting them to oil emulsion muds in order to distinguish between changes resulting from the treatment and the changes resulting from emulsification. Referring to Table 1 of Example X, test 2 was made by adding 4 lb./barrel of the above described additive to a sample of the stock mud whose properties are shown in test 1 followed by a 5 minutes mix and then by adding 3 lb./barrel of plaster of Paris followed by a 20 minute mix. In test 3 the conventional "breakover" procedure was followed in making a limed mud using calcium lignosulfonate. Both treated muds were aged overnight before testing.

The tests made on the treated muds before conversion to oil emulsion show the relative properties of a gypsum contaminated mud treated by the above described additive (test No. 2, Table 1 of Example X) and the limed mud (test No. 3, Table 1 of Example X) prepared by the accepted procedure of "breakover" to a high pH calcium lignosulfonate limed mud using 4 lb./barrel of chemical in each case. These results are important in evaluating the emulsion forming properties. It should be noted that the water loss of the gypsum contaminated mud (test 2) is lower than that of the base mud (test 1) while the limed mud (test 3) has a higher water loss. Also the viscosity and gels of the gypsum contaminated mud are higher than those of the limed mud. The viscosity of the gypsum contaminated mud can be reduced by adding water without appreciable change in the water loss.

The emulsifying properties of the additives used must be evaluated for drilling mud purposes on the basis of changes in viscosity, gels, and water loss because both emulsions show no break on standing. In this case, on mixing for 20 minutes with 10% of oil, the viscosity of the additive treated gypsum contaminated mud (test 2) decreased by a factor of 0.7 while the viscosity of the limed mud (test 3) increased by a factor of 2.2. Similarly, the water loss of the additive treated mud decreased 38% while the water loss of the limed mud decreased 31%. Thus the oil emulsifying properties of the additive in gypsum contaminated mud are approximately the same as those of calcium lignosulfonate in limed mud. In the oil well drilling industry calcium lignosulfonate is considered to be an excellent emulsifier for oil in limed muds.

The excellent oil emulsion properties of the above described additive together with the high stability and low alkalinity make this additive very attractive for preparing oil emulsion muds resistant to gypsum. As shown by the example, a much lower water loss will also be realized with many muds at the same thinner and oil usage.

fore testing and heating.) Samples of the aged mud were then heated in a sealed bomb at 340° F. for various lengths of time. After heating the bomb was cooled and the mud removed and mixed before testing. Test results are shown in Table 1.

Referring to Table 1 of Example XI, with 4 lb./barrel of additive (tests 1 and 2), the viscosity dropped from 28.5 to 22.5 cp. and the water loss increased from 9.0 to 11.0 milliliters during the first 4 hours of heating at 340° F., after which the viscosity increased slightly and the water loss increased from 11.0 to 12.7. With 6 lb./barrel of additive the water loss was much more stable, increasing only 1.7 milliliters in 20 hours. In contrast, all high pH limed muds prepared with calcium lignosulfonate became too thick to measure and had a water loss above 30 milliliters after 2 to 3 hours of heating at 340° F.

*Table 1 of Example XI*

| Test No. | Additive, lb./bbl. | Plaster of Paris, lb./bbl. | Initial pH | Heated at 340° F. ||||
|---|---|---|---|---|---|---|---|
| | | | | Hrs. Heated | I.G. | Visc. | 10 G. | W.L. |
| 1 | 4.0 | 3.0 | 6.7 | 0 | 0 | 28.5 | 100 | 9.0 |
| 2 | 4.0 | 3.0 | 6.7 | 4.0 | 0 | 22.5 | 80 | 11.0 |
| 3 | 4.0 | 3.0 | 6.7 | 20.0 | 0 | 25.2 | 40 | 12.7 |
| 4 | 6.0 | 3.0 | 5.9 | 0 | 0 | 38.0 | 70 | 7.6 |
| 5 | 6.0 | 3.0 | 5.9 | 20.0 | 0 | 35.2 | 70 | 9.3 |

EXAMPLE XII

This example is to illustrate the use of a chemical which will react with calcium sulfate to form a soluble sulfate and a calcium salt less soluble than calcium sulfate in conditioning a gypsum contaminated mud; for example, sodium oxalate.

The Wyoming bentonite mud described in Example IX was treated with the thinner described in Example VIII together with sodium oxalate and plaster of Paris. The sodium oxalate added reacts with an equal weight of calcium sulfate to form sodium sulfate and calcium oxalate.

Referring to Table 1 of Example XII, the base mud (test 1) yields a gypsum base mud of high water loss (test 2) when plaster of Paris is added. The addition of 4 lb./barrel of thinner lowers the water loss (test 3)

*Table 1 of Example X*

| Test No. | Treatment | pH | Treated Mud |||| 10% Oil Emulsion ||||
|---|---|---|---|---|---|---|---|---|---|---|
| | | | I.G. | Visc. | 10 G. | W.L. | I.G. | Visc. | 10 G. | W.L. |
| 1 | Stock Mud | 8.7 | 80 | 28.0 | 130 | 13.0 | | | | |
| 2 | 4 lb./bbl. Additive 3 lb./bbl. Plaster of Paris and NaOH to pH 7.9. | 7.9 | 30 | 21.3 | 80 | 9.2 | 100 | 15.0 | 190 | 5.7 |
| 3 | 4 lb./bbl. Calcium lignosulfonate, 6 lb./bbl. Calcium hydroxide and 1.5 lb./bbl. Sodium hydroxide. | 12.5 | 0 | 12.3 | 60 | 15.8 | 20 | 25.8 | 190 | 10.9 |

EXAMPLE XI

This example is to illustrate the thermal stability of "gypsum" base muds. The base mud of Example IX was treated with gypsum together with the additive described in Example X to make a "gypsum" base mud. (The mud was aged 24 hours at room temperature bebut not to a value usually considered satisfactory for most drilling operations. The subsequent addition of sodium oxalate (test 4) further lowers the water loss to a satisfactory level. Test 5 shows that the water loss remains the same or even goes down when more calcium sulfate is added to compensate for that removed by reaction with sodium oxalate.

*Table 1 of Example XII*

| Test No. | Thinner, lb./bbl. | Sodium Oxalate, lb./bbl. | Plaster of Paris, lb./bbl. | Mud Aged 24 Hrs. at Room Temp. ||||
|---|---|---|---|---|---|---|---|
| | | | | pH | I.G. | Visc. | 10 G. | W.L. |
| 1 | 0 | (¹) | | 8.9 | 170 | 79.5 | 250 | 8.8 |
| 2 | 0 | 0 | 3.0 | 8.6 | 40 | 22.5 | 60 | 27.2 |
| 3 | 4.0 | 0 | 3.0 | 5.7 | 0 | 20.0 | 20 | 13.0 |
| 4 | 4.0 | 1.5 | 3.0 | 6.7 | 0 | 32.5 | 40 | 8.1 |
| 5 | 4.0 | 1.5 | 6.0 | 6.9 | 0 | 32.5 | 40 | 7.6 |

¹ Base Mud.

EXAMPLE XIII

This example illustrates our unexpected and valuable invention and discovery that muds thickened and unusable as a result of salt contamination may be treated with the products of our invention to condition the muds to desirable and fully usable drilling fluids, and how this result cannot be attained with the most widely used thinners, quebracho, tannin, or lignite. The additives of our invention and discovery used in this example were chosen by way of example and not limitation.

Part one of Example XIII illustrates the effect of an oxidized iron salt derived from fermented spent sulfite liquor in thinning a drilling mud contaminated with 1% of sodium chloride. Part two shows the thinning effect of an iron salt derived from fermented spent sulfite liquor on a contaminated drilling mud containing 1% sodium chloride. Part three shows thinning of drilling muds with an iron salt derived from fermented spent sulfite liquor and containing an excess of iron sulfate, said muds containing 10 and 17.5% sodium chloride contamination.

A field mud was obtained from an oil well drilling operation in California before chemical treatment was started at the well. Its characteristics are given in the following table. This mud was contaminated with 1% salt by adding 3.5 lb./barrel of salt to the mud (usually considered the upper limit of salt contamination) and then samples were treated with the product of our invention described in Example VIII, with quebracho, and with lignite, together with caustic to maintain a pH of 8 or 9.

Referring to Table 1 of Example XIII, test 1 shows the viscosity, gel and water loss factors of the mud as taken from the oil well, and test 2 shows the same factors after adding 3.5 lb./barrel of salt. In tests 3, 4, 5 and 6 the addition of the thinner of our invention in increasing amounts reduces viscosity, gel, and water loss factors until at 4 lb./barrel of said thinner the mud properties are essentially the same as before contamination with salt. In tests 7, 8, 9 and 10 the addition of the same quantities of quebracho failed to restore the contaminated mud to low viscosity and gel factors. In fact, continued addition of quebracho thickened the mud. Tests 11, 12, 13 and 14 show that lignite added in the same quantities also does not thin the contaminated mud to the low viscosity and gels obtained with the product of our invention.

Thus the test results presented in Table 1 of Example XIII show that the product of our invention is more resistant to salt contamination in drilling muds than either quebracho or lignite.

*Table 1 of Example XIII*

THINNING OF A MUD CONTAMINATED WITH 1% SALT

| Test No. | Thinner | Lb./bbl. | Initial Mud | | | Rolled Overnight at 150° F. | | | | |
|---|---|---|---|---|---|---|---|---|---|---|
| | | | pH | I.G. | Visc. | pH | I.G. | Visc. | 10 G. | W.L. |
| 1 | Base Mud [1] | | | | | 8.6 | 0 | 15.0 | 10 | 11.6 |
| 2 | Base Mud [2] | | 8.7 | 170 | 83.5 | 8.3 | 125 | 72.0 | 200 | 16.8 |
| 3 | Thinner | 0.5 | 9.8 | 100 | 45.0 | 8.5 | 65 | 54.0 | 125 | 15.0 |
| 4 | do | 1.0 | 9.0 | 40 | 35.7 | 8.5 | 35 | 44.5 | 90 | 14.7 |
| 5 | do | 3.0 | 8.7 | 3 | 18.5 | 8.4 | 5 | 19.7 | 35 | 12.9 |
| 6 | do | 4.0 | 8.6 | 2 | 18.5 | 8.4 | 2 | 17.7 | 30 | 12.6 |
| 7 | Quebracho | 0.5 | 8.7 | 140 | 64.0 | 8.5 | 45 | 43.7 | 95 | 15.0 |
| 8 | do | 1.0 | 8.5 | 70 | 35.7 | 8.3 | 45 | 43.7 | 105 | 15.6 |
| 9 | do | 3.0 | 8.3 | 20 | 28.0 | 8.2 | 60 | 59.5 | 150 | 16.5 |
| 10 | do | 4.0 | 8.1 | 25 | 28.8 | 8.0 | 55 | 61.5 | 160 | 16.2 |
| 11 | Lignite | 0.5 | 8.8 | 135 | 64.8 | 8.4 | 70 | 59.0 | 155 | 15.0 |
| 12 | do | 1.0 | 8.7 | 95 | 45.0 | 8.4 | 45 | 55.0 | 95 | 15.0 |
| 13 | do | 3.0 | 8.3 | 70 | 35.2 | 8.0 | 20 | 47.6 | 90 | 13.8 |
| 14 | do | 4.0 | 8.0 | 80 | 35.7 | 7.8 | 20 | 43.7 | 80 | 13.8 |

[1] Before contamination.
[2] After contamination.

*Table 2 of Example XIII*

For the second part of this example, the drilling mud additive of our invention was prepared as follows: 210 grams of concentrated fermented spent sulfite liquor having 47.5% by weight of non-volatile solids were heated to 85° to 90° C. and neutralized to an alkalinity value of pH 8.0 by adding a 50% solution of sodium hydroxide in water. The temperature was maintained at 850°–90° C. for 24 hours while adding sodium hydroxide as needed to maintain the pH at 8.0. Approximately 5% of sodium hydroxide based on the spent sulfite liquor solids was used. Next 17.7 grams of ferric sulfate (24.5% Fe) were dissolved in 40 ml. of water, added to the solution, and the mixture heated for one hour at 85° to 90° C. The mixture was then centrifuged to remove calcium sulfate and the clarified liquor dried at 60° C. The final liquor had an alkalinity value of pH 3.0.

The drilling mud was prepared as herein before described using a base mixture having 45.5 lbs. per barrel of a mixture of clays containing 6 parts of a commercial drilling clay having a "yield value" of 45 barrels of 15 cp. mud per ton of clay and one part of a commercial drilling clay having a "yield value" of 95 barrels of 15 cp. mud per ton of clay.

Drilling mud tests were made as heerin before described for fresh water muds except that 3.5 lbs. per barrel of sodium chloride (1% of the mud) were added together with the thinner. Tests were made with concentrations of 0.5, 3.0 and 5 lbs. per barrel of the thinner additive in one series and the same concentrations of quebracho in another series. The mud test results are shown in the following Table 2, Example XIII.

*Table 2 of Example XIII*

THINNING OF SALT (SODIUM CHLORIDE) CONTAMINATED MUD

[Tests in Fresh Water Mud at pH 9.5 Contaminated with 1% of Salt Rolled 20 Hrs. at 150° F.]

| Sample | Lbs./bbl | Initial Gel | Yield Value | 10 Min. Gel | Water Loss |
|---|---|---|---|---|---|
| Base F.W. Mud Before Salt | | 18.0 | 36.0 | 62.0 | 11.1 |
| Base Salt Contaminated Mud | | 25.0 | 46.5 | 43.0 | 16.7 |
| Additive | 0.5 | 30.0 | 80.0 | 76.0 | 14.0 |
| Do | 3.0 | 15.0 | 28.0 | 28.0 | 14.0 |
| Do | 5.0 | 3.0 | 10.0 | 30.0 | 12.7 |
| Quebracho | 0.5 | 36.0 | 61.0 | 134.0 | 14.7 |
| Do | 3.0 | 23.0 | 33.0 | 150.0 | 12.8 |
| Do | 5.0 | 23.0 | 31.0 | 97.0 | 9.2 |

With reference to Table 2 of Example XIII, values are given for the base fresh water mud and the base mud contaminated with 3.5 lbs. per barrel of salt (about 1%). Our results show that the quantity of thinner additive employed is important. With the addition of 0.5 lbs. per barrel of the additive described above, or of quebracho, the salt contaminated mud becomes very thick. It was surprising and unexpected then to find that with the addition of up to 5.0 lbs. per barrel of the additive of our invention, the salt contaminated mud is thinned to yield values and gel values far below those of the original fresh water mud. On the other hand, the addition of up to 5.0 lbs. per barrel of quebracho had little or no thinning effect on the salt contaminated mud. In fact, quebracho increased the 10 min. gel to an objectionable degree. From these results it is evident that the thinner additive of our invention is surprisingly effective in not only thinning but in maintaining the desired properties of the mud in the presence of quantities of salt, which otherwise are ordinarily known to be difficult to adjust or treat by way of counteracting their deleterious effect on mud properties. Furthermore, the thinner additive of our invention may be used in making effective muds with sea water and in counteracting the effect of sodium sulfate as well as mixtures of soluble salts encountered in well drilling.

cc. of mud). About 0.2 lbs. per barrel of an anti-foam were added to eliminate foaming which occurs in muds at high salt concentrations. For a second series, about 20% of salt (70 g. to 350 cc. of mud) was added to the mud together with 50 cc. of water and quantities of thinner additive ranging from 4.0 to 15.0 lbs. per barrel. These additions gave a net salt concentration of 17.5%.

With reference to Table 3 of Example XIII: When the test results with 4.0 lbs. per barrel of additive is compared with the results of Table 2, Example XIII, it is seen that adding 10% salt produced considerable thickening. The addition of thinner additive of our invention effectively lowers yield value, gels and water loss.

In the case of the mud contaminated with 17.5% salt, the additional water used in the preparation of the mud approximately compensated for the thickening effect of the additional salt. Here again, an advantageous effective lowering of yield, gels and water loss of the mud by our additive was obtained. This said advantageous effective thinning by using the additive of our invention is continued according to our tests with the use of higher concentration of sodium chloride up to saturated brine. Of course the degree of effectiveness is gradually less with the higher concentration of salt.

*Table 3 of Example XIII*

THINNING OF SALT (SODIUM CHLORIDE) CONTAMINATED MUD

[Tests in Fresh Water Mud at pH 9.5 Contaminated With 10% and 17.5% Salt Rolled 20 Hrs. at 150° F.]

| Sample | Additive, Lbs./Bbl. | Initial Gel | Yield Value | 10 Min. Gel | Water Loss |
| --- | --- | --- | --- | --- | --- |
| Mud Containing 10% Salt (35 Lbs./Bbl.) | 4.0 | 34.0 | 51.0 | 57.0 | 28.0 |
|  | 7.0 | 26.0 | 47.0 | 63.0 | 26.1 |
|  | 10.0 | 19.0 | 43.5 | 72.0 | 18.0 |
|  | 15.0 | 13.0 | 24.0 | 39.5 | 15.6 |
| Same Initial Mud With 70 Lbs./Bbl. Salt and 50 Lbs./Bbl. of Water (Net 17.5% Salt) | 4.0 | 30.0 | 48.5 | 36.0 | 40.8 |
|  | 7.0 | 25.0 | 37.0 | 45.0 | 32.5 |
|  | 10.0 | 13.0 | 33.0 | 53.0 | 27.2 |
|  | 15.0 | 8.5 | 16.5 | 32.0 | 23.6 |

NOTE: Muds containing high concentration of salt with no dispersant are thin but have a high water loss, i.e., 80 for the above mud with 17.5% of salt.

The third part of Example XIII illustrates the effectiveness of the thinner-additive of our invention for thinning muds contaminated with higher concentrations of salt (sodium chloride). Large additions of dry salt increase the solids content of a mud and thicken the mud so it becomes necessary to add water to keep the mud viscosity within a measurable range. Addition of water usually has deleterious effects on the other mud properties and is avoided as far as possible. The mud used for this part of Example XIII is the same mud as used for the tests of Table 2, Example XIII.

The thinner additive was prepared as follows: A quantity of concentrated fermented spent sulfite liquor having 48% non-volatile solids was made alkaline to pH 8.0 by adding 50% sodium hydroxide and then heated for 24 hours at 85° to 90° C. while maintaining the pH at 8.0 by further additions of sodium hydroxide. About 5% of sodium hydroxide based on the spent sulfite liquor solids was used for this treatment. Next 35.4% of ferric sulfate (24.5% Fe) based on the spent sulfite liquor solids was added as a 25% solution in water. The mixture was neutralized to pH 3.7 by adding 4.5% of calcium hydroxide as a 10% slurry, heated for one hour at 85–90° C. and centrifuged to remove calcium sulfate. The product was dried and pulverized.

The drilling mud tests were made as described for Table 2 of Example XIII. For one series, 10% of salt (35 g. to 350 cc. of mud) was added to the mud together with quantities of thinner additive ranging from 4.0 to 15.0 lbs. per barrel (4.0 to 15.0 grams per 350

EXAMPLE XIV

To illustrate the preparation of drilling muds from saline water, and the unexpected properties of these muds in the presence of salt obtained by the use of the addition of the product of our invention, a mud was prepared using sea water and commercial drilling clays and conditioned by the addition of the additive described in Example VIII.

The mud was prepared by slowly stirring 20 grams of calcium carbonate, 145 grams of a commercial drilling clay having a yield value of 95 barrels of 15 cp. mud per ton of clay, and 874 grams of a commercial drilling clay having a yield value of 45 barrels of 15 cp. mud per ton of clay into 4000 milliliters of sea water taken from Puget Sound. The mud was mixed slowly for one hour and then divided into 500 milliliter portions. These portions were each mixed for one-half hour at 15,000 r.p.m. on a Hamilton Beach No. 30 "Drinkmaster" Mixer, and then recombined and allowed to age several days in a Pyrex bottle. The aged mud was then thoroughly mixed and divided into 350 milliliter portions for mud tests.

Two series of tests were carried out. In one series the sea water mud was treated as a fresh water mud and additive thinner, together with sufficient caustic (1.0 milliliter equivalent to 0.25 grams sodium hydroxide) to adjust the pH to 9.5, was mixed into the mud and the mixing continued for 5 minutes at 15,000 r.p.m. in a Hamilton Beach No. 30 "Drinkmaster" Mixer. The thinned mud was aged by rolling overnight in a sealed pint bottle, readjusted to pH 9.5 by adding caustic, mixed 5 minutes at 15,000 r.p.m., and tested immediately for viscosity, gels, and water loss according to the procedure recommended in the American Petroleum Institute Code 29.

In the second series of tests, the mud was converted to a "gyp" mud by adding 5 lbs./barrel of plaster of Paris together with the additive or thinner and mixing for 20 minutes at 15,000 r.p.m. These muds were adjusted to pH 8.2 and aged and tested as described above. The results for both series of tests are presented in Table 1 of Example XIV which follows.

Referring to Table 1, comparison of tests 2 to 6 with test 1 shows that the additive of our invention effectively lowers viscosity, gels and water loss of the sea water mud whereas the addition of quebracho (tests 7 to 10) has very little effect on viscosity and gels, and even permits the water loss to increase. Good reduction in viscosity, gels and water loss was also obtained when the mud was converted to a gypsum base mud by adding 5 lbs./barrel of plaster of Paris (test 11), and treated with various amounts of the additive of our invention (tests 12 to 16). In contrast, the addition of quebracho produced an increase in viscosity and water loss (tests 17 to 19). Tests 20, 21 and 22 show the especially desirable low water loss attained by making larger additions of the additive to the saline mud of test 1.

By "saline water" is meant an aqueous medium having a saline characteristic whether same be water having sodium chloride added or whether the same is sea water, even though sea water has other salts present. In addition, water occurring naturally may contain sodium sulfate and the product of our invention and discovery has been found particularly effective in conditioning muds subject to such waters.

minutes at high speed in a Hamilton Beach No. 30 milkshake mixer. The mixed portions were then blended and stored in a Pyrex glass bottle until used for said tests.

*Table 1 of Example XV*

THINNING OF SEA WATER MUD BY OXIDIZED SPENT SULFITE LIQUOR

Tests At 6.0 lbs./bbl. pH 9.5 Muds Aged By Rolling Overnight At Room Temperature

| Sample Treatment | I.G. | Y. | 10 G. | W.L. |
|---|---|---|---|---|
| Base Sea Water Mud | 25.0 | 34.0 | 28.0 | 35.0 |
| Original Fermented Spent Sulfite Liquor | 17.0 | 27.0 | 45.0 | 28.2 |
| Electrolyzed 0.57 Amp. Hrs./gram | 3.0 | 6.0 | 26.0 | 27.8 |

EXAMPLE XVI

This example shows the improvement in mud thinning properties obtained by oxidation of a sulfonated lignin other than spent sulfite liquor. Samples of sulfonated Kraft lignin and sulfonated alkali lignin were oxidized with hydrogen peroxide and compared with the original sulfonated lignins as thinners for limed muds.

The products were prepared as follows: A sulfonated Kraft lignin analyzing 3.7% sulfone S and 3.3% non-sulfone S was oxidized in 20% water solution by adding 15% by weight of hydrogen peroxide at room temperature. The mixture was allowed to stand at room temperature for 24 hours and then heated to 80–90° C. and dried at 60° C.

A sample commercial alkali lignin (Meadol) was sulfonated as described below and a portion of the product oxidized with hydrogen peroxide. Eighty grams of alkali lignin and 60 grams of sodium sulfite were dissolved in water with sodium hydroxide at pH 12, stirred at 60° C.

*Table 1 of Example XIV*

PREPARATION AND CONDITIONING OF A SEA WATER MUD

| Test No. | Thinner | Lb./bbl. | Plaster of Paris, lb./bbl. | pH | Aged 24 Hrs. Room Temp. | | | |
|---|---|---|---|---|---|---|---|---|
| | | | | | I.G. | Visc. | 10 G. | W.L. |
| 1 | Base Mud | | 0 | 9.5 | 100 | 39.5 | 130 | 30.2 |
| 2 | Additive of Example VIII | 2 | 0 | 9.5 | 60 | 35.2 | 90 | 27.0 |
| 3 | | 4 | 0 | 9.5 | 30 | 29.5 | 70 | 21.0 |
| 4 | | 6 | 0 | 9.5 | 0 | 20.0 | 70 | 14.4 |
| 5 | | 10 | 0 | 9.5 | 0 | 17.5 | 30 | 7.8 |
| 6 | | 15 | 0 | 9.5 | 0 | 17.5 | 5 | 4.8 |
| 7 | Quebracho | 2 | 0 | 9.4 | 70 | 46.0 | 100 | 33.0 |
| 8 | | 4 | 0 | 9.5 | 60 | 35.2 | 70 | 36.8 |
| 9 | | 6 | 0 | 9.5 | 50 | 34.0 | 70 | 37.5 |
| 10 | | 10 | 0 | 9.4 | 50 | 35.2 | 80 | 34.5 |
| 11 | Base "GYP" Mud | | 5 | 8.2 | 70 | 30.1 | 120 | 28.6 |
| 12 | Additive of Example VIII | 2 | 5 | 8.2 | 50 | 29.0 | 90 | 25.0 |
| 13 | | 4 | 5 | 8.2 | 30 | 24.0 | 80 | 20.8 |
| 14 | | 6 | 5 | 8.2 | 15 | 23.5 | 70 | 14.5 |
| 15 | | 10 | 5 | 8.3 | 0 | 25.2 | 80 | 6.4 |
| 16 | | 15 | 5 | 8.2 | 0 | 22.5 | 20 | 3.8 |
| 17 | Quebracho | 2 | 5 | 8.2 | 60 | 30.5 | 90 | 31.5 |
| 18 | | 4 | 5 | 8.2 | 60 | 32.5 | 90 | 34.0 |
| 19 | | 6 | 5 | 8.2 | 60 | 35.2 | 70 | 35.0 |
| 20 | Additive of Example VIII | 20 | 0 | 9.3 | 0 | 22.5 | 5 | 3.1 |
| 21 | | 30 | 0 | 9.3 | 0 | 28.0 | 0 | 2.1 |
| 22 | | 40 | 0 | 9.3 | 0 | 30.0 | 0 | 1.3 |

EXAMPLE XV

To illustrate by way of example the capacity for thinning sea water mud imparted by oxidation, the electrolyzed product electrolyzed with 0.5 amp. hrs. per gram of fermented spent sulfite liquor solids between platinum electrodes was tested for thinning a sea water mud. The unexpected thinning achieved with this additive in salt contaminated mud which is normally difficult to thin, is shown in Table 1 of Example XV. The sea water mud was prepared by adding 1600 g. of a commercial drilling clay having a "yield value" of about 8 barrels of 15 cp. mud per ton of clay and 400 g. of a commercial drilling clay having a "yield value" of about 95 barrels of 15 cp. mud per ton of clay to 5200 ml. of sea water. The suspension was mixed ½ hour in a slow speed mixer and then divided into 500 ml. portions which were mixed 45 for approximately 4 hours and then digested for 18 hours in a sealed bomb at 105° C. The reaction mixture was acidified to pH 2.0 with sulfuric acid to precipitate the sulfonated lignin, which was filtered off, washed and redissolved in water with sodium hydroxide at pH 8.8. This product had a sulfone sulfur content of 3.0%. A portion of the product was dried for testing and another portion was oxidized in 15% solution by adding 10% by weight of hydrogen peroxide and sodium hydroxide to pH 10.0. The mixture was allowed to stand 24 hours at room temperature and then heated to 85–90° C. Sodium hydroxide was added to pH 8.0 and the product dried at 60° C.

The samples were tested as limed mud thinners as hereinbefore described using a mud having 45.5 lbs. per barrel of a mixture of clays containing six parts by weight of a commercial drilling clay having a "yield value" of 45 barrels of 15 cp. mud per ton of clay and 1 part by weight of a commercial drilling clay having a "yield value" of 95 barrels of 15 cp. mud per ton of clay.

Drilling mud test results, Table 1 of Example XVI show that oxidation improved the mud thinning properties of both sulfonated lignins.

*Table 1 of Example XVI*

OXIDATION OF SULFONATED KRAFT AND ALKALI LIGNINS EFFECT ON LIME MUD THINNING

[4.0 lbs./bbl. Limed Muds Rolled 20 Hrs. 150° F.]

| Sample | I.G. | Yield |
|---|---|---|
| Sulfonated Kraft Lignin | 19.5 | 18.5 |
| Oxidized Sulfonated Kraft Lignin | 13.5 | 12.0 |
| Sulfonated Alkali Lignin | 28.0 | 53.0 |
| Oxidized Sulfonated Alkali Lignin | 6.0 | 8.0 |

EXAMPLE XVII

This example illustrates the improved drilling mud additive properties, especially lower water loss, imparted to an oxidized spent sulfite liquor by an alkaline treatment. By way of example and not limitation, samples of spent sulfite liquor were alkaline treated both before and after oxidation with sodium permanganate and ammonium persulfate, and the resulting products were tested as additives for limed muds and fresh water muds.

The alkaline treated spent sulfite liquor was prepared as follows: Concentrated fermented calcium base spent sulfite liquor (1200 g.) having 50% non-volatile solids by weight was made alkaline to pH 8 by adding a 50% solution of sodium hydroxide and then digested for 24 hours, at 85–90° C. while maintaining the pH at 8 by adding sodium hydroxide. A total of 66 g. of 50% sodium hydroxide was added and the product had a pH of 8.3.

The sodium permanganate oxidized spent sulfite liquor oxidized with 5% $NaMnO_4$ was prepared as follows: Concentrated fermented calcium base spent sulfite liquor (1145 g.) having 35% by weight of non-volatile solids was oxidized by adding 27.6 g. of $NaMnO_4 \cdot 3H_2O$ as a 20% solution with vigorous stirring and then heated for 1 hour at 85–90° C. A portion of the product liquor, pH 7.4, was centrifuged to remove a small amount of insoluble material and dried in air at 60° C.

The sodium permanganate oxidized alkaline treated spent sulfite liquor oxidized with 5% $NaMnO_4$ was prepared as follows: A portion (633 g.) of the above alkaline treated spent sulfite liquor having 50% by weight of non-volatile solids were diluted to 35% solids and a 20% solution of sodium permanganate containing 20.7 g. of $NaMnO_4 \cdot 3H_2O$ was added with vigorous stirring. The mixture was heated 1 hour at 85–90° C. and then a portion of the product liquor, pH 8.6, was centrifuged to remove small amounts of insoluble material and dried in air at 60° C.

The alkaline treated sodium permanganate oxidized spent sulfite liquor was prepared as follows: A portion of the above described sodium permanganate oxidized spent sulfite liquor containing 100 g. of original spent sulfite liquor solids was made alkaline to pH 8 by adding a 50% solution of sodium hydroxide in water and then digested for 24 hours at 85–90° C. while maintaining the pH at 8 by addition of sodium hydroxide. The product liquor was centrifuged to remove small amounts of insoluble material and dried in air at 60° C.

The ammonium persulfate oxidized spent sulfite liquor oxidized with 15% $(NH_4)_2S_2O_8$ was prepared as follows: A solution of 60 g. of $(NH_4)_2S_2O_8$ dissolved in 200 ml. of water was added to 1145 g. of concentrated fermented calcium base spent sulfite liquor having 35% by weight of non-volatile solids. The mixture was allowed to stand overnight at room temperature and then heated 1 hour at 85–90° C. A portion of the product liquor pH 1.2 was neutralized with lime slurry to pH 4, heated 1 hour at 85–90° C., centrifuged to remove calcium sulfate and dried in air at 60° C.

The ammonium persulfate oxidized alkaline treated spent sulfite liquor oxidized with 15% $(NH_4)_2S_2O_8$ was prepared as follows: A portion (633 g.) of the above alkaline treated spent sulfite liquor having 50% by weight of non-volatile solids was diluted to 35% solids and then 45 g. of ammonium persulfate was dissolved in water and added. The mixture was allowed to stand overnight at room temperature and then heated 1 hour at 85–90° C. A portion of the hot liquor, pH 3.8, was centrifuged to remove calcium sulfate and dried in air at 60° C.

The alkaline treated ammonium persulfate oxidized spent sulfite liquor was prepared as follows: A portion of the above described ammonium persulfate oxidized spent sulfite liquor containing 100 g. of original spent sulfite liquor solids was made alkaline to a pH 8 by adding 6 g. of calcium hydroxide as a slurry and then sodium hydroxide. The alkaline mixture was heated 24 hours at 85–90° C. adding sodium hydroxide as necessary to maintain pH 8. The product liquor was centrifuged to remove calcium sulfate and dried in air at 60° C.

These samples were tested as thinners for fresh water and limed muds as hereinbefore described. With reference to Table 1 of Example XVII, the fresh water mud tests show a marked reduction in water loss for the alkaline treated samples without significant change in other properties.

*Table 1 of Example XVII*

FRESH WATER MUD TEST RESULTS

[Tested at 2.0 Lb./Bbl., pH 905. Muds Rolled 24 Hours at Room Temperature Before Testing]

| Sample | I.G. | Yield | 10 Min. Gel | Water Loss |
|---|---|---|---|---|
| Base Fresh Water Mud | 20.0 | 34.0 | 62.0 | 13.3 |
| Fermented Spent Sulfite Liquor | 10.0 | 22.0 | 32.0 | 10.3 |
| Permanganate Oxidized Fermented Spent Sulfite Liquor | 2.5 | 10.5 | 22.0 | 10.6 |
| Permanganate Oxidized Alkaline Treated Fermented Spent Sulfite Liquor | 5.0 | 9.5 | 23.0 | 9.3 |
| Alkaline Treated Permanganate Oxidized Fermented Spent Sulfite Liquor | 6.5 | 14.5 | 27.0 | 9.5 |
| Persulfate Oxidized Fermented Spent Sulfite Liquor | 14.0 | 19.0 | 26.0 | 10.0 |
| Persulfate Oxidized Alkaline Treated Fermented Spent Sulfite Liquor | 14.5 | 20.5 | 27.0 | 9.0 |
| Alkaline Treated Persulfate Oxidized Fermented Spent Sulfite Liquor | 16.5 | 22.5 | 32.5 | 9.5 |

*Table 2 of Example XVII*

LIMED MUD TEST RESULTS

[Tested at 6.0 Lb./Bbl. Muds Rolled 20 Hours at 150° F. Before Testing]

| Sample | I.G. | Yield | 10 Min. Gel | Water Loss |
|---|---|---|---|---|
| Fermented Spent Sulfite Liquor | 1.0 | 3.5 | 7.5 | 13.6 |
| Permanganate Oxidized Fermented Spent Sulfite Liquor | 1.0 | 1.0 | 1.0 | 15.6 |
| Permanganate Oxidized Alkali Treated Fermented Spent Sulfite Liquor | 0.5 | 2.0 | 1.0 | 14.9 |
| Alkali Treat of Permanganate Oxidized Fermented Spent Sulfite Liquor | 1.0 | 0.5 | 1.5 | 13.4 |
| Persulfate Oxidized Fermented Spent Sulfite Liquor | 1.0 | 1.0 | 1.0 | 12.4 |
| Persulfate Oxidized Alkali Treated Fermented Spent Sulfite Liquor | 1.0 | 0.5 | 3.0 | 12.0 |
| Alkali Treatment of Persulfate Oxidized Fermented Spent Sulfite Liquor | 1.0 | 0 | 1.5 | 11.0 |

NOTE: Limed mud without thinner is too thick to test.

Example XVIII

This example is to illustrate that the iron salt of alkaline treated spent sulfite liquor is an effective thinner for fresh water and gyp mud. By way of example and not limitation the iron salt of an alkaline treated fermented calcium base spent sulfite liquor was tested as a thinner for fresh water and gyp muds as hereinbefore described.

Alkaline treated spent sulfite liquor prepared as described in Example XVII was base exchanged to the iron salt by adding 20 grams of ferric sulfate as a 25% solution to a solution containing 100 g. of the alkaline treated spent sulfite liquor solids as a 30% solution. The mixture was neutralized to pH 3.0 by adding a small amount of sodium hydroxide, heated 1 hour at 85–90° C., centrifuged hot to remove calcium sulfate and dried in air at 60° C.

With reference to Table 1 of Example XVIII the iron salt of alkaline treated spent sulfite liquor effectively improves the properties of both fresh water and gyp muds.

*Table 1 of Example XVIII*

DRILLING MUD TEST RESULTS

[Fresh Water Mud Tests At 2.0 Lb./Bbl., pH 9.5. Muds Rolled 20 Hrs 150° F.]

| Sample | Initial Gel | Yield Value | 10 Min. Gel | API Water Loss |
|---|---|---|---|---|
| Base Fresh Water Mud | 20.0 | 34.0 | 62.0 | 13.3 |
| Iron Salt of Alkali Treated Spent Sulfite Liquor | 2.0 | 7.0 | 17.0 | 13.8 |

[Gyp Mud Tests At 6.0 Lb./Bbl. pH. 8.2. Muds Rolled 20 Hrs. 150° F.]

| Sample | Initial Gel | Yield Value | 10 Min. Gel | API Water Loss |
|---|---|---|---|---|
| Base Gyp Mud | 13.0 | 15.5 | 46.5 | 30.1 |
| Iron Salt of Alkali Treated Spent Sulfite Liquor | 3.0 | 10.0 | 15.5 | 17.4 |

EXAMPLE XIX

This example illustrates the improved drilling mud thinner properties obtained with an iron salt of oxidized spent sulfite liquor when the spent sulfite liquor is alkaline treated before forming the oxidized iron salt. By way of example and not limitation, the sodium permanganate and ammonium persulfate oxidized iron salts of sulfite spent liquor and alkaline treated sulfite spent liquor were tested as drilling mud thinners in gyp mud as hereinbefore described.

The iron salt of permanganate oxidized spent sulfite liquor was prepared as follows: A portion of the sodium permanganate oxidized fermented spent sulfite liquor described in Example XVII containing 100 g. of the original spent sulfite liquor solids was mixed with a 25% ferric sulfate solution containing 18 g. of ferric sulfate, neutralized to pH 3.1 by adding 16 g. of 10% sodium hydroxide, heated 1 hour at 85 to 90° C., centrifuged to remove $CaSO_4$, pH 4.2, and dried in air at 60° C.

The iron salt of permanganate oxidized alkaline treated spent sulfite liquor was prepared as follows: A portion of the permanganate oxidized alkaline treated fermented spent sulfite liquor described in Example XVII containing 100 g. of the original spent sulfite liquor solids was mixed with a 25% ferric sulfate solution containing 18 g. of ferric sulfate, heated 1 hour at 85 to 90° C., centrifuged to remove $CaSO_4$, pH 5.2, and dried in air at 60° C.

The iron salt of ammonium persulfate oxidized spent sulfite liquor was prepared as follows: A portion of the ammonium persulfate oxidized fermented spent sulfite liquor described in Example XVII containing 100 g. of original spent sulfite liquor solids was mixed with a 25% solution of ferric sulfate containing 18 g. of ferric sulfate and the mixture neutralized to pH 3–4 by adding 6 g. of calcium hydroxide as a slurry. The mixture was heated 1 hour at 85 to 90° C., centrifuged to remove $CaSO_4$, pH 3.0, and dried in air at 60° C.

The iron salt of ammonium persulfate oxidized alkaline treated spent sulfite liquor was prepared as follows: A portion of the ammonium persulfate oxidized alkaline treated spent sulfite liquor described in Example XVII containing 100 g. of original spent sulfite liquor solids was mixed with 72 g. of 25% ferric sulfate solution and the product neutralized to pH 3–4 by adding 6.0 g. of calcium hydroxide as a slurry. The mixture was heated 1 hour at 85 to 90° C., centrifuged to remove calcium sulfate, pH 4.3, and dried at 60° C.

With reference to Table 1 of Example XIX, the gyp mud tests show lower yields, gels and water loss for the products prepared from alkaline treated spent sulfite liquor as compared to the corresponding products prepared from the untreated spent sulfite liquor.

*Table 1 of Example XIX*

GYP MUD TEST RESULTS

[6.0 Lb./Bbl. In Gyp Mud At pH 8.2. Muds Rolled 20 Hrs. at 150° F.]

| Sample | Initial Gel | Yield Value | 10 Min. Gel | API Water Loss |
|---|---|---|---|---|
| Base Gyp Mud | 13.0 | 15.5 | 46.5 | 30.1 |
| Iron Salt of Permanganate Oxidized Spent Sulfite Liquor | 3.0 | 13.0 | 17.0 | 16.7 |
| Iron Salt of Permanganate Oxidized Alkali Treated Spent Sulfite Liquor | 2.0 | 8.5 | 15.0 | 14.4 |
| Iron Salt of Ammonium Persulfate Oxidized Spent Sulfite Liquor | 1.0 | 6.5 | 13.0 | 13.0 |
| Iron Salt of Ammonium Persulfate Oxidized Alkali Treated Spent Sulfite Liquor | 1.0 | 4.0 | 10.0 | 10.8 |

EXAMPLE XX

This example is to illustrate the reduction in oxidizing agent required to reach a given level of improvement in drilling mud thinner properties when a spent sulfite liquor is alkaline treated prior to oxidation. By way of example and not limitation the gyp mud thinning properties of a fermented calcium base spent sulfite liquor oxidized with 12% of sodium dichromate was compared with the gyp mud thinning properties of an alkaline treated product prepared from the same liquor and then oxidized with 6%, 7% and 8% of sodium dichromate based on the non-volatile solids.

The sodium dichromate oxidized spent sulfite liquor product was prepared as follows: Two hundred grams of concentrated fermented calcium base spent sulfite liquor containing 50 g. of non-volatile solids prepared by diluting liquor having 48.5% non-volatile solids was acidified with 10 g. of sulfuric acid (pH 1.0). Next, 24 g. sodium dichromate was added with vigorous stirring. The mixture was allowed to stand overnight at room temperature (pH 1.5), neutralized to pH 4.0 and dried in air at 60° C.

The sodium dichromate oxidized alkaline treated spent sulfite liquor product was prepared as follows: A quantity of concentrated fermented calcium base spent sulfite liquor having 48.5% of non-volatile solids was heated to 80° C. and made alkaline to pH 8.0 by adding sodium hydroxide as a 50% solution. The mixture was digested for 24 hours at 85–90° C. while adding sodium hydroxide as needed to maintain the pH at 8.0. Portions of the product containing 100 g. of the original spent sulfite liquor solids were diluted to about 25% solids, acidified to pH 3.0 with sulfuric acid and 6, 7 and 8 g. of sodium dichromate respectively added as a 25% solution with vigorous stirring while maintaining the pH at 3.0 with $H_2SO_4$. The products were heated 1 hour at 85–90° C., centrifuged to remove calcium sulfate and dried in air at 60° C.

With reference to Table 1 of Example XX, the gyp mud test results show that about 7% of sodium dichromate oxidation with alkaline treatment is equivalent to about 12% of sodium dichromate oxidation without alkaline treatment. This result demonstrates the economic advantage of the process of our invention.

*Table 1 of Example XX*

GYP MUD TEST RESULTS

[6.0 Lbs./Bbl. Gyp Mud at pH 8.2. Rolled 20 Hrs. at 150° F.]

| Sample | Initial Gel | Yield Value | 10 Min. Gel | API Water Loss |
|---|---|---|---|---|
| Base Gyp Mud | 13.0 | 15.5 | 46.5 | 30.1 |
| Fermented Spent Sulfite Liquor Oxidized with 12% Sodium Dichromate | 2.0 | 5.0 | 9.0 | 10.6 |
| Alkaline Treated Fermented Spent Sulfite Liquor Oxidized With 6% Sodium Dichromate | 3.0 | 5.0 | 9.5 | 12.2 |
| Alkaline Treated Fermented Spent Sulfite Liquor Oxidized With 7% Sodium Dichromate | 1.0 | 3.5 | 7.0 | 10.6 |
| Alkaline Treated Fermented Spent Sulfite Liquor Oxidized With 8% Sodium Dichromate | 1.5 | 4.5 | 7.0 | 8.2 |

EXAMPLE XXI

This example is to show mud thinning by the copper salt of an alkaline treated and oxidized fermented spent sulfite liquor. For this example the copper salt of a sodium dichromate oxidized alkaline treated fermented spent sulfite liquor was tested for thinning a gypsum base mud.

The copper salt was prepared as follows: A quantity of concentrated fermented calcium base spent sulfite liquor was made alkaline to pH 8 by adding sodium hydroxide and heated for 24 hours at 85–90° C., while adding sodium hydroxide to maintain alkalinity value at pH 8. Then 217 g. of this liquor having 48% by weight of non-volatile solids was acidified to pH 4.0 and diluted to approximately 38% non-volatile solids. Next 7 g. of sodium dichromate and sulfuric acid to maintain the pH at 4.5 to 5.0 were added as 25% solutions with vigorous stirring. Finally 34 g. of copper sulfate pentahydrate were dissolved in water and added and the mixture heated 4 hours at 85° C., centrifuged to remove calcium sulfate, and dried in air at 60° C.

The dried product was tested as a gyp mud thinner as hereinbefore described. With reference to Table 1 of Example XXI, the oxidized copper salt effectively lowers yield, gels, and water loss of the gypsum mud.

*Table 1 of Example XXI*

THINNING OF GYP MUD BY OXIDIZED COPPER SALT

[pH 8.2 Gyp Mud Rolled 20 Hrs. 150° F.]

| Sample | Lbs./Bbl. | Initial Gel | Yield Value | 10 Min. Gel | API Water Loss |
|---|---|---|---|---|---|
| Base Gyp Mud | | 10.0 | 19.0 | 30.0 | 32.4 |
| Oxidized Copper Salt | 4.0 | 4.0 | 8.0 | 15.0 | 13.6 |
| | 6.0 | 2.0 | 4.0 | 12.0 | 9.7 |

EXAMPLE XXII

This example illustrates the unexpectedly effective thinning of a drilling mud prepared with sea water by use of an oxidized aluminum salt. By way of example and not limitation a sample of sea water mud prepared as described in Example XV was thinned by adding a hydrogen peroxide oxidized aluminum salt of alkaline treated spent sulfite liquor.

The oxidized aluminum salt was prepared as follows: One hundred grams of concentrated fermented calcium base spent sulfite liquor having 50% by weight of non-volatile solids was made alkaline to pH 8 by adding a 50% solution of sodium hydroxide and then digested at 85–90° C. for 24 hours while adding more sodium hydroxide as necessary to maintain the pH at 8.0. Next 12 g. of aluminum sulfate (17% $Al_2O_3$) dissolved in water were added and the mixture cooled to room temperature. One hundred grams of 10% hydrogen peroxide was added and the mixture allowed to react until evolution of gas stopped. The reaction mixture, pH 2.8, was neutralized to pH 3.5 with lime, digested 1 hour at 85–90° C., centrifuged to remove calcium sulfate and dried in air at 60° C.

Sea water mud tests, Table I, show that this product is very effective for lowering yield, gels and water loss of a seat water mud.

*Table 1 of Example XXII*

SEA WATER DRILLING MUD TEST RESULTS

[9.0 Lbs./Bbl. In pH 9.5 Sea Water Mud. Rolled 20 Hrs. at 150° F.]

| Sample | Initial Gel | Yield Value | 10 Min. Gel | API Water Loss |
|---|---|---|---|---|
| Base Sea Water Mud | 28.0 | 41.5 | 28.0 | 39.0 |
| Oxidized Aluminum Salt of alkaline Treated Spent Sulfite Liquor | 1.0 | 4.5 | 12.5 | 16.6 |

EXAMPLE XXIII

This example shows the improvement in mud thinning properties resulting from an alkaline treatment carried out at a high temperature. By use of high temperatures the treatment may be carried out in a very short time. Above about 220° C. the spent sulfite liquor condenses rapidly to an insoluble solid and control of the treatment becomes difficult. However, good products are obtained up to the point of formation of a substantial amount of insoluble products.

By way of example for this disclosure and not limitation, a sample of concentrated fermented calcium base spent sulfite liquor having 30% by weight of non-volatile solids was made alkaline to pH 10 by adding sodium hydroxide and then heated at 210° C. for 20 minutes in a sealed bomb. Portions of the product, pH 7.3, were converted to the iron salt and to a permanganate oxidized iron salt and these were tested as thinners for gypsum base mud in comparison with the corresponding salts prepared from said spent sulfite liquor. Another portion of the product was oxidized with permanganate and tested as a thinner for limed mud in comparison with the corresponding salt prepared from said spent sulfite liquor.

The iron salt of the said alkali treated liquor was prepared by adding 18 g. of ferric sulfate (24.5% Fe) as a 40% solution to 334 g. of the 30% liquor. The mixture was adjusted to pH 4.0 by adding 25% $H_2SO_4$, heated 1 hour at 85–90° C., centrifuged to remove $CaSO_4$ and dried in air at 60° C.

The permanganate oxidized iron salt of said alkali treated liquor was prepared by adding 4 g. of potassium permanganate as a dilute solution to 334 g. of the alkaline treated liquor with vigorous stirring and then 18 g. of ferric sulfate (24.5% Fe) was added as a 40% solution. The product, pH 5.7, was adjusted to pH 4.0 with 25% $H_2SO_4$, heated 1 hour at 85–90° C., centrifuged to remove $CaSO_4$, and dried in air at 60° C.

The iron salt of the fermented spent sulfite liquor used for comparison was prepared by adding 18 g. of ferric sulfate as a 25% solution to 334 g. of said concentrated fermented calcium base spent sulfite liquor having 30% by weight of spent sulfite liquor solids previously made alkaline to pH 8 by adding 10% sodium hydroxide solution. The mixture, then about pH 4, was heated 1 hour at 85–90° C., centrifuged to remove calcium sulfate, and dried at 60° C. in air.

The permanganate oxidized iron salt of fermented spent sulfite liquor was prepared by adding 5 g. of sodium permanganate as a 20% solution to 334 g. of said 30% spent sulfite liquor with vigorous stirring and then heating for 1 hour at 85–90° C. Next 18 g. of ferric sulfate (24.5% Fe) was added as a 25% solution and then 16 g. of 10% sodium hydroxide. The mixture was heated 1 hour at 85–90° C., centrifuged to remove calcium sulfate, pH 4.2, and dried at 60° C. in air.

The said high temperature alkaline treated liquor was oxidized with permanganate by adding 4 g. of potassium permanganate as a dilute solution with vigorous stirring to 334 g. of the alkaline treated liquor containing 30% solids. The product was heated at 85–90° C. for 1 hour, centrifuged to remove insoluble materials and dried in air at 60° C.

A sample of the fermented spent sulfite liquor was oxidized with permanganate by adding 5.0 g. of sodium permanganate as a dilute solution to 286 g. of liquor having 35% by weight of non-volatile solids. The permanganate was added slowly with vigorous stirring and then the mixture was heated 1 hour at 85–90° C., centrifuged to remove any insolubles, and dried in air at 60° C.

Mud tests on the iron salts were made in a gypsum base mud as hereinbefore described using a mud prepared with 45.5 Lb./Bbl. of a mixture of commercial drilling clays comprising 6 parts by weight of a clay having a "yield value" of 45 bbls. of 15 cp. mud per ton of clay and 1 part by weight of a clay having a yield value of 95 bbl. of 15 cp. mud per ton of clay. Mud tests on the permanganate oxidized liquors were made in limed mud as hereinabove described using the mud described above.

With reference to the Table 1 of Example XXIII, the products prepared from the high temperature alkaline treated fermented spent sulfite show better thinning and lower water loss than the corresponding product prepared from fermented spent sulfite liquor.

EFFECT OF ALKALINE TREATMENT AT 210° C. ON MUD THINNING

[Mud Tests At 4 Lb./Bbl. In Gyp Mud At pH 8.2. Rolled 20 Hours 150° F.]

| Sample | Initial Gel | Yield Value | 10 Min. Gel | Water Loss |
|---|---|---|---|---|
| Fe Salt of Spent Sulfite Liquor | 9.5 | 13.0 | 17.0 | 19.2 |
| Fe Salt of Alkaline Treated Spent Sulfite Liquor | 7.5 | 10.5 | 16.0 | 11.2 |
| Fe Salt of Permanganate Oxidized Spent Sulfite Liquor | 7.5 | 12.5 | 18.5 | 19.2 |
| Fe Salt of Permanganate Oxidized Alkaline Treated Spent Sulfite Liquor | 4.0 | 6.5 | 15.0 | 15.0 |

Mud Tests In Lime Mud, Rolled 20 Hours 150° F.

| | | | | |
|---|---|---|---|---|
| Permanganate Oxidized Spent Sulfite Liquor | 1.5 | 4.0 | 22.0 | 15.0 |
| Permanganate Oxidized High Temperature Alkaline Treated Spent Sulfite Liquor | 1.5 | 2.5 | 9.0 | 14.8 |

EXAMPLE XXIV

This example illustrates the improvement in drilling mud thinning properties and water loss resulting from electrolytic oxidation at very low current usage of an alkaline treated spent sulfite liquor. By way of example and not limitation, mud tests were made on the iron salts in gyp mud for samples electrolyzed with 0, 0.01, 0.02 and 0.1 ampere hours of electrolysis per gram of spent sulfite liquor solids.

To prepare the samples, a quantity of approximately 50% concentrated fermented calcium base spent sulfite liquor was neutralized to pH 8 with 50% sodium hydroxide and then digested at 85–90° C. for 24 hours while adding sodium hydroxide from time to time to maintain pH 8. The product was dried in a spray drier and samples of the dried product were weighted out, dissolved in water, and electrolyzed with continuous stirring between platinum electrodes at 50° C. with 0.1, 0.02 and 0.01 ampere hours per gram of solids, while maintaining the pH in the range 8 to 9 by adding sodium hydroxide. The products were base exchanged to the iron salt by adding 20% by weight of ferric sulfate as a 20% solution, heated 1 hour at 85–90° C., centrifuged to remove calcium sulfate, and dried in air at 60° C.

Samples were tested for mud thinning in a gypsum base mud as herein before described using a mud prepared as hereinbefore described having 45.5 lbs./bbl. of a mixture of drilling clay comprising 6 parts by weight of a clay having a "yield value" of 45 bbls. of 15 cp. mud per ton of clay and 1 part by weight of a clay having a yield value of 95 bbl. of 10 cp. mud per ton of clay.

Mud test results, Table 1, show improvements in mud thinning over the product which has had no electrolysis, for electrolytic treatments as low as 0.01 ampere hours per gram.

Table 1 of Example XXIV

[Mud Tests In Gyp Mud At 6.0 Lb./Bbl. Rolled 20 Hours At 150° F.]

| Electrolysis (Amp. Hrs./Gram) | Initial Gel | Yield Value | 10 Min. Gel | Water Loss |
|---|---|---|---|---|
| 0 | 1.0 | 7.0 | 15.0 | 16.3 |
| 0.01 | 1.0 | 6.0 | 12.0 | 15.6 |
| 0.02 | 1.0 | 6.5 | 12.0 | 15.6 |
| 0.1 | 1.0 | 5.5 | 8.5 | 12.2 |

By "purifying" herein is meant partially or completely removing the nonlignosulfonate portions of the spent sulfite liquor as by fermentation, fractionation, lime precipitation in bulk or by small increments, by salting out, or by reaction with organic amines and separation as precipitates or as non-miscible solutions; in short, by any of the methods known to the art. Particularly, "purifying" includes the removal of sulfur dioxide, otherwise unnecessary consumption of the oxidizing agent occurs. Such removal may be accomplished by steam stripping and/or air blowing and this particularly at elevated temperatures. "Purifying" may also include removal of insoluble inorganic precipitates such as calcium-sulfite and sulfate. In fractionating we include fractionation with aqueous organic solvents. By "separating" the spent sulfite liquor solids is meant isolating in whole or in part the said solid components of the spent sulfite liquor by any of the methods herein disclosed. By "concentrating" the spent sulfite liquor solids is meant reducing the volatile content of the spent sulfite liquor in part or to the degree that there remain only the solid components of the spent sulfite liquor.

When the phrase, "adding to the spent sulfite liquor solid components" is used, the solids could be in the original solution or isolated by any of the methods herein mentioned or known to the art. When the statement is herein used "treating to form a salt having an element selected from the group consisting of iron, aluminum, chromium, and copper," it is intended, of course, to include combinations of said elements. Likewise, in the listing of the oxidizing agents, combinations of said agents where chemically feasible are included. When it is directed to "add to" or "treat spent sulfite liquor," it is intended to employ or treat said liquor substantially as received from the digester excepting that the temperature of the spent sulfite liquor may be as it is received from the digester or after the spent sulfite liquor is cooled.

Where fermented spent sulfite liquor was used, in the examples herein it was prepared from the effluent from the commercial production of ethyl alcohol by fermentation of spent sulfite liquor with baker's yeast (*Saccharomyces cerevisiae*). In the fermentation process the spent sulfite liquor as it is received from the blowpit is stripped (distilled) with steam to remove sulfur dioxide, cooled to about 30° C. and neutralized to about pH 4.5 with lime. Baker's yeast is then added to the neutralized spent sulfite liquor to ferment the hexose sugars present to alcohol. The fermentation lowers the reducing value of the spent sulfite liquor as measured by Fehling's solution from about 24 percent to about 10 percent expressed as glucose and based on the spent sulfite liquor solids. Yeast is recovered for reuse by centrifuging and the alcohol is removed from the fermented liquor by stripping with steam. The resultant liquor is the fermented spent sulfite liquor. This method of fermentation is disclosed more fully in United States Letters Patent No. 2,430,355, granted to Joseph L. McCarthy on November 4, 1947. Any method of fermentation which primarily utilized the carbohydrates may be used. The fermentation may be either anaerobic or aerobic by any of a number of microorganisms including bacteria and yeast of the Torula genus.

In using a gypsum base mud, the calcium sulfate may be added to the mud from the strata being drilled.

Where examples of substances are given it is to be understood the same is done by way of illustration and not limitation.

We claim:

1. A drilling fluid composition comprising a suspension of a clayey material in an aqueous medium containin an effective dispersing amount of a product obtained from sulfonated lignin-containing material by forming a salt of a sulfonated lignin-containing material which has been heated in aqueous solution under alkaline conditions, said salt having a metal ion selected from a group consisting of iron, aluminum, chromium, copper and mixtures thereof, and oxidizing said salt with an oxidizing agent having an oxidizing power stronger than an oxidation potential of about −1.3 at sufficiently low concentrations and rate to form a water soluble oxidized product.

2. The composition of claim 1 wherein said sulfonated lignin-containing material is obtained from spent sulfite liquor, and wherein said spent sulfite liquor is prepared by heating the same in aqueous solution at a pH between about 7 and about 10 at temperatures ranging from about 40° C. to temperatures above the boiling point of the solution under conditions of elevated pressure for periods of time ranging from as low as 30 minutes at the higher temperatures to as long as two weeks at the lower temperatures.

3. The composition of claim 1 wherein there is additionally present an excess of calcium sulfate over its solubility in the aqueous medium.

4. The composition of claim 1 wherein said sulfonated lignin-containing material is obtained from spent sulfite liquor, and wherein said oxidizing agent is selected from a group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, electrolytic oxidation and combinations thereof.

5. The composition of claim 4 wherein said cation is iron and said oxidizing agent is an alkali metal chromate.

6. A drilling fluid composition comprising a suspension of a clayey material in an aqueous medium containing an effective dispersing amount of a water soluble product obtained from sulfonated lignin-containing material by heating a sulfonated lignin-containing material in an aqueous solution under alkaline conditions to thereby form an alkaline treated, water soluble sulfonated lignin-containing product and forming a salt of said sulfonated lignin-containing material, said salt-containing a metal ion selected from a group consisting of iron, chromium, copper, aluminum and mixtures thereof.

7. The composition of claim 6 wherein said metal ion is present in an amount chemically equivalent to 1–50% of the sulfate salt thereof, based on the weight of the sulfonated lignin in the material and said sulfonated lignin-containing material and said metal cation being present in said suspension in an amount sufficient to improve at least one of the gel strength, viscosity and water loss properties of said suspension.

8. The composition of claim 6 wherein said lignin-containing material is obtained from spent sulfite liquor, and wherein said spent sulfite liquor is prepared by heating the same in aqueous solution at a pH between about 7 and about 10 at a temperature ranging from about 40° C. to temperatures above the boiling point of the solution by heating under conditions of elevated pressure for periods of time ranging from as low as 30 minutes at the higher temperatures to as long as two weeks at the lower temperatures.

9. The composition of claim 8 wherein a basic reagent is added to said solution in sufficient amount to establish and maintain said pH without substantial precipitation of the sulfonated lignin and wherein the temperature is in the range of about 40° C. to about 120° C.

10. The composition of claim 9 wherein said cation is iron.

11. The composition of claim 9 wherein said cation is aluminum.

12. The composition of claim 9 wherein said cation is chromium.

13. The composition of claim 9 wherein said cation is copper.

14. A drilling fluid composition comprising a suspension of a clayey material in an aqueous medium containing an effective dispersing amount of a product obtained from sulfonated lignin-containing material by oxidizing a sulfonated lignin-containing material which has been heated in aqueous solution under alkaline conditions, with an oxidizing agent having an oxidizing power stronger than an oxidation potential of about −1.3 at sufficiently low concentrations and rate to form a water soluble oxidized product.

15. The composition of claim 14 wherein said sulfonated lignin-containing material is obtained from spent sulfite liquor and wherein said oxidizing agent is selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, electrolytic oxidation and combinations thereof, and where the spent sulfite liquor is heated in aqueous solution at a pH between about 7 and about 10 at temperatures ranging from about 40° C. to temperatures above the boiling point of the solution under conditions of elevated pressure for periods of time ranging from as low as 30 minutes at the higher temperatures to as long as two weeks at the lower temperatures.

16. A drilling fluid composition comprising a suspension of a clayey material in an aqueous medium containing an effective dispersing amount of a product obtained from a sulfonated lignin-containing material by heating in an aqueous solution under alkaline conditions without substantial precipitation of sulfonated lignin, and complexing said material with a metal selected from the group consisting of iron, aluminum, chromium, copper and mixtures thereof to produce a water soluble product, said metal being present in an amount chemically equivalent to 50% of the sulfate salt thereof, based on the weight of the sulfonated lignin-material.

17. A drilling fluid composition resistant to the effects of temperature, contaminants and heaving shale, said composition comprising a suspension of a clayey material in an aqueous medium, an excess of calcium sulfate over its solubility in the aqueous medium, said suspension containing an effective dispersing amount of a soluble, oxidized salt of a sulfonated lignin-containing material, said salt having a cation selected from the group consisting of iron, aluminum, chromium, copper and mixtures thereof, said sulfonated lignin-containing material pretreated by reacting with a basic reagent having a hydroxyl ion concentration in the solution of at least about pH 10, said basic reagent being of a character to and being present in sufficient amount to, establish and maintain hydroxyl ion concentration of the reaction within the range of about pH 7 to about pH 10 without substantial precipitation of any of the sulfonated lignin-containing material; maintaining the temperature of reaction in the range of about 40° C. to about 120° C.; and continuing the reaction until substantially no further drop in hydroxyl ion concentration occurs, and said suspension also containing an inorganic salt in the amount of 1–100% by weight, based on the weight of the sulfonated lignin-containing material, said inorganic salt being selected from the group consisting of sodium sulfate, sodium sulfite, potassium sodium tartrate, sodium oxalate, sodium phosphate, sodium carbonate, sodium bicarbonate, aluminum sulfate, iron sulfate, potassium sulfate, potassium sulfite, potassium oxalate, potassium phosphate, potassium carbonate, potassium bicarbonate and mixtures thereof.

18. A drilling fluid composition resistant to the effects of temperature, contaminants and heaving shale, said composition comprising a suspension of a clayey material in an aqueous medium, an excess of calcium sulfate over its solubility in the aqueous medium, said suspension being thinned by a soluble additive prepared by a process which comprises reacting sulfonated lignin-containing material obtained from wood pulping liquors to form a salt of said sulfonated lignin-containing material having cation selected from the group consisting of iron, aluminum, chromium, copper and mixtures thereof, and oxidizing said salt of said sulfonated lignin-containing material by an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate and combinations thereof, said sulfonated lignin-containing material being pretreated by reacting with a basic reagent having a hydroxyl ion concentration in the solution of at least about pH 10, said basic reagent of a character to, and being present in sufficient amount to, establish and maintain hydroxyl ion concentration of the reaction within the range of about pH 7 to about pH 10 without substantial precipitation of any of the sulfonated lignin-containing material; maintaining the temperature of reaction in the range of about 40° C. to about 120° C.; and continuing the reaction until substantially no further drop in hydroxyl ion concentration occurs, and said composition also including an inorganic salt in the amount of 1–100% by weight, based on the weight of the sulfonated lignin-containing material, said inorganic salt being selected from the group consisting of sodium sulfate, sodium sulfite, potassium sodium tartrate, sodium oxalate, sodium phosphate, sodium carbonate, sodium bicarbonate, aluminum sulfate, iron sulfate, potassium sulfate, potassium sulfite, potassium oxalate, potassium phosphate, potassium carbonate, potasium bicarbonate and mixtures thereof.

19. A drilling fluid composition resistant to the effects of temperature, contaminants and heaving shale, said composition comprising a suspension of a clayey material in an aqueous medium, an excess of calcium sulfate over its solubility in the aqueous medium, said suspension being thinned by a soluble additive prepared by a process which comprises reacting sulfonated lignin-containing material to form a salt of said sulfonated lignin-containing material having a cation selected from the group consisting of iron, aluminum, chromium, copper and mixtures thereof, said sulfonated lignin-containing material being pretreated by reacting with a basic reagent having a hydroxyl ion concentration in the solution of about pH 10 said basic reagent being of a character to, and being present in sufficient amount to, establish and maintain hydroxyl ion concentration of the reaction within the range of about pH 7 to about pH 10 without substantial precipitation of any of the sulfonated lignin-containing material; maintaining the temperature of reaction in the range of about 40° C. to about 120° C.; and continuing the reaction until substantially no further drop in hydroxyl concentration occurs, and said composition also including an inorganic salt in the amount of 1–100% by weight, based on the weight of the sulfonated lignin-containing material, said inorganic salt being selected from the group consisting of sodium sulfate, sodium sulfite, potassium sodium tartrate, sodium oxalate, sodium phosphate, sodium carbonate, sodium bicarbonate, aluminum sulfate, iron sulfate, potassium sulfate, potassium sulfite, potassium oxalate, potassium phosphate, potassium carbonate, potassium bicarbonate and mixtures thereof.

20. A drilling fluid thinner composition comprising the combination of (1) a soluble additive prepared by a process which comprises reacting sulfonated lignin-containing material obtained from wood pulping liquors to form a salt of said sulfonated lignin-containing material having a cation selected from the group consisting of iron, aluminum, chromium, copper and mixtures thereof, and oxidizing said salt of said sulfonated lignin-containing material by an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate and combinations thereof, said sulfonated lignin-containing material being pretreated by reacting with a basic reagent having a hydroxyl ion concentration in the solution of at least about pH 10, said basic reagent being of a character to, and being present in sufficient amount to establish and maintain hydroxyl ion concentration of the reaction within the range of about pH 7 to about pH 10 without substantial precipitation of any of the sulfonated lignin-containing material; maintaining the temperature of reaction in the range of about 40° C. to about 120° C.; and continuing the reaction until substantially no further drop in hydroxyl ion concentration occurs, and (2) an inorganic salt in the amount of 1–100% by weight, based on the weight of the sulfonated lignin-containing material, said inorganic salt being selected from the group consisting of sodium sulfate, sodium sulfite, potassium sodium tartrate, sodium oxalate, sodium phosphate, sodium carbonate, sodium bicarbonate, aluminum sulfate, iron sulfate, potassium sulfate, potassium sulfite, potassium oxalate, potassium phosphate, potassium carbonate, potassium bicarbonate and mixtures thereof.

21. A drilling fluid thinner composition comprising the combination of (1) a complex salt of a sulfonated lignin-containing material, said salt being produced by complexing said material with a metal selected from the group consisting of iron, aluminum, chromium, copper and mixtures thereof, to produce a soluble product, said metal being present in an amount chemically equivalent to that obtained by using 1–50 percent of the sulfate salt thereof, based on the weight of the sulfonated lignin-containing material, said sulfonated lignin-containing material being pretreated by reacting with a basic reagent having a hydroxyl ion concentration in the solution of at least about pH 10, said basic reagent being of a character to, and being present in sufficient amount to, establish and maintain hydroxyl ion concentration of the reaction within the range of about pH 7 to about pH 10 without substantial precipitation of any of the sulfonated lignin-containing material; maintaining the temperature of reaction in the range of about 40° C. to about 120° C.; and continuing the reaction until substantially no further drop in hydroxyl ion concentration occurs, and (2) an inorganic salt in the amount of 1–100% by weight, based on the weight of the sulfonated lignin-containing material, said inorganic salt being selected from the group consisting of sodium sulfate, sodium sulfite, potassium sodium tartrate, sodium oxalate, sodium phosphate, sodium carbonate, sodium bicarbonate, aluminum sulfate, iron sulfate, potassium sulfate, potassium sulfite, potassium oxalate, potassium phosphate, potassium carbonate, potassium bicarbonate and mixtures thereof.

22. A method of drilling a well comprising circulating in the well a well drilling fluid comprising the composition of claim 1.

23. A method of drilling a well comprising circulating in the well a well drilling fluid comprising the composition of claim 2.

24. A method of drilling a well comprising circulating in the well a well drilling fluid comprising the composition of claim 3.

25. A method of drilling a well comprising circulating in the well a well drilling fluid comprising the composition of claim 4.

26. A method of drilling a well comprising circulating in the well a well drilling fluid comprising the composition of claim 5.

27. A method of drilling a well comprising circulating in the well a well drilling fluid comprising the composition of claim 6.

28. A method of drilling a well comprising circulating in the well a well drilling fluid comprising the composition of claim 7.

29. A method of drilling a well comprising circulating in the well a well drilling fluid comprising the composition of claim 8.

30. A method of drilling a well comprising circulating in the well a well drilling fluid comprising the composition of claim 9.

31. A method of drilling a well comprising circulating in the well a well drilling fluid comprising the composition of claim 10.

32. A method of drilling a well comprising circulating in the well a well drilling fluid comprising the composition of claim 11.

33. A method of drilling a well comprising circulating in the well a well drilling fluid comprising the composition of claim 12.

34. A method of drilling a well comprising circulating in the well a well drilling fluid comprising the composition of claim 13.

35. A method of drilling a well comprising circulating in the well a well drilling fluid comprising the composition of claim 14.

36. A method of drilling a well comprising circulating in the well a well drilling fluid comprising the composition of claim 15.

37. A method of drilling a well comprising circulating in the well a well drilling fluid comprising the composition of claim 16.

38. A method of drilling a well comprising circulating in the well a well drilling fluid comprising the composition of claim 17.

39. A method of drilling a well comprising circulating in the well a well drilling fluid comprising the composition of claim 18.

40. A method of drilling a well comprising circulating in the well a well drilling fluid comprising the composition of claim 19.

References Cited by the Examiner

UNITED STATES PATENTS

| | | | |
|---|---|---|---|
| 1,812,693 | 6/1931 | Hailwood | 260—124.3 |
| 2,491,832 | 12/1949 | Salveson et al. | 260—124.3 |
| 2,576,418 | 11/1951 | Salveson et al. | 260—124.3 |
| 2,935,473 | 5/1960 | King et al. | |
| 3,007,864 | 11/1961 | Adolphson et al. | 260—124.3 |

LEON D. ROSDOL, *Primary Examiner.*

JULIUS GREENWALD, *Examiner.*

H. B. GUYNN, *Assistant Examiner.*